US011778430B2

(12) United States Patent
Ciechanowski et al.

(10) Patent No.: US 11,778,430 B2
(45) Date of Patent: *Oct. 3, 2023

(54) LAYERS IN MESSAGING APPLICATIONS

(71) Applicant: Apple Inc., Cupertino, CA (US)

(72) Inventors: Bartosz Ciechanowski, London (GB); Bhaskar P. Sarma, Santa Clara, CA (US); William R. Dahlberg, San Francisco, CA (US); Eugene Bistolas, Mountain View, CA (US); Olivier Gutknecht, San Francisco, CA (US); Nathaniel Begeman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,749

(22) Filed: Sep. 23, 2021

(65) Prior Publication Data

US 2022/0191653 A1   Jun. 16, 2022

Related U.S. Application Data

(63) Continuation of application No. 16/525,377, filed on Jul. 29, 2019, now Pat. No. 11,159,922, which is a
(Continued)

(51) Int. Cl.
*H04W 4/14* (2009.01)
*H04M 1/72436* (2021.01)
(Continued)

(52) U.S. Cl.
CPC ............. *H04W 4/14* (2013.01); *H04L 51/216* (2022.05); *H04M 1/72436* (2021.01); *H04L 51/08* (2013.01); *H04L 51/58* (2022.05)

(58) Field of Classification Search
CPC ......... H04L 51/04; H04L 51/18; H04L 51/38; H04L 51/046; H04L 51/10;
(Continued)

(56) References Cited

U.S. PATENT DOCUMENTS 5,784,001 A   7/1998 DeLuca et al.
5,903,728 A   5/1999 Semenzato
(Continued)

FOREIGN PATENT DOCUMENTS

CN   101198948 A   6/2008
CN   101611398 A   12/2009
(Continued)

OTHER PUBLICATIONS

Intent to Grant, dated May 25, 2022, received in European Patent Application No. 18167254.4, which corresponds with U.S. Appl. No. 15/272,419, 18 pages.
(Continued)

*Primary Examiner* — Margaret G Mastrodonato
(74) *Attorney, Agent, or Firm* — Morgan, Lewis & Bockius LLP

(57) ABSTRACT

A text messaging system that allows messaging apps to send one or more layer identifiers that can specify content for a layer and Z depth of that layer relative to other layers in a text message transcript such as a sent message layer and a received message layer.

33 Claims, 29 Drawing Sheets

Related U.S. Application Data continuation of application No. 15/400,780, filed on Jan. 6, 2017, now Pat. No. 10,368,208.

(60) Provisional application No. 62/349,086, filed on Jun. 12, 2016, provisional application No. 62/349,113, filed on Jun. 12, 2016, provisional application No. 62/349,091, filed on Jun. 12, 2016, provisional application No. 62/349,101, filed on Jun. 12, 2016.

(51) Int. Cl.
  *H04L 51/216* (2022.01)
  *H04L 51/08* (2022.01)
  *H04L 51/58* (2022.01)

(58) Field of Classification Search
  CPC ......... H04M 1/72547; H04M 1/72552; H04M 1/72555; H04W 4/12; H04W 4/185; H04W 4/14
  See application file for complete search history.

(56) References Cited

U.S. PATENT DOCUMENTS

| | | |
|---|---|---|
| 6,054,990 A | 4/2000 | Tran |
| 6,539,421 B1 | 3/2003 | Appelman et al. |
| 6,633,305 B1 | 10/2003 | Sarfeld |
| 6,869,018 B2 | 3/2005 | Fifield et al. |
| 7,089,504 B1 | 8/2006 | Froloff et al. |
| 7,130,885 B2 | 10/2006 | Chandra et al. |
| 7,343,561 B1 | 3/2008 | Stochosky et al. |
| 7,353,466 B2 | 4/2008 | Crane et al. |
| 7,571,213 B2 | 8/2009 | Walkush et al. |
| 7,669,134 B1 | 2/2010 | Christie et al. |
| 7,856,469 B2 | 12/2010 | Chen et al. |
| 8,166,408 B2 | 4/2012 | Castelucci |
| 8,271,900 B2 | 9/2012 | Wakizaka et al. |
| 8,375,320 B2 | 2/2013 | Kotler et al. |
| 8,464,167 B2 | 7/2013 | Saund et al. |
| 8,584,031 B2 | 11/2013 | Moore et al. |
| 8,621,585 B2 | 12/2013 | Danieli et al. |
| 8,667,418 B2 | 3/2014 | Chaudhri et al. |
| 8,677,250 B2 | 3/2014 | Wormald et al. |
| 8,751,572 B1 | 6/2014 | Behforooz et al. |
| 8,881,051 B2 | 11/2014 | Frey et al. |
| 8,957,915 B1 | 2/2015 | Chalasani et al. |
| 9,003,306 B2 | 4/2015 | Mehin et al. |
| 9,244,601 B2 | 1/2016 | Kim et al. |
| 9,272,217 B1 | 3/2016 | Holme et al. |
| 9,298,355 B1 | 3/2016 | Beausoleil et al. |
| 9,477,375 B1 | 10/2016 | Lewis et al. |
| 9,533,217 B2 | 1/2017 | Naik et al. |
| 9,596,200 B1 | 3/2017 | Chen et al. |
| 9,654,222 B1 | 5/2017 | Shatz et al. |
| 9,904,469 B2 | 2/2018 | Gnedin et al. |
| 9,911,222 B2 | 3/2018 | Setton et al. |
| 9,948,589 B2 | 4/2018 | Gonnen et al. |
| 10,126,927 B1 | 11/2018 | Fieldman |
| 10,129,321 B2 | 11/2018 | Mayya et al. |
| 10,558,329 B2 | 2/2020 | Lewis et al. |
| 2003/0036431 A1 | 2/2003 | Futatsugi et al. |
| 2003/0110450 A1 | 6/2003 | Sakai |
| 2004/0054740 A1 | 3/2004 | Daigle et al. |
| 2004/0137884 A1 | 7/2004 | Engstrom et al. |
| 2004/0179039 A1 | 9/2004 | Blattner et al. |
| 2004/0224772 A1 | 11/2004 | Canessa et al. |
| 2005/0021834 A1 | 1/2005 | Coulombe |
| 2005/0116956 A1 | 6/2005 | Beardow |
| 2005/0156873 A1 | 7/2005 | Walter et al. |
| 2005/0198124 A1 | 9/2005 | McCarthy |
| 2005/0204309 A1 | 9/2005 | Szeto |
| 2005/0210114 A1 | 9/2005 | Washburn |
| 2006/0022955 A1 | 2/2006 | Kennedy |
| 2006/0041629 A1 | 2/2006 | Lira |
| 2006/0041848 A1 | 2/2006 | Lira |
| 2006/0132457 A1 | 6/2006 | Rimas-Ribikauskas et al. |
| 2006/0161868 A1 | 7/2006 | Van Dok et al. |
| 2006/0294189 A1 | 12/2006 | Natarajan et al. |
| 2007/0073776 A1 | 3/2007 | Kalalian et al. |
| 2007/0207782 A1 | 9/2007 | Tran |
| 2008/0055269 A1 | 3/2008 | Lemay et al. |
| 2008/0081698 A1 | 4/2008 | Wormald et al. |
| 2008/0091692 A1 | 4/2008 | Keith et al. |
| 2008/0114848 A1 | 5/2008 | Lira |
| 2008/0141150 A1 | 6/2008 | Kalaboukis et al. |
| 2008/0235285 A1 | 9/2008 | Della Pasqua |
| 2008/0280633 A1 | 11/2008 | Agiv |
| 2008/0303799 A1 | 12/2008 | Schwesig et al. |
| 2009/0006333 A1 | 1/2009 | Jones et al. |
| 2009/0013265 A1 | 1/2009 | Cole et al. |
| 2009/0094288 A1 | 4/2009 | Berry et al. |
| 2009/0150397 A1 | 6/2009 | Chen et al. |
| 2009/0165030 A1 | 6/2009 | Cronin |
| 2009/0193088 A1 | 7/2009 | Cervantes et al. |
| 2009/0262087 A1 | 10/2009 | Kim |
| 2009/0300540 A1 | 12/2009 | Russell |
| 2010/0017759 A1 | 1/2010 | Birnbaum et al. |
| 2010/0058244 A1 | 3/2010 | Wang |
| 2010/0153844 A1 | 6/2010 | Hwang et al. |
| 2010/0158097 A1 | 6/2010 | Pascal et al. |
| 2010/0235746 A1 | 9/2010 | Ansures |
| 2010/0241968 A1 | 9/2010 | Tarara et al. |
| 2010/0262666 A1 | 10/2010 | Kalu |
| 2010/0271366 A1 | 10/2010 | Sung et al. |
| 2010/0287241 A1 | 11/2010 | Swanburg et al. |
| 2011/0041086 A1 | 2/2011 | Kim et al. |
| 2011/0141031 A1 | 6/2011 | McCullough et al. |
| 2011/0179385 A1 | 7/2011 | Li et al. |
| 2011/0276904 A1 | 11/2011 | Mehin et al. |
| 2012/0050264 A1 | 3/2012 | Karaoguz et al. |
| 2012/0059787 A1 | 3/2012 | Brown et al. |
| 2012/0072856 A1 | 3/2012 | Park et al. |
| 2012/0105703 A1 | 5/2012 | Lee et al. |
| 2012/0110477 A1 | 5/2012 | Gaume |
| 2012/0185542 A1 | 7/2012 | Vyrros et al. |
| 2012/0190388 A1 | 7/2012 | Castleman et al. |
| 2012/0270578 A1 | 10/2012 | Feghali |
| 2012/0297348 A1 | 11/2012 | Santoro |
| 2012/0323878 A1 | 12/2012 | Jing et al. |
| 2013/0055112 A1 | 2/2013 | Joseph et al. |
| 2013/0069969 A1 | 3/2013 | Chang et al. |
| 2013/0093833 A1 | 4/2013 | Al-Asaaed et al. |
| 2013/0151603 A1 | 6/2013 | Lobb et al. |
| 2013/0190081 A1 | 7/2013 | Naik et al. |
| 2013/0225087 A1 | 8/2013 | Uhm |
| 2013/0254710 A1 | 9/2013 | Banti et al. |
| 2013/0297317 A1 | 11/2013 | Lee et al. |
| 2013/0297493 A1 | 11/2013 | Linden et al. |
| 2013/0329114 A1 | 12/2013 | Kim et al. |
| 2013/0332543 A1 | 12/2013 | Shin et al. |
| 2014/0006343 A1 | 1/2014 | Allison |
| 2014/0009475 A1 | 1/2014 | Setton et al. |
| 2014/0015782 A1 | 1/2014 | Kim et al. |
| 2014/0041056 A1 | 2/2014 | Stoop et al. |
| 2014/0047358 A1 | 2/2014 | Park et al. |
| 2014/0058939 A1 | 2/2014 | Savla |
| 2014/0082520 A1 | 3/2014 | Mamoun |
| 2014/0085487 A1 | 3/2014 | Park et al. |
| 2014/0087487 A1 | 3/2014 | Chen et al. |
| 2014/0122605 A1 | 5/2014 | Merom et al. |
| 2014/0136990 A1 | 5/2014 | Gonnen et al. |
| 2014/0143355 A1 | 5/2014 | Berdis et al. |
| 2014/0143684 A1 | 5/2014 | Oh et al. |
| 2014/0173460 A1 | 6/2014 | Kim |
| 2014/0196026 A1 | 7/2014 | Seo et al. |
| 2014/0229165 A1 | 8/2014 | Lee |
| 2014/0237057 A1 | 8/2014 | Khodorenko |
| 2014/0279068 A1 | 9/2014 | Systrom et al. |
| 2014/0279418 A1 | 9/2014 | Rubinstein et al. |
| 2014/0297254 A1 | 10/2014 | Yeo et al. |
| 2014/0331149 A1 | 11/2014 | Labey |
| 2014/0340470 A1 | 11/2014 | Perez et al. |
| 2014/0344726 A1 | 11/2014 | He et al. |
| 2014/0351350 A1 | 11/2014 | Lee et al. |

(56) References Cited

U.S. PATENT DOCUMENTS

| | | |
|---|---|---|
| 2014/0365923 A1 | 12/2014 | Lee et al. |
| 2014/0372540 A1 | 12/2014 | Libin |
| 2014/0372541 A1 | 12/2014 | Feghali |
| 2015/0038235 A1 | 2/2015 | Kamekawa |
| 2015/0042852 A1 | 2/2015 | Lee et al. |
| 2015/0050993 A1 | 2/2015 | Blayer et al. |
| 2015/0058754 A1 | 2/2015 | Rauh |
| 2015/0062052 A1 | 3/2015 | Bernstein et al. |
| 2015/0067496 A1 | 3/2015 | Missig et al. |
| 2015/0067519 A1 | 3/2015 | Missig et al. |
| 2015/0067596 A1 | 3/2015 | Brown et al. |
| 2015/0074209 A1 | 3/2015 | Liu et al. |
| 2015/0082201 A1 | 3/2015 | Sung et al. |
| 2015/0088699 A1 | 3/2015 | Rubinstein et al. |
| 2015/0089389 A1 | 3/2015 | Cohen-Zur et al. |
| 2015/0094106 A1 | 4/2015 | Grossman et al. |
| 2015/0095801 A1 | 4/2015 | Kim |
| 2015/0121190 A1 | 4/2015 | Miyamoto et al. |
| 2015/0121255 A1 | 4/2015 | Lee |
| 2015/0135125 A1 | 5/2015 | Bhatt |
| 2015/0160832 A1 | 6/2015 | Walkin et al. |
| 2015/0172584 A1 | 6/2015 | Park et al. |
| 2015/0188861 A1 | 7/2015 | Esplin et al. |
| 2015/0220774 A1 | 8/2015 | Ebersman et al. |
| 2015/0222586 A1 | 8/2015 | Ebersman et al. |
| 2015/0268766 A1 | 9/2015 | Kim et al. |
| 2015/0268780 A1 | 9/2015 | Kim et al. |
| 2015/0268826 A1 | 9/2015 | Langholz |
| 2015/0281145 A1 | 10/2015 | Ji |
| 2015/0309720 A1 | 10/2015 | Fisher |
| 2015/0312176 A1 | 10/2015 | Jones et al. |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0319569 A1 | 11/2015 | Chen et al. |
| 2015/0324858 A1 | 11/2015 | DeMattei |
| 2015/0331550 A1 | 11/2015 | Wang et al. |
| 2015/0334075 A1 | 11/2015 | Wang et al. |
| 2015/0347748 A1 | 12/2015 | Krstic et al. |
| 2015/0350141 A1 | 12/2015 | Yang et al. |
| 2015/0350147 A1 | 12/2015 | Shepherd et al. |
| 2015/0379336 A1 | 12/2015 | Hoshi et al. |
| 2016/0006856 A1 | 1/2016 | Bruno |
| 2016/0014059 A1 | 1/2016 | Rathod |
| 2016/0018895 A1 | 1/2016 | Sidi et al. |
| 2016/0027443 A1 | 1/2016 | Terrell, II et al. |
| 2016/0034977 A1 | 2/2016 | Bhaowal et al. |
| 2016/0035123 A1 | 2/2016 | Bonansea |
| 2016/0043974 A1 | 2/2016 | Purcell et al. |
| 2016/0050165 A1 | 2/2016 | Thomas et al. |
| 2016/0062574 A1 | 3/2016 | Anzures et al. |
| 2016/0077793 A1 | 3/2016 | Disano et al. |
| 2016/0080296 A1 | 3/2016 | Lewis et al. |
| 2016/0080297 A1 | 3/2016 | Le Huerou et al. |
| 2016/0092035 A1 | 3/2016 | Crocker et al. |
| 2016/0094504 A1 | 3/2016 | Cinar et al. |
| 2016/0103564 A1 | 4/2016 | Chao |
| 2016/0110714 A1 | 4/2016 | Norland |
| 2016/0110907 A1 | 4/2016 | Kelly et al. |
| 2016/0117299 A1 | 4/2016 | Hynes |
| 2016/0117665 A1 | 4/2016 | Davis |
| 2016/0117670 A1 | 4/2016 | Davis |
| 2016/0149838 A1 | 5/2016 | Jeong et al. |
| 2016/0156584 A1 | 6/2016 | Hum et al. |
| 2016/0164811 A1 | 6/2016 | Guthery et al. |
| 2016/0202889 A1 | 7/2016 | Shin et al. |
| 2016/0259526 A1 | 9/2016 | Lee et al. |
| 2016/0259528 A1 | 9/2016 | Foss et al. |
| 2016/0274720 A1 | 9/2016 | Shin |
| 2016/0279523 A1 | 9/2016 | Altagar et al. |
| 2016/0283984 A1 | 9/2016 | Rabbat et al. |
| 2016/0286028 A1 | 9/2016 | Ahuja et al. |
| 2016/0291822 A1 | 10/2016 | Ahuja |
| 2016/0301641 A1 | 10/2016 | Belliston |
| 2016/0323213 A1 | 11/2016 | Hong et al. |
| 2016/0334972 A1 | 11/2016 | Cheng et al. |
| 2016/0352887 A1 | 12/2016 | Na et al. |
| 2017/0050114 A1 | 2/2017 | Luo et al. |
| 2017/0054662 A1 | 2/2017 | Crocker et al. |
| 2017/0060354 A1 | 3/2017 | Luo et al. |
| 2017/0064207 A1 | 3/2017 | Kim et al. |
| 2017/0083174 A1 | 3/2017 | Tobens, III et al. |
| 2017/0083210 A1 | 3/2017 | Parker et al. |
| 2017/0102912 A1 | 4/2017 | Jambulingam et al. |
| 2017/0109013 A1 | 4/2017 | Hong |
| 2017/0147185 A1 | 5/2017 | Milvaney et al. |
| 2017/0269800 A1 | 9/2017 | Park et al. |
| 2017/0286913 A1 | 10/2017 | Liu et al. |
| 2017/0308289 A1 | 10/2017 | Kim |
| 2017/0322693 A1 | 11/2017 | Zhang |
| 2017/0339085 A1 | 11/2017 | Judd et al. |
| 2017/0359703 A1 | 12/2017 | Ciechanowski et al. |
| 2018/0124190 A1 | 5/2018 | Ji |
| 2018/0295092 A1 | 10/2018 | Peiris et al. |
| 2018/0351903 A1 | 12/2018 | Allen et al. |
| 2018/0373683 A1 | 12/2018 | Hullette et al. |
| 2019/0087082 A1 | 3/2019 | Chaudhri et al. |
| 2020/0029181 A1 | 1/2020 | Ciechanowski et al. |
| 2020/0034033 A1 | 1/2020 | Chaudhri et al. |
| 2020/0133478 A1 | 4/2020 | Chaudhri et al. |
| 2020/0183577 A1 | 6/2020 | Chaudhri et al. |
| 2021/0096736 A9 | 4/2021 | Chaudhri et al. |
| 2021/0247898 A1 | 8/2021 | Chaudhri et al. |
| 2022/0150195 A1 | 5/2022 | Chaudhri et al. |
| 2022/0179553 A1 | 6/2022 | Chaudhri et al. |

FOREIGN PATENT DOCUMENTS

| | | |
|---|---|---|
| CN | 101853132 A | 10/2010 |
| CN | 101931621 A | 12/2010 |
| CN | 102170442 A | 8/2011 |
| CN | 102664832 A | 9/2012 |
| CN | 102970213 A | 3/2013 |
| CN | 103748610 A | 4/2014 |
| CN | 103914261 A | 7/2014 |
| CN | 103918290 A | 7/2014 |
| CN | 104462128 A | 3/2015 |
| CN | 104487929 A | 4/2015 |
| CN | 104601812 A | 5/2015 |
| CN | 104699378 A | 6/2015 |
| CN | 105119812 A | 12/2015 |
| CN | 105407033 A | 3/2016 |
| CN | 105407273 A | 3/2016 |
| CN | 105427087 A | 3/2016 |
| CN | 105791536 A | 7/2016 |
| CN | 106255989 A | 12/2016 |
| CN | 107924256 A | 4/2018 |
| CN | 108762862 A | 11/2018 |
| DE | 202015003860 | 10/2015 |
| EP | 1 475 939 A1 | 11/2004 |
| EP | 2 475 137 A2 | 7/2012 |
| EP | 2 544 431 A1 | 1/2013 |
| EP | 2 667 339 A1 | 11/2013 |
| EP | 2 712 165 A1 | 3/2014 |
| EP | 2 713 323 A1 | 4/2014 |
| EP | 2 779 580 A1 | 9/2014 |
| EP | 2 779 708 A1 | 9/2014 |
| EP | 2 806 620 A1 | 11/2014 |
| EP | 2 879 037 A1 | 6/2015 |
| EP | 2 940 570 A1 | 11/2015 |
| EP | 2 988 568 A1 | 2/2016 |
| JP | 2004-503004 A | 1/2004 |
| JP | 2010-277588 A | 12/2010 |
| JP | 2015-534664 A | 12/2015 |
| KR | 20090065098 A | 6/2009 |
| KR | 20110131941 A | 12/2011 |
| KR | 101130381 B1 | 3/2012 |
| KR | 20120107836 A | 10/2012 |
| KR | 20130050871 A | 5/2013 |
| KR | 20130125274 A | 11/2013 |
| KR | 20140000931 A | 1/2014 |
| KR | 20140020112 A | 2/2014 |
| KR | 20140035160 A | 3/2014 |
| KR | 20140078031 A | 6/2014 |

(56) References Cited

FOREIGN PATENT DOCUMENTS

| KR | 20150010436 A | 1/2015 |
|---|---|---|
| KR | 101567555 B1 | 11/2015 |
| KR | 20160050599 A | 5/2016 |
| WO | WO 2004/079530 A2 | 9/2004 |
| WO | WO 2009/039758 A1 | 4/2009 |
| WO | WO 2011/085248 A1 | 7/2011 |
| WO | WO 2011/150860 A1 | 12/2011 |
| WO | WO 2012/061318 A1 | 5/2012 |
| WO | WO 2012/178121 A1 | 12/2012 |
| WO | WO 2014/038790 A1 | 3/2014 |
| WO | WO 2014/103046 A1 | 7/2014 |
| WO | WO 2015/032284 A1 | 3/2015 |
| WO | WO 2015/050966 A1 | 4/2015 |
| WO | WO 2015/090137 A1 | 6/2015 |
| WO | WO 2015/139528 A1 | 9/2015 |
| WO | WO 2015/162072 A2 | 10/2015 |
| WO | WO 2015/167589 A1 | 11/2015 |
| WO | WO 2015/175240 A1 | 11/2015 |
| WO | WO 2015/183456 A1 | 12/2015 |
| WO | WO 2015/183699 A1 | 12/2015 |
| WO | WO 2015/183756 A1 | 12/2015 |
| WO | WO 2015/186534 A1 | 4/2017 |

OTHER PUBLICATIONS

Intent to Grant, dated Jun. 3, 2022, received in European Patent Application No. 19180887.2, which corresponds with U.S. Appl. No. 15/272,424, 8 pages.
Decision to Grant, dated Jun. 17, 2022, received in European Patent Application No. 19218201.2, which corresponds with U.S. Appl. No. 16/732,184, 3 pages.
Final Office Action, dated Jun. 27, 2022, received in U.S. Appl. No. 17/242,157, 9 pages.
Office Action, dated Jun. 16, 2022, received in Danish Patent Application No. 2020-70483, which corresponds with U.S. Appl. No. 17/242,157, 6 pages.
Office Action, dated Jul. 7, 2022, received in U.S. Appl. No. 17/584,283, 9 pages.
Hall, "Thanks for the Memory", Linux, Apr. 12, 2009, 12 pages.
Office Action, dated May 1, 2019, received in Taiwanese Patent Application No. 106118670, 6 pages.
Office Action, dated Feb. 17, 2017, received in U.S. Appl. No. 15/272,399, 13 pages.
Final Office Action, dated Jul. 28, 2017, received in U.S. Appl. No. 15/272,399, 19 pages.
Notice of Allowance, dated Dec. 20, 2017, received in U.S. Appl. No. 15/272,399, 8 pages.
Office Action, dated Sep. 6, 2016, received in Danish Patent Application No. 201670636, which corresponds with U.S. Appl. No. 15/272,399, 1 page.
Office Action, dated Jun. 23, 2017, received in Danish Patent Application No. 201670636, which corresponds with U.S. Appl. No. 15/272,399, 4 pages.
Office Action, dated Nov. 22, 2018, received in Danish Patent Application No. 201670636, which corresponds with U.S. Appl. No. 15/272,399, 3 pages.
Patent, dated Jul. 13, 2020, received in Danish Patent Application No. 201670636, which corresponds with U.S. Appl. No. 15/272,399, 4 pages.
Office Action, dated Jun. 27, 2016, received in Danish Patent Application No. 201670641, which corresponds with U.S. Appl. No. 15/272,399, 4 pages.
Office Action, dated Jun. 6, 2018, received in Danish Patent Application No. 201670641, which corresponds with U.S. Appl. No. 15/272,399, 5 pages.
Office Action, dated Jan. 9, 2019, received in Danish Patent Application No. 201670641, which corresponds with U.S. Appl. No. 15/272,399, 5 pages.
Office Action, dated Oct. 29, 2019, received in Danish Patent Application No. 201670641, which corresponds with U.S. Appl. No. 15/272,399, 5 pages.
Office Action, dated Jan. 27, 2017, received in Danish Patent Application No. 201670642, which corresponds with U.S. Appl. No. 15/272,399, 10 pages.
Office Action, dated Jun. 13, 2018, received in Danish Patent Application No. 201670642, which corresponds with U.S. Appl. No. 15/272,399, 3 pages.
Patent, dated Jul. 22, 2019, received in Danish Patent Application No. 201670642, which corresponds with U.S. Appl. No. 15/272,399, 4 pages.
Office Action, dated Sep. 14, 2017, 2017, received in Danish Patent Application No. 201670647, which corresponds with U.S. Appl. No. 15/272,399, 4 pages.
Office Action, dated Jul. 5, 2018, received in Danish U.S. Appl. No. 15/272,399 (7316DK03), which corresponds with U.S. Appl. No. 15/272,399, 4 pages.
Patent, dated Jul. 22, 2019, received in Danish Patent Application No. 201670647, which corresponds with U.S. Appl. No. 15/272,399, 6 pages.
Office Action, dated Oct. 20, 2016, received in Danish Patent Application No. 201670647, which corresponds with U.S. Appl. No. 15/272,399, 8 pages.
Office Action, dated May 15, 2017, received in Danish Patent Application No. 201670648, which corresponds with U.S. Appl. No. 15/272,399, 2 pages.
Patent, dated May 22, 2018, received in Danish Patent Application No. 201670648, which corresponds with U.S. Appl. No. 15/272,399, 3 pages.
Office Action, dated Oct. 28, 2016, received in Danish Patent Application No. 201670649, which corresponds with U.S. Appl. No. 15/272,399, 8 pages.
Office Action, dated Mar. 13, 2017, received in Danish Patent Application No. 201670649, which corresponds with U.S. Appl. No. 15/272,399, 2 pages.
Grant, dated Jul. 13, 2017, received in Danish Patent Application No. 201670649, which corresponds with U.S. Appl. No. 15/272,399, 2 pages.
Patent, dated Jan. 2, 2018, received in Danish Patent Application No. 201670649, which corresponds with U.S. Appl. No. 15/272,399, 4 pages.
Office Action, dated Oct. 14, 2016, received in Danish Patent Application No. 201670650, which corresponds with U.S. Appl. No. 15/272,399, 11 pages.
Office Action, dated Mar. 7, 2017, received in Danish Patent Application No. 201670650, which corresponds with U.S. Appl. No. 15/272,399, 3 pages.
Patent, dated Dec. 7, 2018, received in Danish Patent Application No. 201670650, which corresponds with U.S. Patent Application No. 15/272,399, 5 pages.
Office Action, dated Jul. 11, 2017, received in Danish Patent Application No. 201670652, which corresponds with U.S. Appl. No. 15/272,399, 4 pages.
Office Action, dated Oct. 31, 2018, received in Danish Patent Application No. 201670652, which corresponds with U.S. Appl. No. 15/272,399, 5 pages.
Office Action, dated Sep. 6, 2019, received in Danish Patent Application No. 201670652, which corresponds with U.S. Appl. No. 15/272,399, 4 pages.
Office Action, dated Apr. 27, 2020, received in Danish Patent Application No. 201670652, which corresponds with U.S. Appl. No. 15/272,399, 5 pages.
Intention to Grant, dated Feb. 9, 2021, received in Danish Patent Application No. 201670652, which corresponds with U.S. Appl. No. 15/272,399, 2 pages.
Office Action, dated May 5, 2021, received in Danish Patent Application No. 201670652, which corresponds with U.S. Appl. No. 15/272,399, 2 pages.
Office Action, dated Jul. 6, 2017, received in Danish Patent Application No. 201670653, which corresponds with U.S. Appl. No. 15/272,399, 5 pages.

(56) References Cited

OTHER PUBLICATIONS

Office Action, dated Dec. 14, 2016, received in Danish Patent Application No. 201670653, which corresponds with U.S. Appl. No. 15/272,399, 6 pages.
Patent, dated Jul. 14, 2020, received in Danish Patent Application No. 201670653, which corresponds with U.S. Appl. No. 15/272,399, 4 pages.
Patent, dated May 8, 2019, received in Danish Patent Application No. 201670654, which corresponds with U.S. Appl. No. 15/272,399, 4 pages.
Patent, dated Jul. 22, 2019, received in Danish Patent Application No. 201670655, which corresponds with U.S. Appl. No. 15/272,399, 6 pages.
Office Action, dated Jul. 11, 2019, received in U.S. Appl. No. 15/272,402, 40 pages.
Final Office Action, dated Jan. 24, 2020, received in U.S. Appl. No. 15/272,402, 39 pages.
Office Action, dated Apr. 16, 2020, received in U.S. Appl. No. 15/272,402, 42 pages.
Notice of Allowance, dated Oct. 8, 2020, received in U.S. Appl. No. 15/272,402, 42 pages.
Office Action, dated Jul. 25, 2019, received in Korean Patent Application No. 2019-7003574, which corresponds with U.S. Appl. No. 15/272,402, 10 pages.
Office Action, dated Feb. 26, 2020, received in Korean Patent Application No. 2019-7003574, which corresponds with U.S. Appl. No. 15/272,402, 3 pages.
Notice of Allowance, dated Apr. 9, 2020, received in Korean Patent Application No. 2019-7003574, which corresponds with U.S. Appl. No. 15/272,402, 5 pages.
Patent, dated Jul. 9, 2020, received in Korean Patent Application No. 2019-7003574, which corresponds with U.S. Appl. No. 15/272,402, 5 pages.
Office Action, dated Jul. 22, 2019, received in U.S. Appl. No. 15/272,411, 25 pages.
Final Office Action, dated Feb. 3, 2020, received in U.S. Appl. No. 15/272,411, 30 pages.
Office Action, dated Apr. 8, 2020, received in U.S. Appl. No. 15/272,411, 35 pages.
Final Office Action, dated Oct. 29, 2020, received in U.S. Appl. No. 15/272,411, 30 pages.
Office Action, dated Jan. 25, 2021, received in U.S. Appl. No. 15/272,411, 46 pages.
Notice of Allowance, dated May 5, 2021, received in U.S. Appl. No. 15/272,411, 5 pages.
Office Action, dated May 11, 2020, received in Chinese Patent Application No. 201910607635.0, which corresponds with U.S. Appl. No. 15/272,411, 13 pages.
Office Action, dated Dec. 10, 2020, received in Chinese Patent Application No. 201910607635.0, which corresponds with U.S. Appl. No. 15/272,411, 10 pages.
Office Action, dated Mar. 29, 2021, received in Chinese Patent Application No. 201910607635.0, which corresponds with U.S. Appl. No. 15/272,411, 1 page.
Office Action, dated Jan. 9, 2020, received in European Patent Application No. 19181254.4, which corresponds with U.S. Appl. No. 15/272,411, 6 pages.
Office Action, dated Jul. 15, 2020, received in European Patent Application No. 19181254.4, which corresponds with U.S. Appl. No. 15/272,411, 7 pages.
Decision to Grant, dated May 28, 2021, received in European Patent Application No. 19181254.4, which corresponds with U.S. Appl. No. 15/272,411, 2 pages.
Patent, dated Jul. 6, 2021, received in European Patent Application No. 19181254.4, which corresponds with U.S. Appl. No. 15/272,411, 2 pages.
Office Action, dated Oct. 29, 2021, Received in Indian Patent Application No. 201918025818, which corresponds with U.S. Appl. No. 15/272,411, 8 pages.

Office Action, dated Sep. 11, 2020, received in Japanese Patent Application No. 2019-106495, which corresponds with U.S. Appl. No. 15/272,411, 7 pages.
Notice of Allowance, dated Feb. 5, 2021, received in Japanese Patent Application No. 2019-106495, which corresponds with U.S. Appl. No. 15/272,411, 2 pages.
Patent, dated Mar. 11, 2021, received in Japanese Patent Application No. 6851115, which corresponds with U.S. Appl. No. 15/272,411, 3 pages.
Office Action, dated Oct. 7, 2019, received in Korean Patent Application No. 2019-7019197, which corresponds with U.S. Appl. No. 15/272,411, 4 pages.
Notice of Allowance, dated Feb. 25, 2020, received in Korean Patent Application No. 2019-7019197, which corresponds with U.S. Appl. No. 15/272,411, 5 pages.
Patent, dated Mar. 13, 2020, received in Korean Patent Application No. 2019-7019197, which corresponds with U.S. Appl. No. 15/272,411, 5 pages.
Office Action, dated Mar. 7, 2019, received in U.S. Appl. No. 15/272,416, 29 pages.
Final Office Action, dated Aug. 7, 2019, received in U.S. Appl. No. 15/272,416, 25 pages.
Office Action, dated Jan. 10, 2020, received in U.S. Appl. No. 15/272,416, 27 pages.
Final Office Action, dated May 14, 2020, received in U.S. Appl. No. 15/272,416, 30 pages.
Office Action, dated Septembers, 2020, received in U.S. Appl. No. 15/272,416, 31 pages.
Final Office Action, dated Mar. 3, 2021, received in U.S. Appl. No. 15/272,416, 42 pages.
Notice of Allowance, dated Aug. 6, 2021, received in U.S. Appl. No. 15/272,416, 19 pages.
Notice of Allowance, dated Jan. 6, 2022, received in U.S. Appl. No. 15/272,416, 45 pages.
Office Action, dated Jul. 22, 2019, received in U.S. Appl. No. 15/272,419, 21 pages.
Final Office Action, dated Mar. 3, 2020, received in U.S. Appl. No. 15/272,419, 21 pages.
Office Action, dated Jul. 15, 2020, received in U.S. Appl. No. 15/272,419, 28 pages.
Final Office Action, dated Jan. 25, 2021, received in U.S. Appl. No. 15/272,419, 32 pages.
Notice of Allowance, dated Apr. 13, 2022, received in U.S. Appl. No. 15/272,419, 7 pages.
Office Action, dated Jun. 12, 2018, received in Chinese Patent Application No. 201810396354.0, which corresponds with U.S. Appl. No. 15/272,429, 1 page.
Office Action, dated May 7, 2019, received in Chinese Patent Application No. 201810396354.0, which corresponds with U.S. Appl. No. 15/272,429, 6 pages.
Notice of Allowance, dated Apr. 26, 2020, received in Chinese Patent Application No. 201810396354.0, which corresponds with U.S. Appl. No. 15/272,429, 3 pages.
Patent, dated Jun. 19, 2020, received in Chinese Patent Application No. 201810396354.0, which corresponds with U.S. Appl. No. 15/272,429, 8 pages.
Office Action, dated Sep. 6, 2018, received in European Patent Application No. 18167254.4, which corresponds with U.S. Appl. No. 15/272,419, 6 pages.
Office Action, dated Feb. 6, 2020, received in European Patent Application No. 18167254.4, which corresponds with U.S. Appl. No. 15/272,419, 9 pages.
Intent to Grant, dated Dec. 17, 2021, received in European Patent Application No. 18167254.4, which corresponds with U.S. Appl. No. 15/272,419, 18 pages.
Office Action, dated May 8, 2019, received in U.S. Appl. No. 15/272,421, 13 pages.
Notice of Allowance, dated Nov. 6, 2019, received in U.S. Appl. No. 15/272,421, 15 pages.
Office Action, dated May 10, 2019, received in Australian Patent Application No. 2017266930, which corresponds with U.S. Appl. No. 15/272,421, 3 pages.

(56) References Cited

OTHER PUBLICATIONS

Certificate of Grant, dated Aug. 27, 2020, received in Australian Patent Application No. 2017266930, which corresponds with U.S. Appl. No. 15/272,421, 4 pages.
Office Action, dated Mar. 3, 2020, received in Chinese Patent Application No. 201780002856.4, which corresponds with U.S. Appl. No. 15/272,421, 3 pages.
Notice of Allowance, dated Sep. 3, 2020, received in Chinese Patent Application No. 201780002856.4, which corresponds with U.S. Appl. No. 15/272,421, 8 pages.
Patent, dated Nov. 10, 2020, received in Chinese Patent Application No. 201780002856.4, which corresponds with U.S. Appl. No. 15/272,421, 7 pages.
Office Action, dated May 24, 2018, received in European Patent Application No. 17728317.3, which corresponds with U.S. Appl. No. 15/272,421, 3 pages.
Office Action, dated Dec. 17, 2018, received in European Patent Application No. 17728317.3, which corresponds with U.S. Appl. No. 15/272,421, 11 pages.
Office Action, dated Jun. 27, 2019, received in European Patent Application No. 17728317.3, which corresponds with U.S. Appl. No. 15/272,421, 6 pages.
Oral Summons, dated Jan. 27, 2020, received in European Patent Application No. 17728317.3, which corresponds with U.S. Appl. No. 15/272,421, 10 pages.
Intention to Grant, dated Oct. 21, 2020, received in European Patent Application No. 17728317.3, which corresponds with U.S. Appl. No. 15/272,421, 10 pages.
Intention to Grant, dated Aug. 4, 2021, received in European Patent Application No. 17728317.3, which corresponds with U.S. Appl. No. 15/272,421, 9 pages.
Patent, dated Oct. 5, 2021, received in European Patent Application No. 17728317.3, which corresponds with U.S. Appl. No. 15/272,421, 4 pages.
Office Action, dated Jul. 29, 2021, received in Indian Patent Application No. 201817042675, which corresponds with U.S. Appl. No. 17/272,421, 7 pages.
Office Action, dated May 13, 2019, received in Japanese Patent Application No. 2018510791, which corresponds with U.S. Appl. No. 15/272,421, 4 pages.
Patent, dated Jun. 14, 2019, received in Japanese Patent Application No. 2018510791, which corresponds with U.S. Appl. No. 15/272,421, 3 pages.
Office Action, dated Mar. 13, 2018, received in Korean Patent Application No. 2018-7003537, which corresponds with U.S. Appl. No. 15/272,421, 2 pages.
Patent, dated Feb. 1, 2019, received in Korean Patent Application No. 2018-7003537, which corresponds with U.S. Appl. No. 15/272,421, 5 pages.
Office Action, dated Aug. 15, 2019, received in U.S. Appl. No. 15/272,424, 12 pages.
Final Office Action, dated Jan. 8, 2020, received in U.S. Appl. No. 15/272,424, 7 pages.
Office Action, dated May 12, 2020, received in U.S. Appl. No. 15/272,424, 15 pages.
Notice of Allowance, dated Sep. 18, 2020, received in U.S. Appl. No. 15/272,424, 8 pages.
Office Action, dated May 15, 2020, received in Chinese Patent Application No. 201910607633.1, which corresponds with U.S. Appl. No. 15/272,424, 5 pages.
Notice of Allowance, dated Dec. 28, 2020, received in Chinese Patent Application No. 201910607633.1, which corresponds with U.S. Appl. No. 15/272,424, 6 pages.
Patent, dated Mar. 12, 2021, received in Chinese Patent Application No. 201910607633.1, which corresponds with U.S. Appl. No. 15/272,424, 7 pages.
Office Action, dated Jan. 30, 2020, received in European Patent Application No. 19180887.2, which corresponds with U.S. Appl. No. 15/727,424, 5 pages.

Office Action, dated Apr. 29, 2021, received in European Patent Application No. 19180887.2, which corresponds with U.S. Appl. No. 15/272,424, 6 pages.
Office Action, dated Jul. 3, 2018, received in U.S. Appl. No. 15/272,429, 25 pages.
Notice of Allowance, dated Jan. 14, 2019, received in U.S. Appl. No. 15/272,429, 8 pages.
Office Action, dated Jun. 12, 2018, received in Chinese Patent Application No. 201810396289.1, which corresponds with U.S. Appl. No. 15/272,429, 2 pages.
Office Action, dated Dec. 14, 2020, received in Chinese Patent Application No. 201810396289.1, which corresponds with U.S. Appl. No. 15/272,429, 5 Pages.
Notice of Allowance, dated Sep. 3, 2021, received in Chinese Patent Application No. 201810396289.1, which corresponds with U.S. Appl. No. 15/272,429, 1 page.
Patent, dated Nov. 5, 2021, received in Chinese Patent Application No. 201810396289.1, which corresponds with U.S. Appl. No. 15/272,429, 7 pages.
Office Action, dated Jul. 10, 2018, received in U.S. Appl. No. 15/272,430, 16 pages.
Notice of Allowance, dated Nov. 7, 2018, received in U.S. Appl. No. 15/272,430, 7 pages.
Office Action, dated Mar. 20, 2020, received in U.S. Appl. No. 16/194,237, 11 pages.
Office Action, dated Sep. 9, 2020, received in U.S. Appl. No. 16/194,237, 7 pages.
Office Action, dated Feb. 11, 2021, received in U.S. Appl. No. 16/544,787, 18 pages.
Notice of Allowance, dated Sep. 1, 2021, received in U.S. Appl. No. 16/544,787, 9 pages.
Office Action, dated Jun. 19, 2020, received in Chinese Patent Application No. 2019106074478, which corresponds with U.S. Appl. No. 16/544,787, 5 pages.
Office Action, dated Jan. 11, 2021, received in Chinese Patent Application No. 2019106074478, which corresponds with U.S. Appl. No. 16/544,787, 2 pages.
Office Action, dated Jun. 4, 2021, received in Chinese Patent Application No. 2019106074478, which corresponds with U.S. Appl. No. 16/544,787, 1 page.
Notice of Allowance, dated Oct. 11, 2021, received in Chinese Patent Application No. 2019106074478, which corresponds with U.S. Appl. No. 16/544,787, 4 pages.
Patent, Nov. 2, 2021, received in Chinese Patent Application No. 2019106074478, which corresponds with U.S. Appl. No. 16/544,787, 7 pages.
Office Action, dated Mar. 25, 2020, received in Chinese Patent Application No. 2019106076346, dated Mar. 25, 2020, 5 pages.
Office Action, dated Sep. 1, 2020, received in Chinese Patent Application No. 2019106076346, dated Mar. 25, 2020, 8 pages.
Office Action, dated Apr. 2, 2021, received in Chinese Patent Application No. 2019106076346, dated Mar. 25, 2020, 2 pages.
Office Action, dated Jun. 11, 2021, received in U.S. Appl. No. 16/732,184, 18 pages.
Final Office Action, dated Oct. 13, 2021, received in U.S. Appl. No. 16/732,184, 18 pages.
Certificate of Grant, dated May 21, 2020, received in Australian Patent Application No. 2019283863, which corresponds with U.S. Appl. No. 16/732,184, 3 pages.
Office Action, dated Oct. 14, 2020, received in Chinese Patent Application No. 201911387675.5, which corresponds with U.S. Appl. No. 16/732,184, 10 pages.
Office Action, dated Jul. 2, 2021, received in Chinese Patent Application No. 201911387675.5, which corresponds with U.S. Appl. No. 16/732,184, 1 page.
Notice of Allowance, Nov. 3, 2021, received in Chinese Patent Application No. 201911387675.5, which corresponds with U.S. Appl. No. 16/732,184, 4 pages.
Patent, dated Jan. 25, 2022, received in Chinese Patent Application No. 201911387675.5, which corresponds with U.S. Appl. No. 16/732,184, 7 pages.

(56) References Cited

OTHER PUBLICATIONS

Office Action, dated Apr. 14, 2020, received in European Patent Application No. 19218201.2, which corresponds with U.S. Appl. No. 16/732,184, 6 pages.
Intention to Grant, dated Nov. 9, 2021, received in European Patent Application No. 19218201.2, which corresponds with U.S. Appl. No. 16/732,184, 9 pages.
Notice of Allowance, dated Apr. 27, 2020, received in Japanese Patent Application No. 2019-218615, which corresponds with U.S. Appl. No. 16/732,184, 5 pages.
Patent, dated May 29, 2020, received in Japanese Patent Application No. 2019-218615, which corresponds with U.S. Appl. No. 16/732,184, 4 pages.
Office Action, dated Feb. 17, 2020, received in Korean Patent Application No. 2019-7036410, which corresponds with U.S. Appl. No. 16/732,184, 3 pages.
Notice of Allowance, dated Jul. 28, 2020, received in Korean Patent Application No. 2019-7036410, which corresponds with U.S. Appl. No. 16/732,184, 5 pages.
Patent, dated Oct. 27, 2020, received in Korean Patent Application No. 2019-7036410, which corresponds with U.S. Appl. No. 16/732,184, 5 pages.
Notice of Allowance, dated May 5, 2021, received in U.S. Appl. No. 16/789,335, 8 pages.
Office Action, dated Jan. 18, 2021, received in Australian Patent Application No. 2020202396, which corresponds with U.S. Appl. No. 16/789,335, 3 pages.
Notice of Acceptance, dated Oct. 8, 2021, received in Australian Patent Application No. 2020202396, which corresponds with U.S. Appl. No. 16/789,335, 3 pages.
Patent, dated Feb. 10, 2022, received in Australian Patent Application No. 2020202396, which corresponds with U.S. Appl. No. 16/789,335, 3 pages.
Office Action, dated Feb. 24, 2022, received in U.S. Appl. No. 17/242,157, 8 pages.
Office Action, dated Dec. 4, 2020, received in Danish Patent Application No. 2020-70483, which corresponds with U.S. Appl. No. 17/242,157, 9 pages.
Office Action, dated Sep. 23, 2021, Dec. 4, 2020, received in Danish Patent Application No. 2020-70483, which corresponds with U.S. Appl. No. 17/242,157, 4 pages.
Office Action, dated May 28, 2021, received in Japanese Patent Application No. 2020-092417, which corresponds with U.S. Appl. No. 17/242,157, 2 pages.
Notice of Allowance, dated Sep. 24, 2021, received in Japanese Patent Application No. 2020-092417, which corresponds with U.S. Appl. No. 17/242,157, 2 pages.
Patent, dated Oct. 26, 2021, received in Japanese Patent Application No. 2020-092417, which corresponds with U.S. Appl. No. 17/242,157, 3 pages.
Office Action, dated Oct. 5, 2020, received in Korean Patent Application No. 2020-7019976, which corresponds with U.S. Appl. No. 17/242,157, 4 pages.
Office Action, dated Jul. 29, 2021, received in Korean Patent Application No. 2020-7019976, which corresponds with U.S. Appl. No. 17/242,157, 3 pages.
Notice of Allowance, dated Sep. 7, 2021, received in Korean Patent Application No. 2020-7019976, which corresponds with U.S. Appl. No. 17/242,157, 2 pages.
Patent, dated Dec. 7, 2021, received in Korean Patent Application No. 2020-7019976, which corresponds with U.S. Appl. No. 17/242,157, 6 pages.
Office Action, dated Mar. 298, 2022, received in Korean Patent Application No. 2021-7040161, which corresponds with U.S. Appl. No. 17/584,283, 7 pages.
Office Action, dated May 10, 2018, received in U.S. Appl. No. 15/400,780, 5 pages.
Notice of Allowance, dated Mar. 13, 2019, received in U.S. Appl. No. 15/400,780, 5 pages.

International Search Report and Written Opinion, dated Sep. 15, 2017, received in International Patent Application No. PCT/US2017/033396, which corresponds with U.S. Appl. No. 15/272,399, 16 pages.
European Search Report, dated Jul. 27, 2018, received in European Patent Application No. 18167254.4, which corresponds with U.S. Appl. No. 15/272,419, 6 pages.
European Search Report, dated Jan. 13, 2020, received in European Patent Application No. 19180887.2, which corresponds with U.S. Appl. No. 15/272,424, 4 pages.
Extended European Search Report, dated Mar. 30, 2020, received in 19218201.2, which corresponds with U.S. Appl. No. 16/732,184, 5 pages.
Aube, "No UI Is The New UI", 24. http://techcrunch.com/2015/11/11/no-ui-is-the-new-ui/#.uqjfwxj:bXE2, Nov. 11, 2015, 13 pages.
Benjamin, "How to Use Facebook Sticker in iMessage Conversations," https://www.youtube.com/watch?v=XKCbtPEOIVc, Feb. 20, 2015, 6 pages.
Bolluyt, "What We Hate (and Love) About Chat Apps", https://www.cheatsheet.com/technlogy/why-new-features-make-us-love-and-hate-messaging-app.html, Apr. 16, 2015, 6 pages.
Buhr et al., "You Can Now Order Ubers (And Soon Lyfts) in Facebook Messenger to Prove You're On Your Way", http://techcrunch.com/2015/12/16/facebook-messenger-transportation/#.yzzjjjr:g3wc, Dec. 16, 2015, 10 pages.
Chan, "When One App Rules Them All: The Case of WeChat and Mobile in China", https://modernmoneynetwork.org/resourse/when-one-app-rules-them-all-case-wechat-and-mobile-in-china, Aug. 6, 2015, 11 pages.
Chaykowski, "Facebook and Uber Team Up To Bring Ride-Hailing To Messenger", https://www.forbes.com/sites/kathleenchaykowski/2015/12/16/facebook-and-uber-team-up-to-bring-ride-hailing-to-messenger/#35a69d174905, Dec. 16, 2015, 6 pages.
Clark, "Emoji Now Has an Autocomplete to Get Annoyed With", http://www.adweek.com/socialtimes/now-emoji-autocomplete-get-annoyed/204764.
Constine, "Facebook Messenger Hits 800M Users: 2016 Strategy And Predictions", 25. http://techcrunch.com/2016/01/07/beyond-messaging/#.fu0nsbh:hTbz, Jan. 7, 2016, 12 pages.
Constine, "Facebook Payments in Messenger Demo Video", https://www.youtube.com/watch?v=0czclezYB_8, Mar. 17, 2015, 2 pages.
D'Onfro, "Facebook Built a Basketball Game Directly into Messenger—Here's How to Play", Business Insider, Mar. 17, 2016, 3 pages.
Eadicicco, "Google's New iPhone Keyboard Solves a Big Problem With Texting", http://fortune.com/2016/05/12/googlei-phone-keyboard-texting/, May 12, 2016, 2 pages.
Facebook Messenger 2013, "How To Send Stickers On Facebook Messenger?", https://www.youtube.com/watch?v=r8FsDQQxjHk, Jan. 20, 2016, 2 pages.
Facebook Messenger 2013, "How To Send Stickers And Photos In Messages," https://www.youtube.com/watch?v=qJz82aTrICg, Sep. 7, 2013, 3 pages.
Funny Status, "I Wish I Could Just 'Like' A Text So I Don't Have To Respond", Feb. 17, 2013, 5 pages.
Goel, "Facebook Announces a Payments Feature for Its Messenger App", https://www.nytimes.com/2015/03/18/technology/facebook-announces-a-payments-feature-for-its-messenger-app.html?_r=0, Mar. 17, 2015, 4 pages.
Gonzalez, "10 Third-Party Apps for Facebook Messenger You Should Install Right now", https://smartphones.gadgethacks.com/how-to/10-third-party-apps-for-facebook-messenger-you-should-install-right-now, Mar. 27, 2015, 16 pages.
Google, "Quick Search", 27. https://play.google.com/store/apps/details?id=com.startapp.quicksearchbox&hl=en, Jun. 7, 2017, 4 pages.
Haslam, "Enable and Play Facebook Messenger's Hidden Basketball Game—Here's How", Redmond Pie, Mar. 30, 2016, 3 pages.
Heath, "Snapshot Now Let's You Add Fun Stickers to Photos and Videos", https://www.businessinsider.com/how-to-add-stickers-to-snap-2016, May 23, 2016, 4 pages.
imTranslator, "Translate Facebook", http://about.imtranslator.net/translate-facebook/, Sep. 5, 2014, 6 pages.

(56) References Cited

OTHER PUBLICATIONS imTranslator, "Translate Facebook with Pop-up Bubble", http://about.imtranslator.net/translate-facebook-with-pop-up-bubble/, Sep. 5, 2014, 9 pages.
Isaac et al., "Facebook and Uber Follow Asian Rivals in Plan to Enhance Messenger App", https://www.nytimes.com/2015/12/17/technology/facebook-and-uber-follow-asian-rivals-in-plan-to-enhance-messenger-app.html?-r=0, Dec. 16, 2015, 4 pages.
King, "Google Launches Time-Saving Keyboard for iPhones", https://money.cnn.com/2016/05/12/technology/google-board/index.html, May 12, 2016, 2 pages.
Kleeman, "How to Play Secret Chess Game in Facebook Messenger", https://www.mic.com/articles/1344476/how-to-play-the-secret-game-of-chess-in-facebook-messenger, Feb. 5, 2016, 6 pages.
Krug, "News Feed FYI: What the Reactions Launch Means for News Feed", 30. http://newsroom.fb.com/news/2016/02/news-feed-fyi-what-the-reactions-launch-means-for-news-feed/, Feb. 24, 2016, 2 pages.
Krug, "Reactions Now Available Globally", 31. http://newsroom.fb.com/news/2016/02/reactions-now-available-globally/, Feb. 24, 2016, 3 pages.
Larson, "How to Customize Facebook Messenger with Chat Colors and Emoji", https://www.dailydot.com/debug/customize-messenger-color-bubbles/, Dec. 24, 2015, 6 pages.
Lim, "14 Google Hangouts Hidden Animated Emojis", http://www.hongkiat.com/blog/google-hangout-animated-emojis/, 2017, 8 pages.
Literati Labs, Inc., "Keymoji: Emoji Keyboard", 21. https://itunes.apple.com/us/app/keymoji-emoji-chat/id886476394?mt=8, Apr. 13, 2017, 2 pages.
Marcus, "Here's to 2016 with Messenger", 26. http://newsroom.fb.com/news/2016/01/heres-to-2016-with-messenger/, Jan. 7, 2016, 5 pages.
McAlone, "Epic Slide Deck from Former Yahoo Board Member Lays Out the Future of Tech and Media", 7. http://www.businessinsider.com/michael-wolf-predicts-what-will-happen-in-the-tech-industry-in-2016-2015-10?op=1, Oct. 21, 2015, 138 pages.
Messenger Platform, "Complete Guide—Technical Implementation", https://developers.facebook.com/docs/messenger-platform/implementation, downloaded May 27, 2016, 18 pages.
Messenger Platform, "Getting Started", http://developers.facebook.com/docs/messenger-platform/getting-started/quick-start, downloaded May 27, 2016, 6 pages.
"Minuum for iPhone", http://minuum.com/minuum-for-iPhone/, 2015, 4 pages.
Newton, "Facebook Rolls Out Expanded Like Button Reactions Around the World", https://www.theverge.com/2016/2/24/11094374/facebook-reactions-like-button, Feb. 24, 2016, 5 pages.
OSXdaily, "Access and Use Emoji in Mac OS X," https://web.archive.org/web/20160415075948/http://osxdaily.com/2011/08/20/emoji-mac-os-x-lion, Aug. 20, 2011, 10 pages.
Singh, "Introducing Emoji Autocomplete", Venmo, http://blog.venmo.com/hf2t3h4x98p5e13z82pl8j66ngcmry/2015/5/14/introducing-emoji-autocomplete, May 14, 2015, 2 pages.
Skype Messenger, "7 Skype Tips for Power Users," http://web.archive.org/web/20131008122153/http://www.howtogeek.com/173448/7-skype-tips-for-power-users, Oct. 8, 2013, 5 pages.
Smith (GottaBeMobile): "Facebook Reactions: Meet the New Facebook Like Button", YouTube, https://www.youtube.com/watch?v=Wn5571R8u0g, Feb. 24, 2016, 2 pages.
Snapchat App 2014, "How To Resize And Rotate Emojis/Text On Snapchat," https://www.youtube.com/watch?v=OErPIFWY3W0, Dec. 23, 2014, 3 pages.
Sullivan, "Slash's Mobile Keyboard Makes It An Interesting Player In The Messaging Wars", https://www.fastcompany.com/3055205/slashs-mobile-keyboard-makes-it-an-interesting-player-in-the-messaging-wars, Jan. 7, 2016, 10 pages.
Tabuchi, "No Time to Text? Say It With Stickers", https://wwwnytimes.com/2014/05/26/technology/no-time-to-text-apps-turn-to-stickers.html?_r=0, May 25, 2014, 6 pages.
Tek, "Draw & Guess for Messenger", https://web.archive.org/web/2017113114451/https://itunes.apple.com/gb/app/draw-guess-for-messenger/id999812010?mt=8, 2 pages.
Viber Media S.a.r.l., "Viber for IOS", https://www.viber.com/products/iphone, 2017, 3 pages.
Viticci, "Facebook Messenger's "Optimized" Approach and App Discovery", https:///www.macstories.net/ios/facebook-messenger-optimized-approach-and-app-discovery, Mar. 25, 2015, 6 pages.
Walker, "The Six Stages of Facebook Reaction Grief", http://gizmodo.com/the-six-stages-of-facebook-reaction-grief-1761086520, Feb. 24, 2016, 7 pages.
Weinberger, "The Next Big Thing in Computing is Called 'ChatOps,' and it's Already Happening Inside Slack", http://www.businessinsider.com/chatops-blockspring-atlassian-and-ibm-push-the-api-market-2015-11, Nov. 5, 2015, 5 pages.
Weinberger, "Why Apple Should be Scared of Facebook's and Google's Messaging Apps", 32. http://www.businessinsider.com/apple-versus-google-and-facebook-messaging-2015-12, Dec. 22, 2015, 4 pages.
Wiki, "How to Resize Emoji on Snapchat," https://web.archive.org/web/20160505072758/http://www.wikihow.com/Resize-Emoji-on-Snapchat, May 5, 2016, 3 pages.
Wikipedia, "WeChat", https://en.wikipedia.org/wiki/WeChat, Jan. 21, 2011, 7 pages.
Wood, "Messaging Apps Offer Do-It-All Services in Bid for Higher Profits", https://www.nytimes.com/2015/03/26/technology/personaltech/messging-apps-offer-do-it, Mar. 25, 2015, 3 pages.
Wortham, "What Silicon Valley Can Learn From Seoul", https://www.nytimes.com/2015/06/07/magazine/what-silicon-valley-can-learn-from-seoul.html?r=0, Jun. 2, 2015, 6 pages.
YouTube, "How to Install or Add Other Apps to Facebook Messenger", https://www.bing.com/videos/search?q=how+to+install+or+add+apps+to+facebook+messenger, Jan. 19, 2016, 8 pages.
Office Action, dated Jan. 27, 2017, received in Danish Patent Application No. 201670636, which corresponds with U.S. Appl. No. 15/272,399, 9 pages.
Intention to Grant, dated Oct. 1, 2019, received in Danish Patent Application No. 201670636, which corresponds with U.S. Appl. No. 15/272,399, 2 pages.
Decision to Grant, dated Jan. 20, 2020, received in Danish Patent Application No. 201670636, which corresponds with U.S. Appl. No. 15/272,399, 3 pages.
Office Action, dated Jan. 12, 2017, received in Danish Patent Application No. 201670641, which corresponds with U.S. Appl. No. 15/272,399, 7 pages.
Office Action, dated Aug. 31, 2017, received in Danish Patent Application No. 201670642, which corresponds with U.S. Appl. No. 15/272,399, 4 pages.
Intent to Grant, dated Jan. 24, 2019, received in Danish Patent Application No. 201670642, which corresponds with U.S. Appl. No. 15/272,399, 3 pages.
Intent to Grant, dated Mar. 21, 2019, received in received Danish Patent Application No. 201670642, which corresponds with U.S. Appl. No. 15/272,399, 2 pages.
Notice of Allowance, dated May 2, 2019, received in Danish Patent Application No. 201670642, which corresponds with U.S. Appl. No. 15/272,399, 2 pages.
Office Action, dated Jan. 16, 2017, received in Danish Patent Application No. 201670647, which corresponds with U.S. Appl. No. 15/272,399, 9 pages.
Intention to Grant, dated Feb. 15, 2019, received in Danish Patent Application No. 201670647, which corresponds with U.S. Appl. No. 15/272,399, 2 pages.
Notice of Allowance, dated May 2, 2019, received in Danish Patent Application No. 201670647, which corresponds with U.S. Appl. No. 15/272,399, 2 pages.
Office Action, dated Aug. 24, 2017, received in Danish Patent Application No. 201670648, which corresponds with U.S. Appl. No. 15/272,399, 3 pages.
Intention to Grant, dated Feb. 20, 2018, received in Danish Patent Application No. 201670648, which corresponds with U.S. Appl. No. 15/272,399, 2 pages.

(56) References Cited

OTHER PUBLICATIONS

Notice of Allowance, dated Mar. 26, 2018, received in Danish Patent Application No. 201670648, which corresponds with U.S. Appl. No. 15/272,399, 2 pages.
Office Action, dated Dec. 16, 2016, received in Danish Patent Application No. 201670649, which corresponds with U.S. Appl. No. 15/272,399, 2 pages.
Office Action, dated Apr. 21, 2017, received in Danish Patent Application No. 201670649, which corresponds with U.S. Appl. No. 15/272,399, 2 pages.
Office Action, dated Aug. 23, 2017, received in Danish Patent Application No. 201670650, which corresponds with U.S. Appl. No. 15/272,399, 3 pages.
Office Action, dated Feb. 27, 2018, received in Danish Patent Application No. 201670650, which corresponds with U.S. Appl. No. 15/272,399, 2 pages.
Notice of Allowance, dated Jun. 7, 2018, received in Danish Patent Application No. 201670650, which corresponds with U.S. Appl. No. 15/272,399, 2 pages.
Office Action, dated Jan. 17, 2017, received in Danish Patent Application No. 201670651, which corresponds with U.S. Appl. No. 15/272,399, 9 pages.
Office Action, dated Feb. 14, 2018, received in Danish Patent Application No. 201670651, which corresponds with U.S. Appl. No. 15/272,399, 3 pages.
Intention to Grant, dated Oct. 12, 2018, received in Danish Patent Application No. 201670651, which corresponds with U.S. Appl. No. 15/272,399, 2 pages.
Grant Decision, dated Feb. 20, 2019, received in received in Danish Patent Application No. 201670651, which corresponds with U.S. Appl. No. 15/272,399, 2 pages.
Office Action, dated Dec. 14, 2016, received in Danish Patent Application No. 201670652, which corresponds with U.S. Appl. No. 15/272,399, 7 pages.
Office Action, dated Dec. 19, 2016, received in Danish Patent Application No. 201670654, which corresponds with U.S. Appl. No. 15/272,399, 9 pages.
Intention to Grant, dated Nov. 26, 2018, received in Danish Patent Application No. 201670654, which corresponds with U.S. Appl. No. 15/272,399, 2 pages.
Decision to Grant, dated Mar. 20, 2019, received in Danish Patent Application No. 201670654, which corresponds with U.S. Appl. No. 15/272,399, 3 pages.
Office Action, dated Feb. 1, 2017, received in Danish Patent Application No. 201670655, which corresponds with U.S. Appl. No. 15/272,399, 9 pages.
Office Action, dated Apr. 18, 2018, received in Danish Patent Application No. 201670655, which corresponds with U.S. Appl. No. 15/272,399, 4 pages.
Intention to Grant, dated Feb. 21, 2019, received in Danish Patent Application No. 201670655, which corresponds with U.S. Appl. No. 15/272,399, 2 pages.
Decision to Grant, dated May 3, 2019, received in Danish Patent Application No. 201670655, which corresponds with U.S. Appl. No. 15/272,399, 2 pages.
Notice of Acceptance, dated Jul. 15, 2019, received in Australian Patent Application No. 2019204403, which corresponds with U.S. Appl. No. 15/272,411, 3 pages.
Certificate of Grant, dated Nov. 14, 2019, received in Australian Patent Application No. 2019204403, which corresponds with U.S. Appl. No. 15/272,411, 3 pages.
Office Action, dated Dec. 20, 2019, received in Chinese Patent Application No. 201810396354.0, which corresponds with U.S. Appl. No. 15/272,429, 4 pages.
Office Action, dated May 10, 2019, received in Australian Patent Application No. 2017266930, which corresponds with U.S. Appl. No. 15/272,421, 2 pages.

Office Action, dated Feb. 11, 2019, received in Chinese Patent Application No. 201780002856.4, which correspond with U.S. Appl. No. 15/272,421, 7 pages.
Office Action, dated Oct. 15, 2019, received in Chinese Patent Application No. 201780002856.4, which corresponds with U.S. Appl. No. 15/272,421, 4 pages.
Office Action, dated Jan. 22, 2020, received in Australian Patent Application No. 2019283863, which corresponds with U.S. Appl. No. 16/732,184, 3 pages.
Office Action, dated Oct. 21, 2019, received in U.S. Appl. No. 16/525,377, 25 pages.
Final Office Action, dated May 28, 2020 received in U.S. Appl. No. 16/525,377, 26 pages.
Office Action, dated Feb. 19, 2021, received in U.S. Appl. No. 16/525,377, 27 pages.
Notice of Allowance, dated Jun. 24, 2021, received in U.S. Appl. No. 16/525,377, 10 pages.
European Search Report, dated Jul. 26, 2017, received in European Patent Application No. 17174969.0, 13 pages.
ISR and Written Opinion, dated Jul. 19, 2017, received in International Patent Application No. PCT/US2017/034340, 10 pages.
AdExpresso, "Facebook Reactions", at https://www.outtube.com/watch?v=QRtD04am6l0, Oct. 8, 2015, 18 pages.
Boxer, Add Reactions to Pull Requests, Issues, and Comments, https://github.blog/2016-03-10-add-reactions-to-pull-requests-issues-and-comments, Mar. 10, 2016, 6 pages.
Campbell, "Instant Messages: Between the Messages", 2003 IEEE International Conference on Systems, Man and Cybernetics, vol. 3, pp. 21-93, Oct. 8, 2003, 4 pages.
Mohr, "Facebook Reactions—What's Your Reaction?", https://wonderoftech.com/facebook-reactions, Feb. 25, 2016, 7 pages.
Murphy, Slack Adds Emoji Reactors (Goodbye, Productivity), at https://www.pcmag.com/news/slack-adds-emoji-reactions-goodbye-productivity>, Jul. 9, 2015, 5 pages.
Newton, "You Can Now React to any Message in Slack with an Emoji of Your Choosing", https://www.theverge.com2015/7/9/8916347/slack-emoji-reactions>, Jul. 9, 2015, 24 pages.
Parrott, "Snapchat Reaction Emoji: a prototype", https://medium.com/hh-design/snapchat-reaction-emoji-a-prototype-372ba5de0bde, Jan. 11, 2016, 8 pages.
Riley, "Slack Now Let's Users Add up to 722 Emoji as Reactions to Messages", https//siliconangle.com/2015/07/09/slack-now-lets-users-add-up-to-722-emoji-as-reactions-to-messages, Jul. 9, 2015, 9 pages.
Stinson, "Facebook Reactions, the Totally Redesigned Like Button, is Here", https//www.wired.com2016/02/facebook-reactions-totally-redisgned-like-button, Feb. 24, 2016, 18 pages.
Notice of Allowance, dated Jul. 29, 2022, received in U.S. Appl. No. 15/272,419, 7 pages.
Decision to Grant, dated Jul. 28, 2022, received in European Patent Application No. 18167254.4, which corresponds with U.S. Appl. No. 15/272,419, 3 pages.
Office Action, dated Sep. 15, 2022, received in U.S. Appl. No. 17/583,075, 35 pages.
Patent, dated Jul. 26, 2022, received in European Patent Application No. 19218201.2, which corresponds with U.S. Appl. No. 16/732,184, 2 pages.
Decision to Grant, dated Jan. 5, 2023, received in European Patent Application No. 19180887.2, which corresponds with U.S. Appl. No. 15/272,424, 3 pages.
Notice of Allowance, dated Dec. 16, 2022, received in Australian Patent Application No. 2021269318, which corresponds with U.S. Appl. No. 17/584,283, 3 pages.
Notice of Allowance, dated Mar. 3, 2023, received in Japanese Patent Application No. 2021-173046, which corresponds with U.S. Appl. No. 17/584,283, 2 pages.
Notice of Allowance, dated Dec. 15, 2022, received in Korean Patent Application No. 2021-7040161, which corresponds with U.S. Appl. No. 17/584,283, 2 pages.
Final Office Action, dated May 26, 2023, received in U.S. Appl. No. 17/242,157, 11 pages.

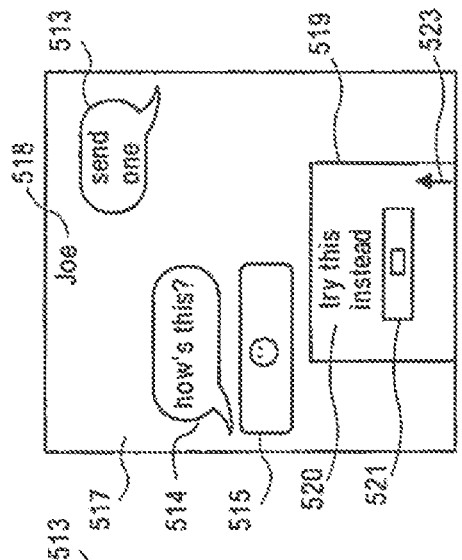
FIG. 9D
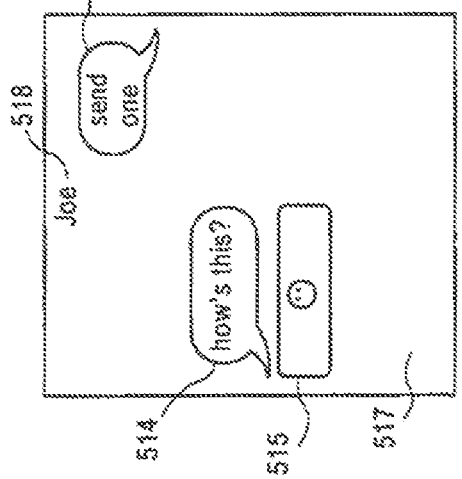
FIG. 9E
FIG. 9F
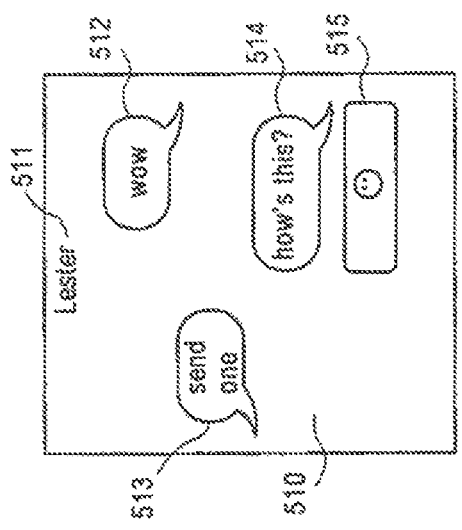
FIG. 9G
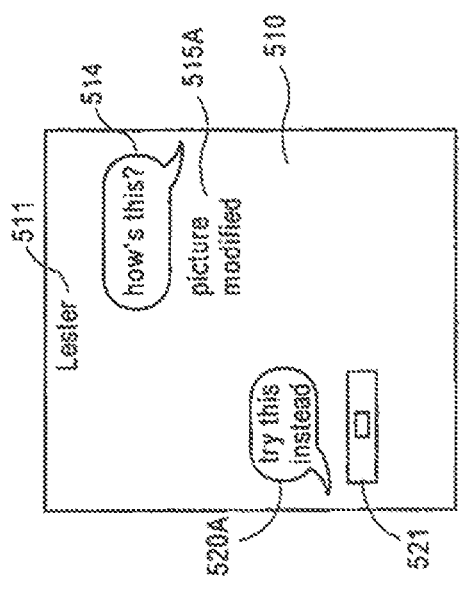
FIG. 9H

LAYERS IN MESSAGING APPLICATIONS

This application is a continuation of U.S. patent application Ser. No. 16/525,377, entitled "LAYERS IN MESSAGING APPLICATIONS," filed on Jul. 29, 2019, which is a continuation of U.S. patent application Ser. No. 15/400,780, entitled "LAYERS IN MESSAGING APPLICATIONS," filed on Jan. 6, 2017, now U.S. Pat. No. 10,368,208, which claims the benefit of the following U.S. Provisional Patent Application Nos. 62/349,086, filed on Jun. 12, 2016; 62/349, 101, filed on Jun. 12, 2016; 62/349,113, filed on Jun. 12, 2016; and 62/349,091, filed on Jun. 12, 2016, the entirety of each of which is hereby incorporated herein in its entirety.

BACKGROUND

The embodiments described in this disclosure relate to messaging systems such as text messaging systems on cellular telephones or other communication devices or data processing systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of smartphones (e.g. iPhones) and tablet computers (e.g. iPad) has increased, the text messaging systems have developed the ability to send images, such as photos or emojis. In addition, messaging systems such as iMessage from Apple Inc. of Cupertino, Calif. have allowed users to also send and receive text and images through "public" networks which include "public" WiFi access points and the Internet (in addition to using the wireless carrier's private cellular telephone networks), and messaging systems such as iMessage can seamlessly transition between the use of public and private networks depending on the availability of, for example, WiFi access points or the compatibility of the other user's device (which may not be compatible with iMessage).

SUMMARY OF THE DESCRIPTION

The embodiments described herein relate to a text messaging system that can include a set of one or more layers displayed within a message transcript of a messaging app. These one or more layers are in addition to one or more message bubbles on a received message layer in the message transcript and one or more message bubbles on a sent message layer in the message transcript in one embodiment. These one or more layers can include animated content and can be overlaid relative to each other and to the sent message layer and to the received message layer. In one embodiment, each of these one or more layers can have a Z depth relative to each other and to the sent and received message layers. In one embodiment, the layers can be composited using a set of alpha values and the relative Z depth values to create a composite or sequence of composite images if there are one or more animations in the one or more layers.

A method according to one embodiment can include the following operations: receiving, by a first messaging app, text entered by a user; detecting the text includes a set of one or more predetermined words associated with a first layer identifier; sending, by the first messaging app, the text and the first layer identifier to a second messaging app in response to a send command after detecting the text. In one embodiment, the first messaging app and the second messaging app are configured to communicate text messages through one or more messaging servers. In one embodiment, the first layer identifier specifies, for a first layer, a Z depth of the first layer relative to at least one of one or more message bubbles in a sent message layer and one or more message bubbles in a received message layer. In one embodiment, the first messaging app can send one or more additional layer identifiers to the second messaging app and these additional layer identifiers can specify for each layer a Z depth of the layer relative to other layers used to display a message transcript. In one embodiment, each layer identifier can specify or refer to content which can be created or generated on a receiving device.

A method according to another embodiment can include the following operations: receiving, by a first messaging app, a message from a second messaging app; receiving by the first messaging app a first layer identifier associated with the message, wherein the first layer identifier specifies for a first layer a Z depth of the first layer relative to at least one of one or more message bubbles in a sent message layer and one or more message bubbles in a received message layer in a message transcript; receiving or generating, by the first messaging app, content for display in the first layer; and displaying the sent message layer and the received message layer in the content in the first layer, wherein the first layer is displayed at the Z depth relative to at least one of the one or more message bubbles in the sent message layer and the one or more message bubbles in the received message layer. In one embodiment, the sent message layer and the received message layer can have different Z depths and wherein the first layer is, in Z depth, between the sent message layer and the received message layer. In one embodiment, the messaging app can use a plurality of layers in addition to the sent message layer and the received message layer, and each of those layers can have a Z depth relative to each other and relative to the sent message layer and the received message layer. In one embodiment, all of the layers are overlaid and composited based on a set of relative Z depth values and a set of alpha values in order to create a composite image. In one embodiment, each of the layers (or a subset of the layers) can display an animation which is displayed over a period of time and once the animation is completed, all layers are removed except for the sent message layer and the received message layer. In one embodiment, each layer is identified by a layer identifier which can specify the Z depth of the layer relative to the other layers and can also specify content for display in the particular layer. In one embodiment, a receiving messaging app can generate the content for display in a particular layer based on the identifier for the layer.

The methods and systems described herein can be implemented by data processing systems, such as one or more smartphones, tablet computers, desktop computers, laptop computers, smart watches, audio accessories, and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIGS. 9D, 9E, 9F, 9G, and 9H show an example of the message transcripts on two different devices that are involved in a conversation between two messaging apps, one on each device, wherein the conversation involves a session between two extension apps. The user interface shown in FIGS. 9D, 9E, 9F, 9G and 9H show how content in message bubbles created by the extension apps can be converted into breadcrumbs according to one or more embodiments described herein.

FIGS. 15A and 15B show a side view of two different sets of layers.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
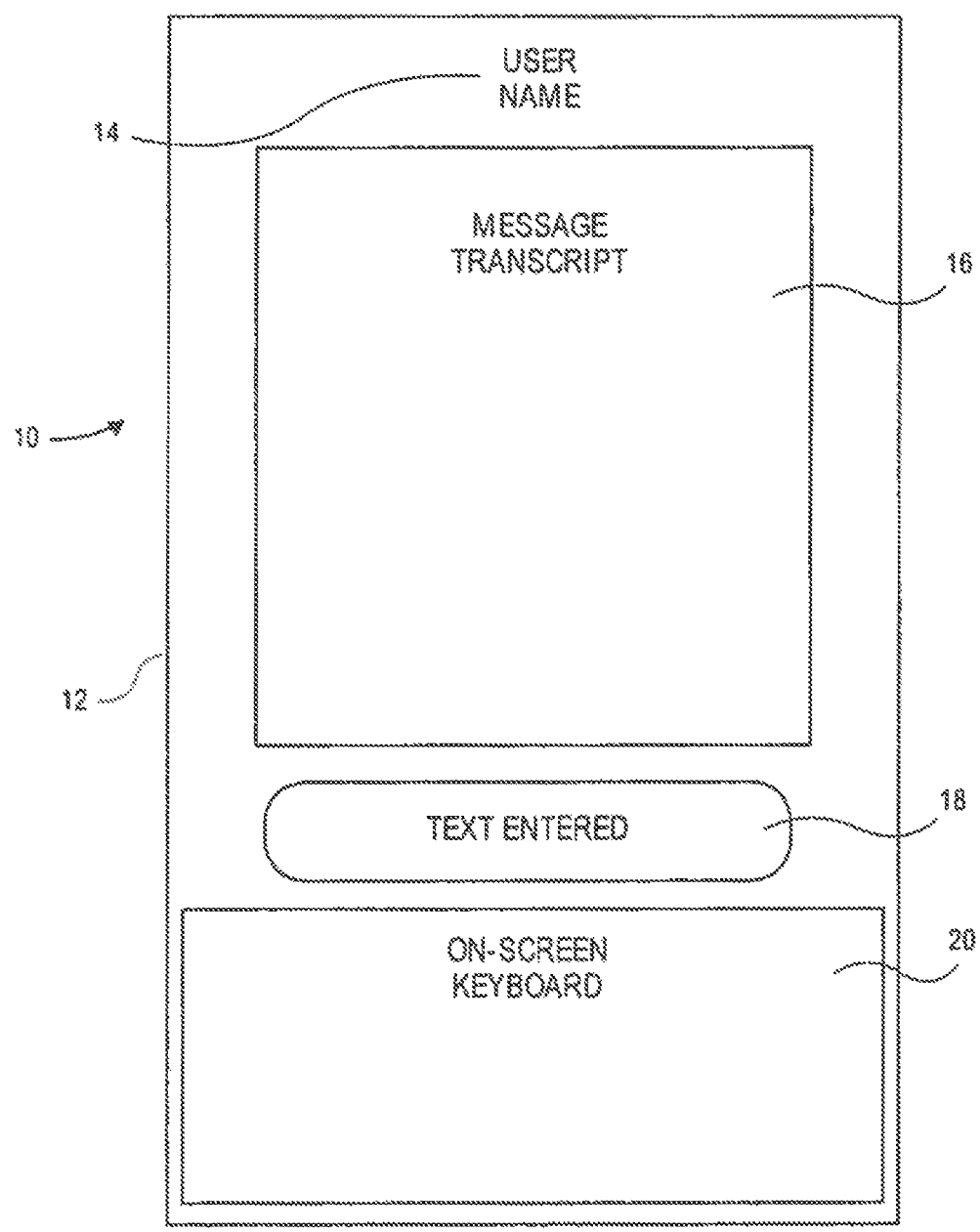
FIG. 1A shows an example of a user interface for a messaging app on a communication device.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone, or tablet computer, or a desktop computer or a laptop computer, wearable, on-board computer, or other data processing systems or other consumer electronics devices. In one embodiment, the device can include a conventional touch screen that can both display images and also accept touch inputs from a user. The touch screen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
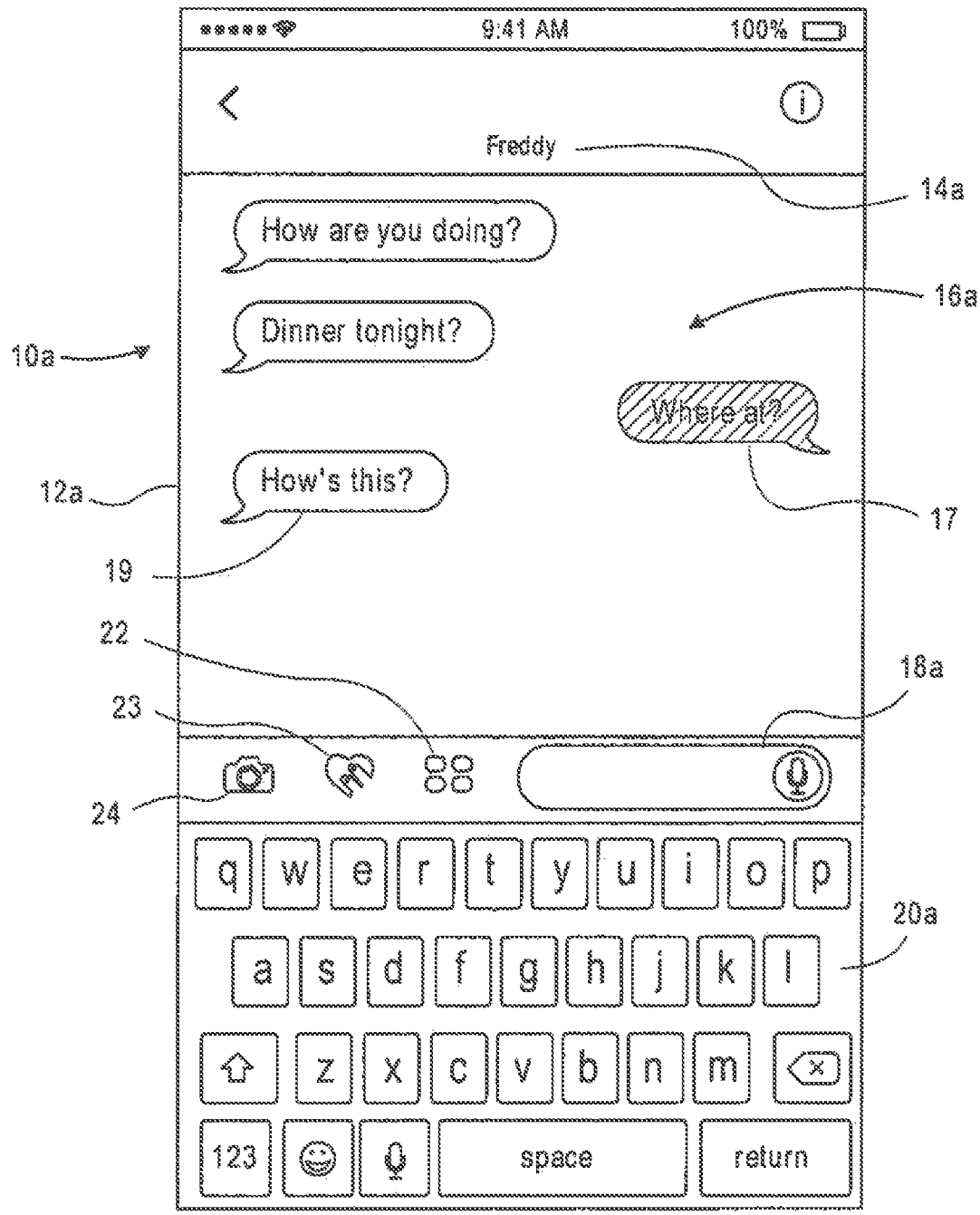
FIG. 1B shows another example of a user interface for a messaging app on a communication device.

FIG. 1B shows a more detailed example of a user interface of a messaging app on a communication device 10A. The user interface is displayed in this embodiment on touch screen 12A and includes on-screen keyboard 20A, text entry region 18A, a message transcript 16A and a user name 14A showing the name of the other user(s) to whom messages are sent and from whom messages are received. The text entry region 18A is a staging area for content such as one or more of text, stickers, extension app content, images etc. which are ready to be sent in response to the user's selection of the send command (and in one embodiment, the content can be edited in the staging area). In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. The use of the word "bubble", such as message bubble or session bubble, etc. is not meant to imply any specific shape or form; rather it is intended to mean any shape or form of demarcation between messages between two or more participants, and thus the demarcation can use boxes or lines or message containers or different colors, etc. Thus the phrase "message bubble" is meant to cover all such demarcations (or other ways to distinguish) between messages between two or more participants, and particularly in the context of such demarcations or other ways to distinguish in a message transcript. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension apps view icon 22, when selected, causes the display of a view of the installed extensions app that can operate with the messaging app, and the view provided can be a browsable view, such as the browsable view 157 shown in FIG. 4B to allow the user to scroll through multiple pages showing all of the installed extension apps that are configured to operate with the messaging app according to the one or more embodiments described herein. The imaging app icon 23 can in one embodiment be an icon that when selected causes the launching of a plugin of the messaging app that provides image creation within the messaging app's process such as the plugin shown in FIGS. 5A, 5B, and 5C. The camera app icon 24 in one embodiment can, when selected, cause the communication device 10A to enter into a camera mode in which a camera of a device can capture still images or video images which can be placed into the message in order to send the image or video.

Figure 2:
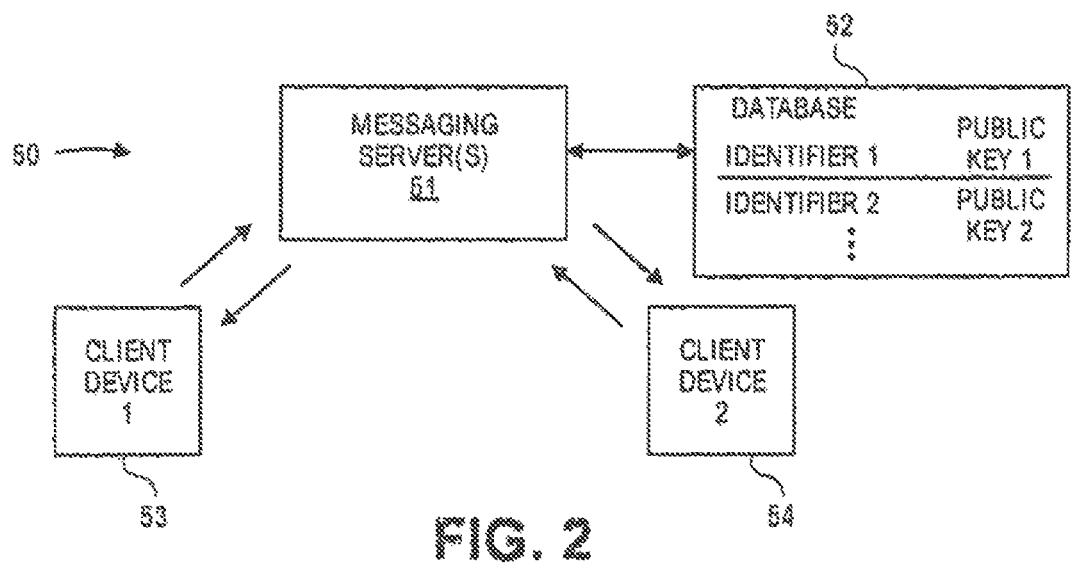
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with extension apps according to the one or more embodiments described herein and also communicate at least text messages and optionally resource locators or images or other content (e.g. as described relative to FIG. 13A) for devices that are not compatible with the extension app architecture in a messaging app. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric key) which can be randomly generated, and that other key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc.) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

A messaging system in one embodiment on a client device includes a messaging app and one or more extension apps that each operate as separate processes. In one embodiment, the message app and the one or more extension apps can each be separate sandboxed processes that operate or execute in their own memory spaces. In addition, the messaging app can also operate with plug-ins, such as an image creation plug-in shown in FIG. 5A, which operate within the same process and memory space as the messaging app. The messaging app and each extension app communicate with each other through an interprocess communication, such as the XPC framework provided in iOS and Mac OS X. The messaging app is designed to receive text on a sending device from a user of the device and display the text in a message transcript and send the text, through a set of one or more messaging servers, to a receiving device which displays, through a counterpart messaging application on the receiving device, the received text in a message transcript on the receiving device. The receiving device and the sending device can each have a copy of the same extension app which are configured to create content of a certain type depending upon the particular extension app (or, in an alternative embodiment, each can include a copy of different extension apps that are compatible for the content used by them).

Figure 3A:
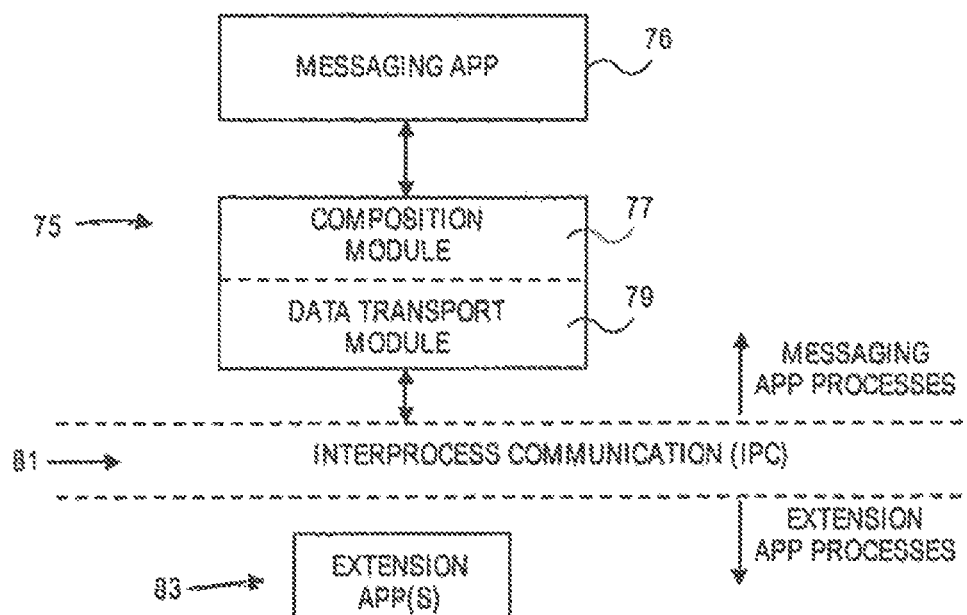
FIG. 3A shows a block diagram of an architecture for providing extension apps for use with a messaging app according to one embodiment.

FIG. 3A shows an example of a software architecture in which a messaging app and one or more extension apps operate together to provide an enhanced messaging system. As shown in FIG. 3A, the messaging system 75 includes a messaging app 76 and a set of plug-in modules, such as a composition module 77 and a data transport module 79 which are configured to communicate through an interprocess communication (IPC) 81 with the one or more extension apps 83. As shown in FIG. 3A, the messaging app and the composition module 77 and the data transport module 79 operate within the messaging app processes in a memory space controlled by a kernel on the communication device which executes the messaging system 75. The composition module 77 composes the content of a message bubble when the message bubble displays or otherwise presents content passed to the messaging app through the IPC 81. The data transport module 79 passes the content and other data to the extension app through the IPC 81 and receives the content and other data from the extension app through the IPC 81. Both modules 77 and 79 in one embodiment can have an extendable plug-in architecture that allows the addition of new plug-ins for new extension apps that generate new content or require a new data transport process. In this context, the plug-ins are additional software that operate within the same process as the messaging app. The composition module 77 can use a template to construct a message bubble such as the "MSMessageTemplateLayout" described below relative to FIG. 3C. The kernel can include a software library or software framework for providing the IPC 81 to allow communication between the messaging system 75 and the one or more extension apps 83. In one embodiment, the IPC framework can include a system area that is referred to as an extension point which provides APIs to allow for communication between the two different processes and to reinforce policies in terms of the types of communications which are permissible. In one embodiment, the communication through IPC involves the placement (writing) of content in a memory region by one process and the IPC framework allows another process to read from that memory region. In one embodiment, the messaging app 76 can launch automatically the extension app processes and can manage their lifetime, including the termination of those processes. In one embodiment, each of the extension apps 83 run in their own address space communication between the extension and the messaging app uses the IPC mediated by the system framework and they do not have access to each other's files or memory spaces. In one embodiment, each of the extension apps may be a sandboxed process which are separate from each other and the messaging app 76 can also be a separate sandboxed process which is separate from the sandboxed processes of the extension apps. Moreover, the extension apps can be provided with fewer system permissions relative to the messaging app so that the extension apps operate in a more restricted environment than the messaging app. Further information in connection with the use of interprocess communications for extensions can be found in U.S. patent application Ser. No. 14/488,122, filed Sep. 16, 2014 and published as U.S. Publication No. U.S. 2015/0347748, which application is incorporated herein by reference.

Figure 3B:
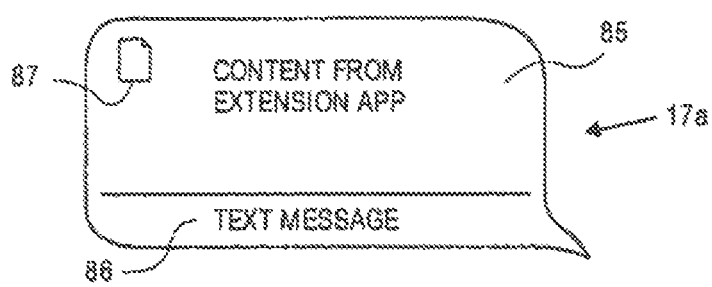
FIG. 3B shows an example of a user interface of a message bubble created at least in part by an extension app according to one embodiment herein.

In one embodiment the messaging app provides a view of content obtained from the extension app through the interprocess communication. The extension app can create the content in its own process and then provide that content in formats known to be acceptable to the messaging app (such as standard image formats or other standard formats). This allows the messaging app to then present the content from the extension app within one or more message bubbles within a message transcript (without needing to execute the extension app at least on the receiving device). FIG. 3B shows an example of a message bubble 17A which contains content created by and provided from an extension app, shown as content 85 which also can include a text message created by or provided by the extension app, such as text message 86. In one embodiment, the message bubble 17A can also include an icon 87 which can be the icon of the extension app which created the content 85.

Objects created by an extension app in one embodiment are shown in the message transcript on sending and receiving devices without launching the extension app. The extension app should provide enough information to construct a message bubble as part of the object. The object can consist of some opaque data encoded in a resource locator and a layout specification provided as a MSMessageTemplateLayout object. MSMessageTemplateLayout is a subclass of MSMessageLayout and represents one method of specifying message bubble layout.

Figure 3C:
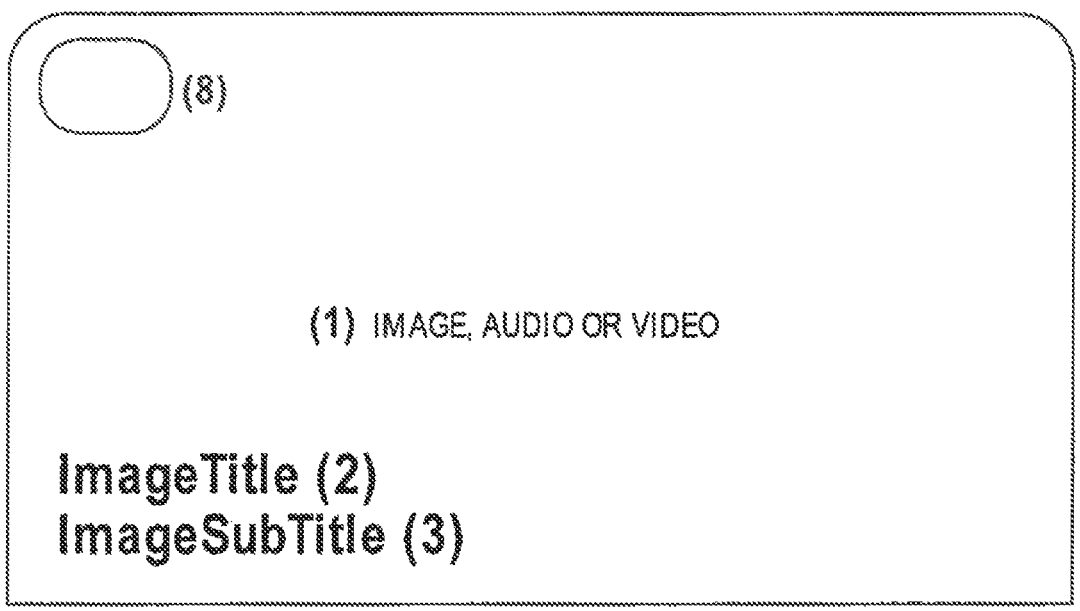
FIG. 3C shows an example of parts of a message bubble based on a template.

MSMessageTemplateLayout can have the following properties in one embodiment which are shown in FIG. 3C:

1) image or mediaFileURL: An image provide as a UIImage or as a file URL to an image file or a file URL to a video 2) imageTitle: A string the will be rendered on top of the image or movie 3) imageSubTitle: A string the will be rendered on top of the image or movie below the imageTitle 4) caption: A string the will be rendered in a caption bar below the image or movie 5) trailingCaption: A string the will be rendered right aligned in a caption bar below the image or movie 6) subCaption: A string the will be rendered in a caption bar below the caption 7) trailingSubCaption: A string the will be rendered right aligned in a caption bar below the trailingCaption 8) Extension icon: This is not provided as part of the MSMessageTemplateLayout but is derived from the bundle identifier of the extension that created the MSMessage.

The messaging app can use this information to construct the message bubble similar to the example shown in FIG. 3C.

The MSMessageTemplateLayout is serialized and transferred to the remote devices along with the opaque data. On receipt the messaging app on the receiving device will create a MSMessageTemplateLayout using the serialized data and use this to draw the message bubble in the receiver's message transcript.

In one embodiment, the extension apps which are configured to operate with a messaging app are not executable outside of the messaging application, and thus their life cycle is managed entirely by the messaging app. Moreover, as further described below, the downloading and installing of the extension apps can be controlled exclusively by the messaging app in one embodiment.

Figure 4A:
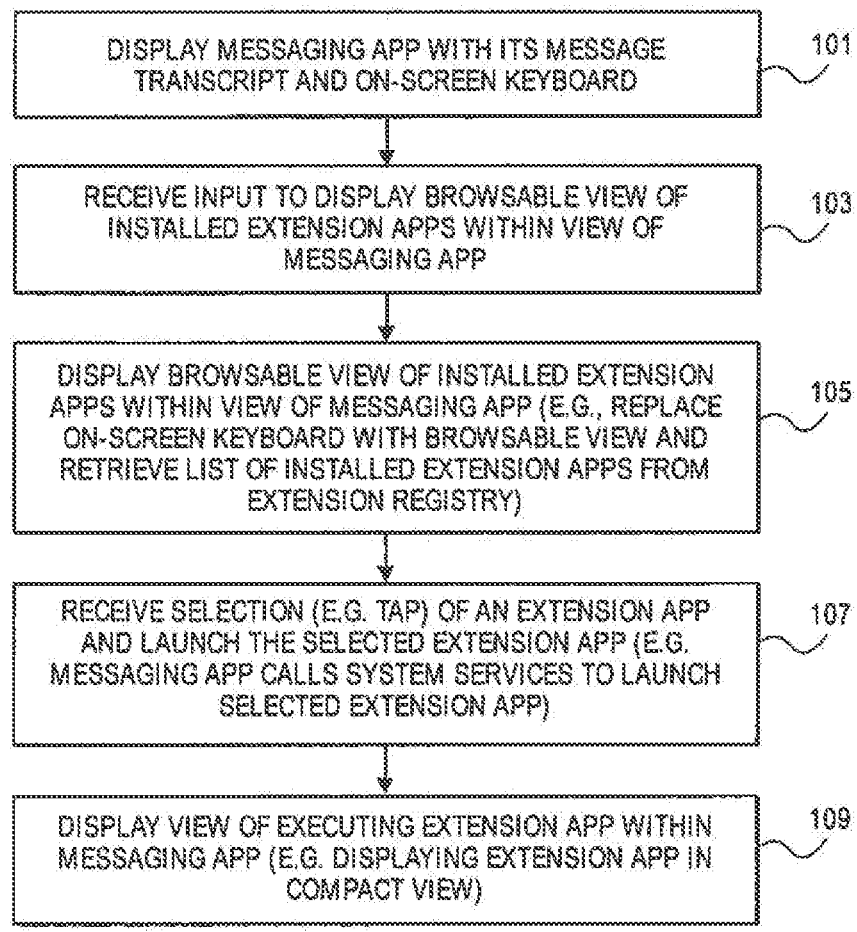
FIG. 4A is a flowchart which shows a method according to one embodiment for browsing, selecting, and launching an extension app from within a messaging app according to one or more embodiments described herein.
Figure 4B:
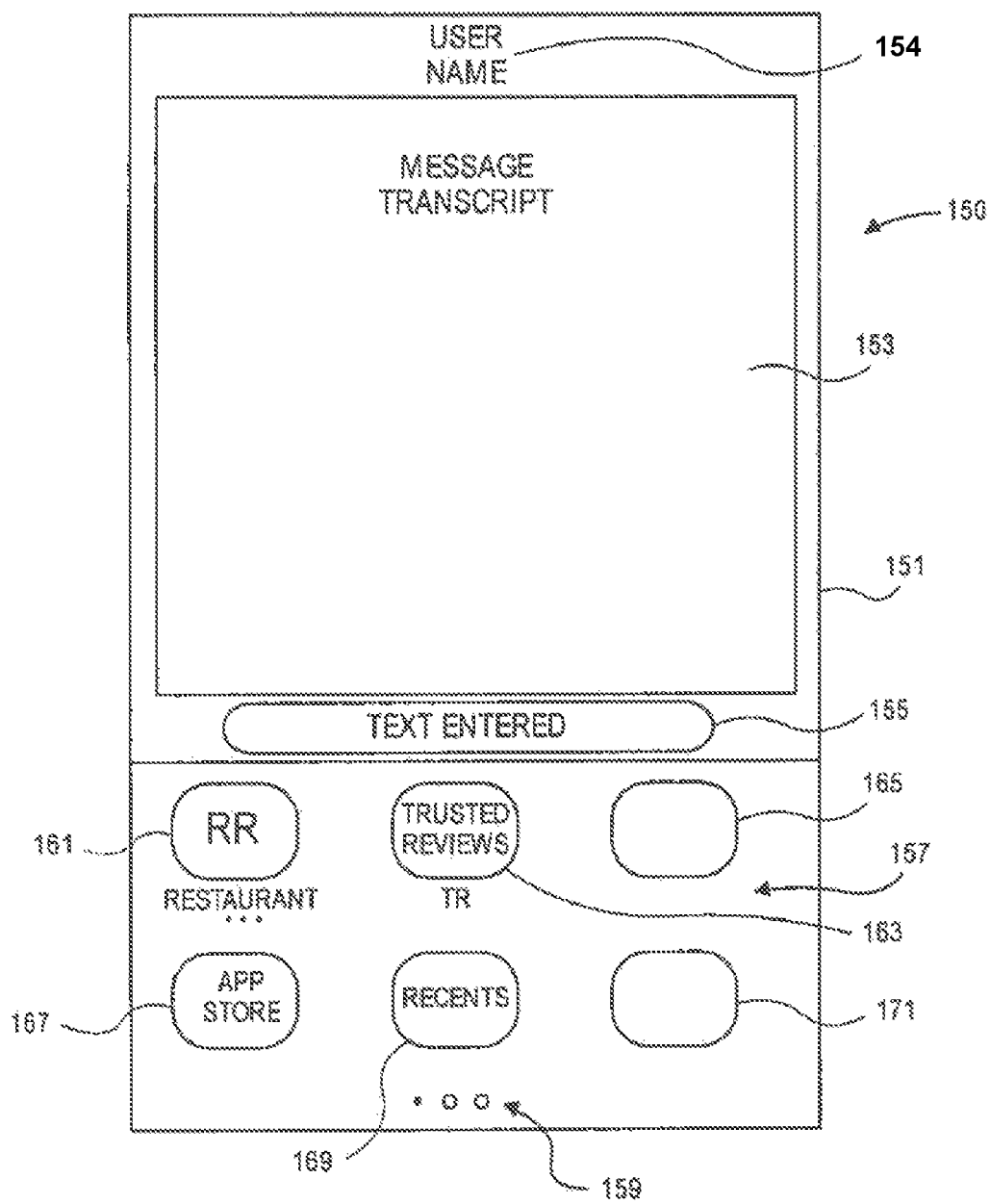
FIG. 4B shows an example of a user interface for a messaging app which includes a browsable view of installed extension apps according to one embodiment described herein.

In one embodiment, each extension app can be obtained from an app marketplace or distribution facility such as the Apple App Store (trademark) for message extension apps and can be launched from within the messaging app. FIG. 4A shows an example of a method according to one embodiment in which the installed extension apps can be browsed from within the messaging app, and a particular extension app can be launched to allow the user to interact with a particular extension app. The method can begin in operation 101 in which the messaging app displays its message transcript and an on-screen keyboard. FIG. 1B shows an example of a user interface of such a messaging app. Then in operation 103, the messaging app can receive an input to display a browsable view of installed extension apps within a view of the messaging app. For example, a user may tap on the icon 22 (in FIG. 1B) to select the icon which in turn causes the display of the browsable view in operation 105. In one embodiment, the browsable view of installed extension apps takes the place of the on-screen keyboard and retrieves the list of the installed extension apps from an extension registry which causes the display of icons for each of the installed extension apps. FIG. 4B shows an example of the result of operation 105 in which a browsable view 157 is displayed and takes the place of the on-screen keyboard of the messaging app as shown in FIG. 4B.

Figure 14A:
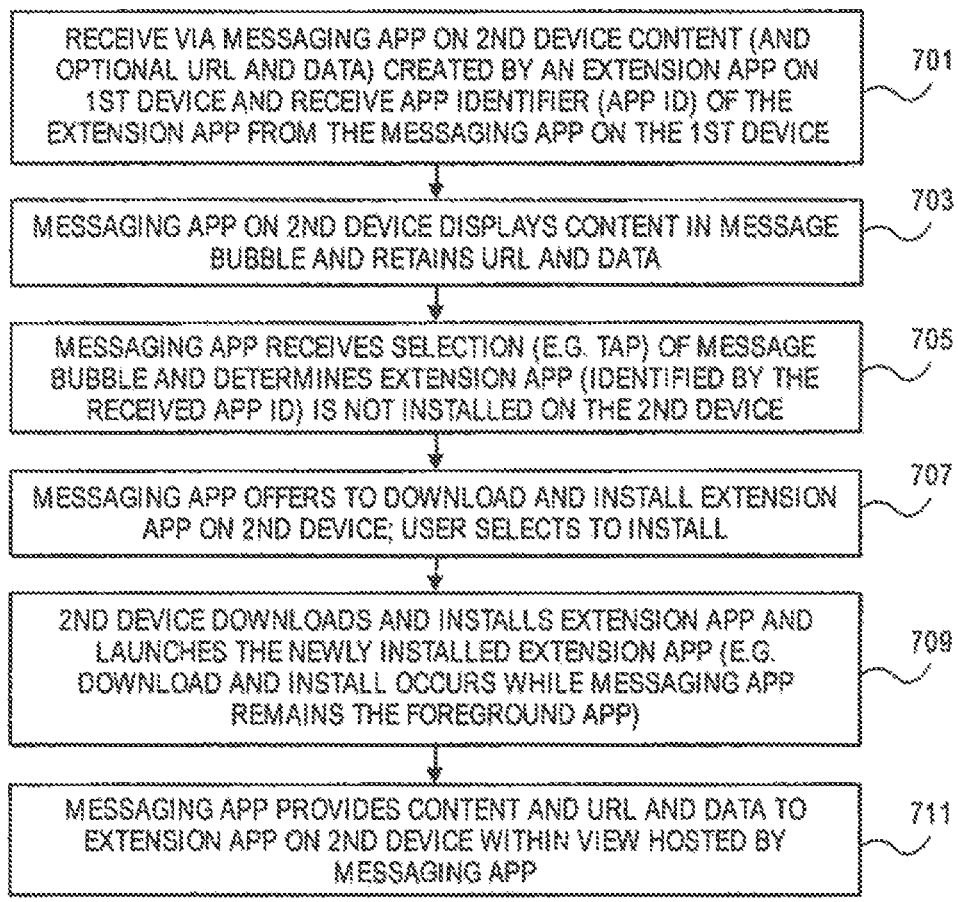
FIG. 14A shows a method according to one embodiment in which a receiving device (which has received a message) downloads and installs an extension app required to view or interact with the content in one of the messages.
Figure 14B:
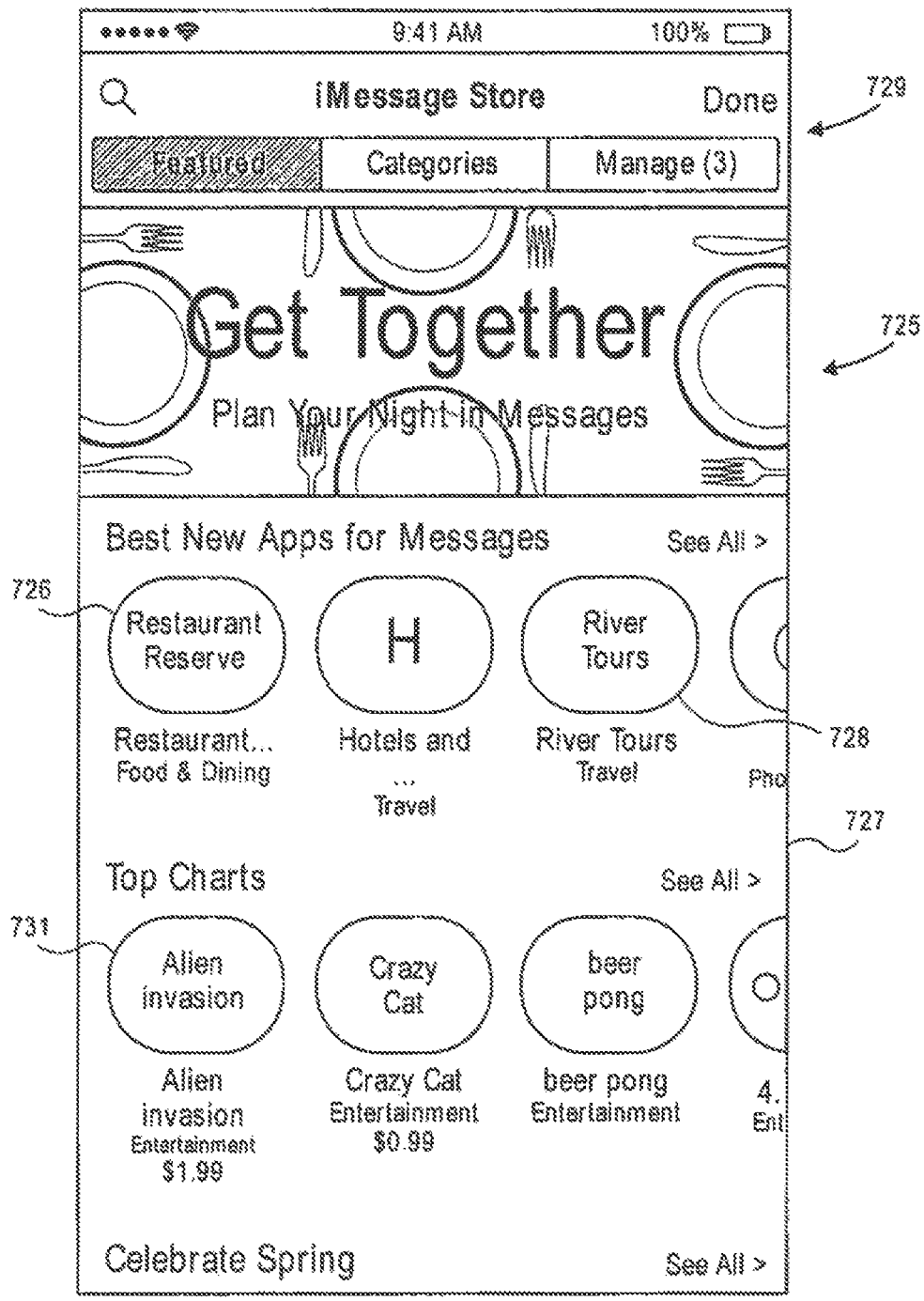
FIG. 14B shows an example of a user interface of an extension app marketplace or service from which extension apps can be downloaded and installed.

Referring to FIG. 4B, it can be seen that the browsable view 157 includes a plurality of icons each representing one of the installed extension apps that can operate with the messaging app that provides the user interface shown in FIG. 4B. The user interface of the messaging app shown in FIG. 4B includes a message transcript 153 shown in the upper portion of the touch screen 151 on the communication device 150 which executes the messaging app. A user name 154 of the other user (recipient of messages sent from communication device 150) is shown at the top of the user interface of the messaging app. A text entry region 155 (which shows text or other content that is staged or ready to be sent) is displayed between the message transcript 153 and the browsable view 157. In one embodiment, the browsable view is browsable by swiping the user's finger across the touch screen to cause the pages in the various views of installed extension apps to be displayed (and in one embodiment, can also show, for example, uninstalled extension apps that either need to complete a download process or need to complete an install process). In one embodiment, a page indicator 159 at the bottom of the user interface can show the current page of installed extension apps. In one embodiment, one of the icons can be reserved to launch or enter the extension app marketplace, an example of which is shown in FIG. 14B. In another embodiment the extension app marketplace can be displayed in the browsable view 157 in response to selecting icon 167. In the embodiment shown in FIG. 4B, the icon 167 is the extension app marketplace icon which can be selected to cause the presentation of the extension app marketplace, such as the extension app marketplace shown in FIG. 14B. In the embodiment shown in FIG. 4B, the icon 169 can be selected (e.g. user taps icon 169) to cause the display in the browsable view of recently sent stickers or handwritten messages or other recently sent items or recently used apps, etc. The display of recently sent items, etc. can in one embodiment be provided by a plug-in operating within the messaging app's process. Other extension apps include a restaurant reservation app icon 161 which can be an extension app that can be used to engage a restaurant reservation service, such as Open Table. Another example of an extension app is represented by icon 163 which when selected launches a restaurant review app which provides reviews of restaurants and which can be similar to the reviews provided by Yelp, for example. The other extension app icons 165 and 171 represent other extension apps which are installed and which can be launched by selecting one of those extension app icons.

Referring back to FIG. 4A, once the browsable view is displayed by operation 105, the user can select one of the extension apps by selecting the corresponding icon which in turn causes the launching of the selected extension app in operation 107. In one embodiment, the messaging app calls a system service to launch the selected extension app and prepare it for execution as an extension of the messaging app using the architecture shown, for example, in FIG. 3A. Once the selected extension app has been launched and is executing, the messaging app, such as messaging app 76 can host the view of the content provided by the executing extension app through the IPC framework as described herein. For example, in operation 109 shown in FIG. 4A, the messaging app can display a view of the content provided by the extension app within a portion of the view of the messaging app. FIGS. 5A through 5F will now be described as examples of how the messaging app hosts the view of the content of the executing extension app.

Figure 5A:
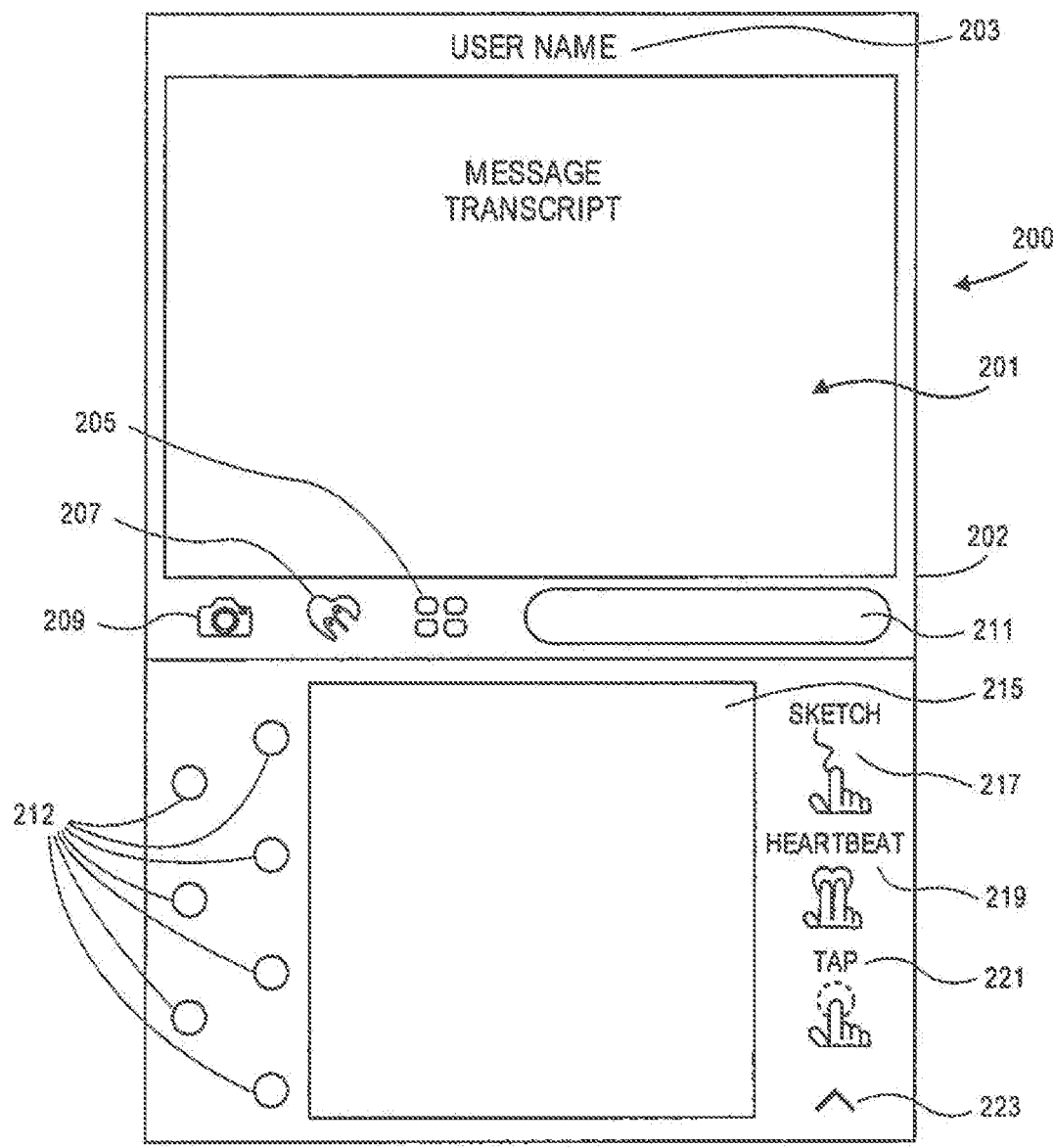
FIG. 5A shows an example of a user interface of a messaging app which includes a view of an extension app within the user interface of the messaging app.
Figure 5B:
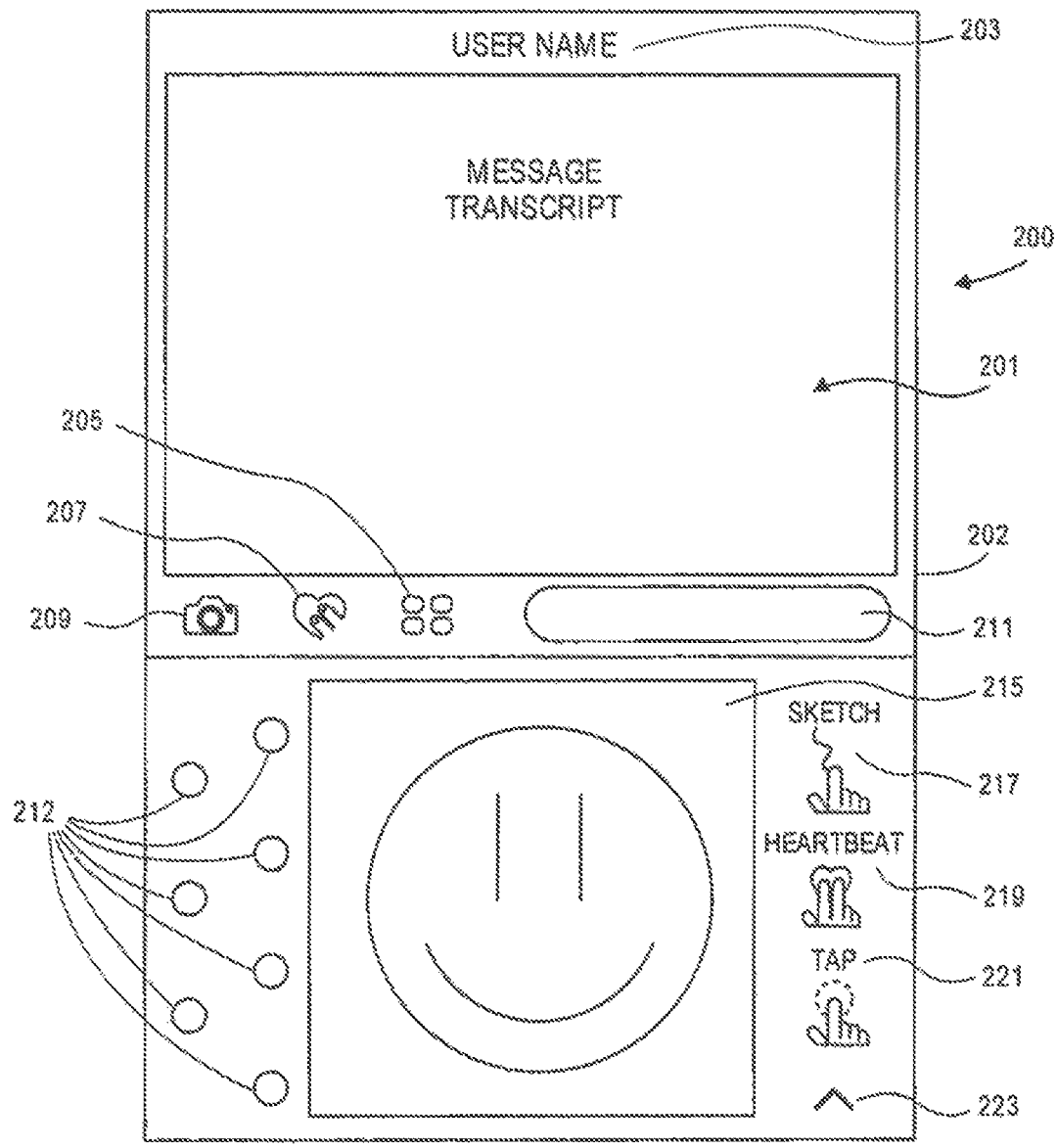
FIG. 5B shows an example of a user interface of an extension app, after the user has created content in the extension app, wherein the view of the extension app is hosted within the user interface of the messaging app.
Figure 5C:
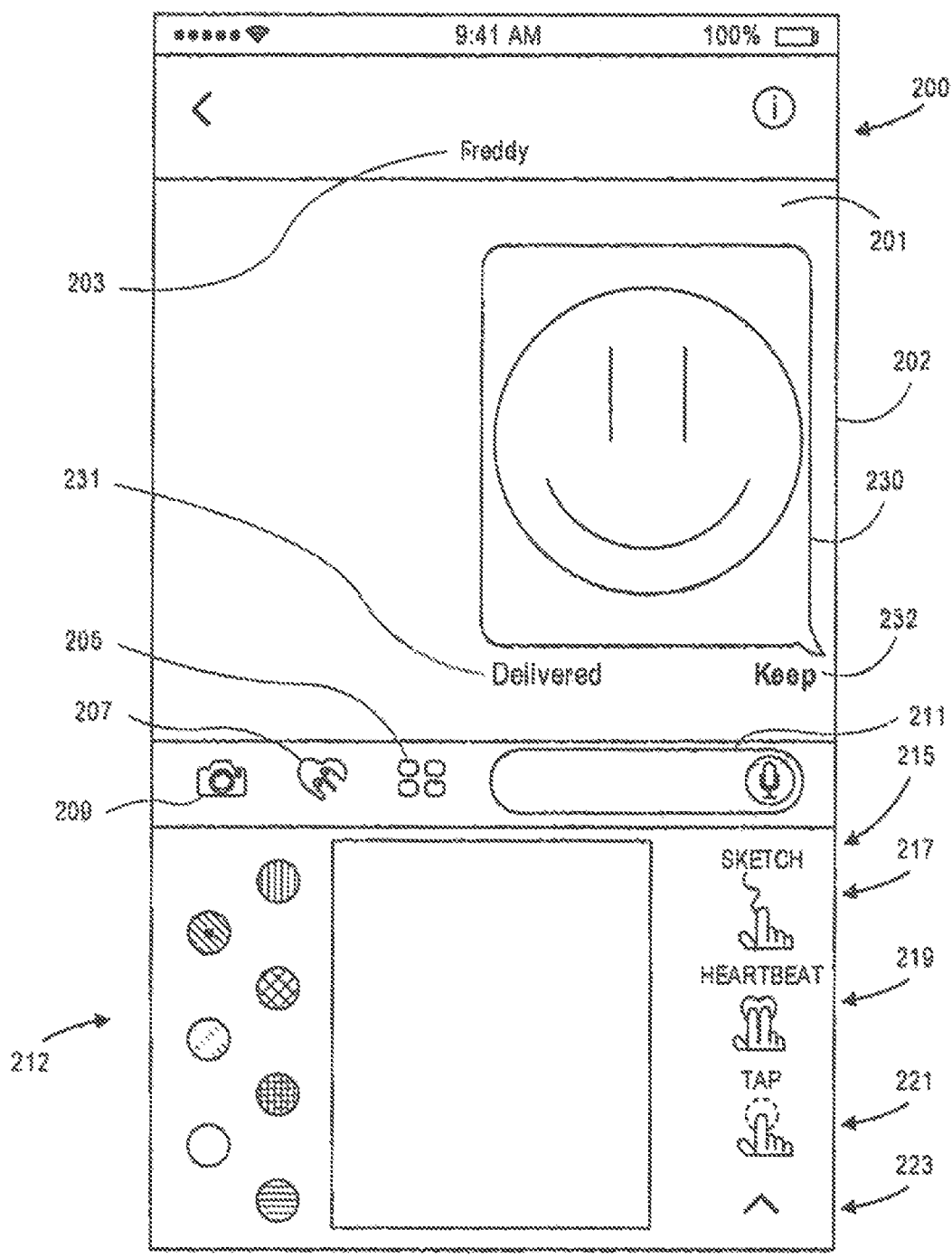
FIG. 5C shows an example of a user interface of a messaging app on a communication device after the user has created content using an extension app and has sent the content by using the messaging app to send the content.

FIG. 5A shows an example of a messaging app that hosts a view of a plug-in of a messaging app that is an image creation app launched by selecting the icon 207 (e.g. icon 207 is touched or tapped or otherwise selected by a user). In another embodiment, the plug-in shown in the bottom portion of the user interface shown in FIG. 5A may be launched by selecting one of the icons in the browsable view 157 shown in FIG. 4B. While the example shown in FIG. 5A can be implemented as a plug-in of the messaging app, in another embodiment, the example shown in FIG. 5A can be an extension app. In the example shown in FIG. 5A, the view of the plug-in (or extension app) has taken the place of the on-screen keyboard of the messaging app, but the message transcript of the messaging app is still viewable and displayed in the user interface, allowing the user to scroll through the message transcript in one embodiment to see the entire transcript. In another embodiment, the view of the plug-in or extension app is an overlay on top of the on-screen keyboard, a portion of which may be viewable. The transcript is displayed on the touchscreen 202 in one embodiment on the communication device 200. The user interface of the message app also includes the user name 203 which presents in one embodiment the name of the other user in the conversation or chat. The user interface of the message app also includes the text entry region 211 which is similar to the text entry region 18A and the text entry region 155. The plug-in (or extension app) includes a drawing canvas 215 and various controls and options which can be selected by the user to draw or create images. Drawing controls 212 in one embodiment can allow the users to select different colors to sketch on the drawing canvas if the sketch option 217 is selected. The plug-in (or extension app) can also provide taps as a message if the tap option 221 is selected. The plug-in (or extension app) can also provide heartbeats if the heartbeat option 219 is selected. In one embodiment, the sketch, heartbeat, and taps can be similar to the sketch, heartbeat and taps on the Digital Touch application which is available on the Apple Watch. The plug-in (or extension app) also includes an expanded view icon 223 which when selected can cause the plug-in (or extension app) to switch from its current compact view shown in FIG. 5A to an expanded view, such as the expanded view shown in FIG. 7B. In the example shown in FIG. 5A, the user has just launched the plug-in image creation app (or an extension app in the alternative embodiment) and has not yet created any content. This can be contrasted with the state of the plug-in (or extension app) shown in FIG. 5B in which the user has created a happy face sketch by using the sketch option 217 and by drawing on the drawing canvas 215 with, for example, the user's finger. The user can then cause the drawing to be sent to the other user (or users) who would be recipients for the message. Thus for example, the user of the device 200 can select a send command from within the messaging app executing on communication device 200 to cause the content created by the plug-in (or extension app) to be sent to the recipients. The result of the sending operation is shown in FIG. 5C in which the happy face has been sent to Freddy as indicated by the user name 203. The message bubble 230 shows the happy face sketch that was created by the plug-in (or extension app); in the case of the extension app, this created content was communicated from the extension app through the IPC frame work to the messaging app and then presented within the message bubble 230 to show that the message containing that content was transmitted to one or more recipients. In one embodiment, a delivery indicator 231 can indicate that the message was delivered and a keep control 232 can be provided to the user to allow the user to retain the content in the message transcript in those embodiments in which the content can be automatically eliminated after a period of time.

Figure 5D:
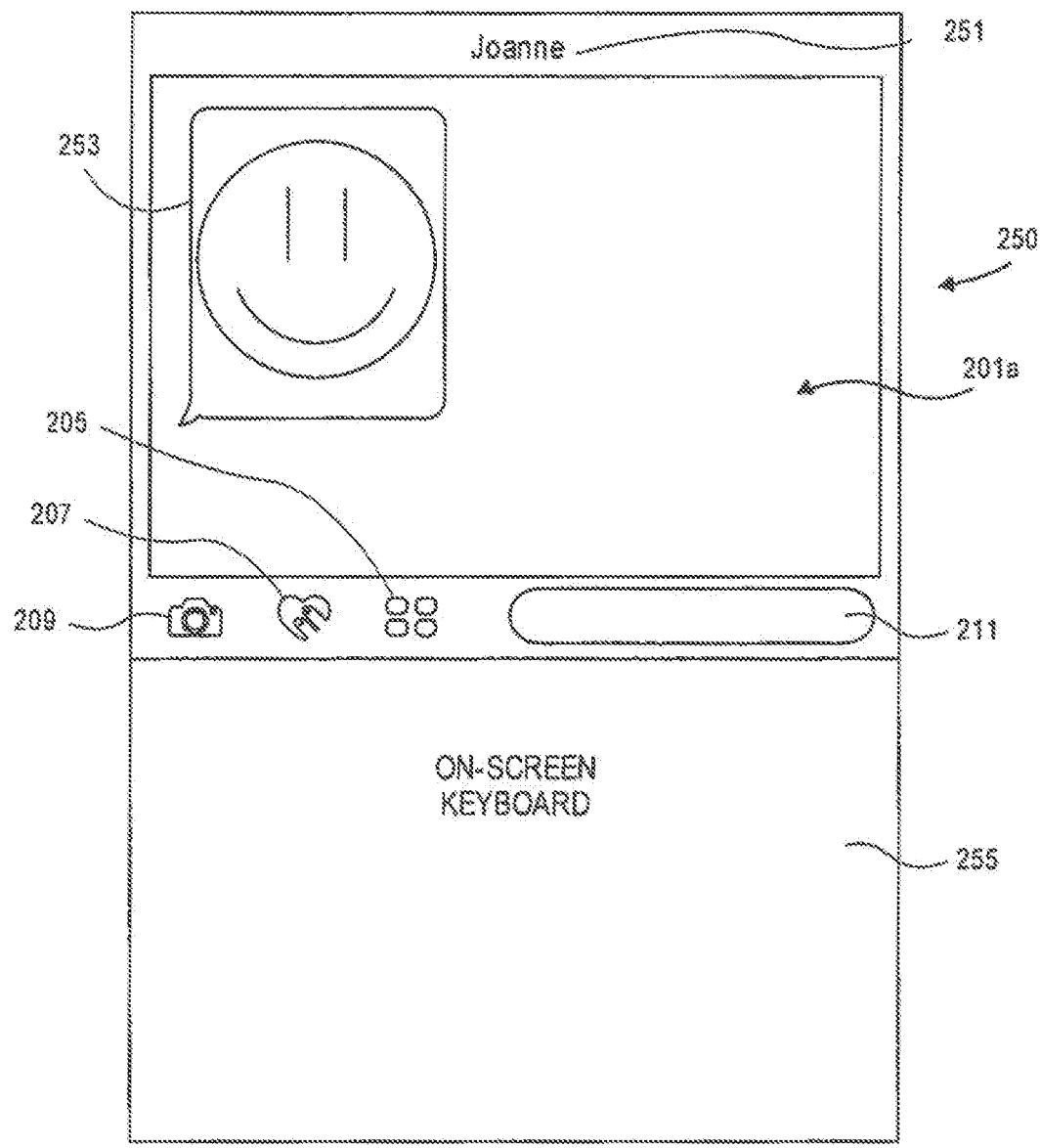
FIG. 5D shows an example of a user interface in a messaging app on a receiving device after the receiving device receives content created by an extension app on the sending device.
Figure 5E:
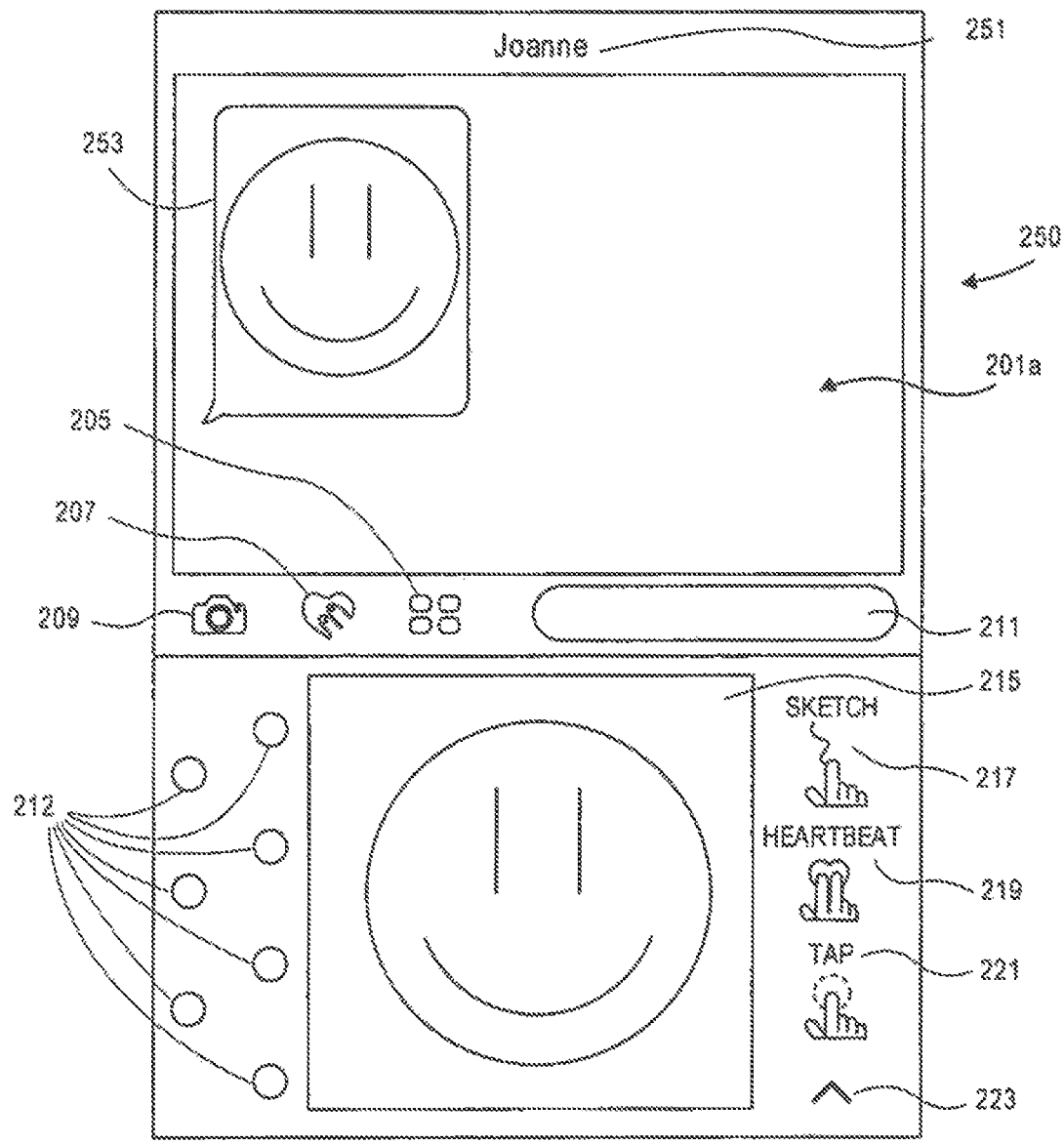
FIG. 5E shows an example of a user interface on a receiving device when the user of the receiving device selects the message bubble containing the content created by the extension app on the sending device so that the user of the receiving device can edit the content on the receiving device.
Figure 5F:
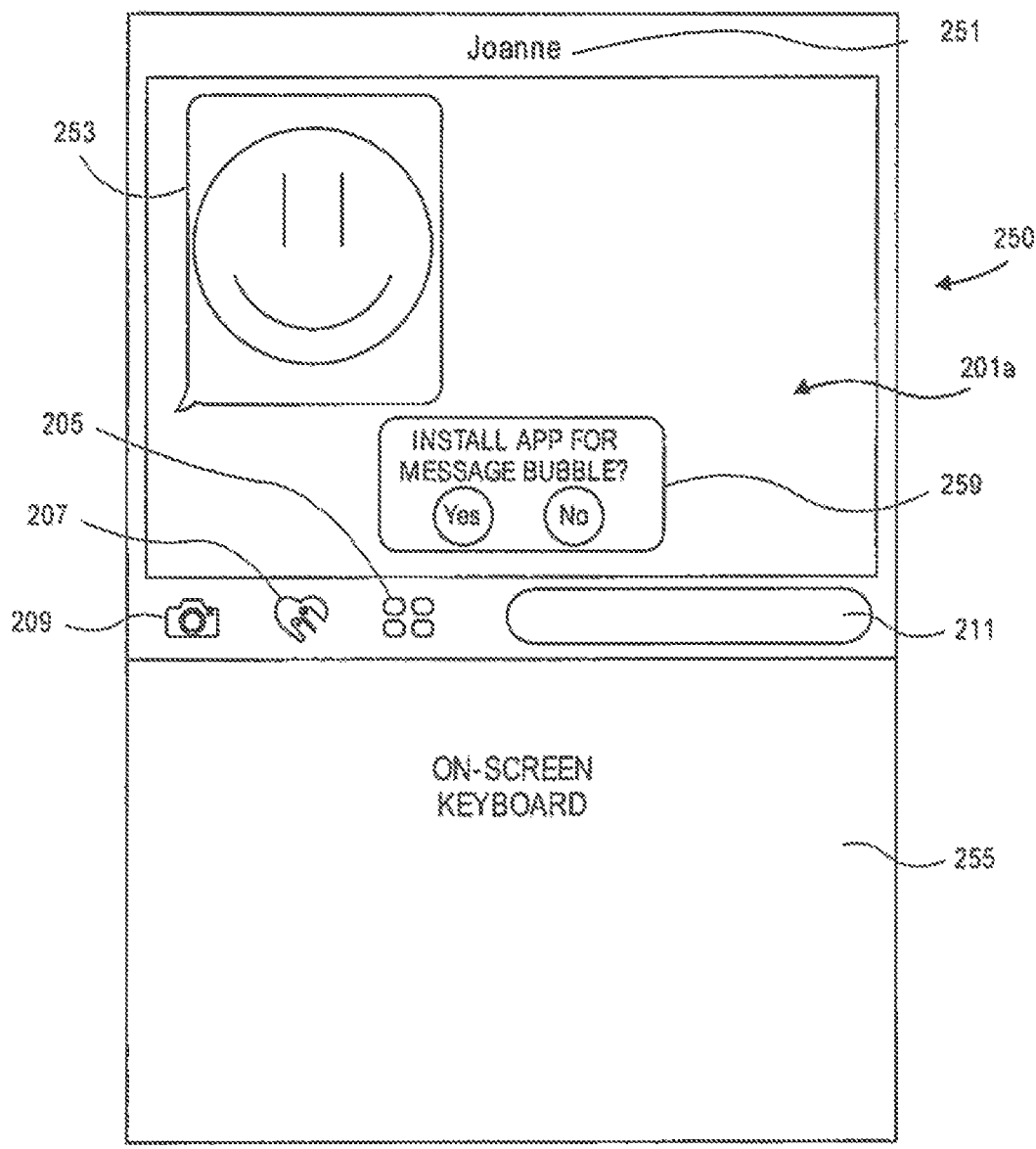
FIG. 5F shows an example of a user interface which offers to download and install an extension app for use with the messaging app on the device.

FIGS. 5D, 5E, and 5F illustrate what can happen on the receiver's device in response to receiving the content from the communication device 200 shown in FIG. 5C. Also, the flowchart shown in FIG. 6 can show the method performed at the receiving device, such as the communication device 250 shown in FIGS. 5D, 5E, and 5F. Referring now to FIG. 5D, it can be seen that the communication device 250 (used by Freddy) has received the happy face content which is shown in message bubble 253. This content was created by the extension app executing on communication device 200 which provided the happy face content to the messaging app executing on communication device 200 which in turn transmitted that content through a messaging service (e.g., a set of messaging servers, such as the messaging servers 51 shown in FIG. 2) to the messaging app executing on the communication device 250 which in turn presented the content in the message bubble 253. In one embodiment, the content can be rendered by the messaging app as it uses known standard formats (including standard image, audio, and video formats in one embodiment) and thus the extension app need not be installed or executing in order to show the content created by the counterpart (remote) extension application on the sending device. Thus in this case as shown in FIG. 5D, the message bubble 253 can present the content even though the counterpart extension application may not be executed or may not even be installed on the communication device 250. The messaging app shown in FIG. 5D includes, in its user interface, a message transcript 201A, a text entry region 211, and an on-screen keyboard 255. In one embodiment, content received from a remote extension app will not cause the launching automatically of the corresponding extension app on the receiving device even if the corresponding extension app is installed. In this embodiment, the corresponding extension app on the receiving device can be launched by the user's selection of the message bubble containing the content created by the remote extension app. If the user does select that content by, for example, touching or otherwise selecting the message bubble 253, then the extension app that corresponds to the remote extension app will be launched if installed on the communication device 250. The result is shown in FIG. 5E in which the user interface of the extension app has occupied the space in which the on-screen keyboard 255 was previously displayed and shows the happy face drawing within the canvas 215 allowing the user of the communication device 250 to alter or otherwise modify that sketch and perhaps send it back to the other user in the chat session or conversation. If, on the other hand, the corresponding extension app is not installed on the communication device, then in one embodiment the messaging app can present a notice to the user asking or offering to install the app for the particular message bubble which was selected. An example of this is shown in FIG. 5F in which the notice 259 includes two user selectable options, one of which will install the required app for the message bubble. In another embodiment, a sheet that shows a page of information from an extension app marketplace can be displayed within the view of the messaging app.

In one embodiment, the message transmitted from the remote device to the communication device 250 contains metadata which specifies the remote extension app used to create the content. In one embodiment, this metadata can be an app identifier, such as an identifier provided by an app marketplace or an extension app marketplace from which the extension apps can be downloaded and installed or can be a different identifier that can be associated with the identifier used by the app marketplace. In one embodiment, the notice 259 can result from the selection of the message bubble 253, while in another embodiment it can result automatically if the app identifier in the metadata for the content is not installed when the content for the message bubble 253 is received by the communication device 250.

Figure 6:
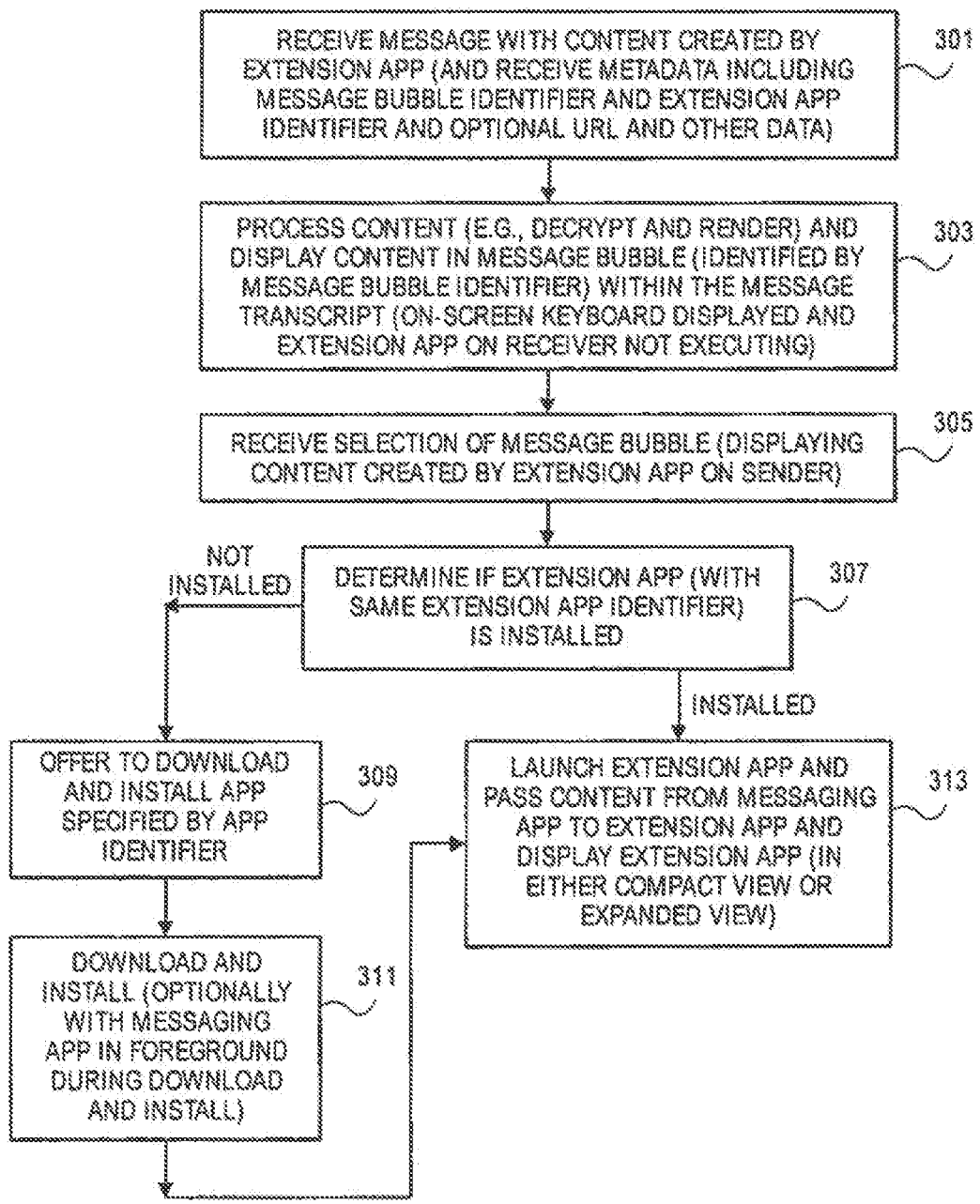
FIG. 6 is a flowchart which illustrates a method which can be performed on a receiving device according to one embodiment described herein.

FIG. 6 will now be referred to in conjunction with FIGS. 5D, 5E, and 5F to explain a method in one embodiment in which a receiving device processes content created by a remote extension app, such as the remote extension app executing in conjunction with the messaging app on communication device 200. In operation 301, a communication device can receive a message with content created by an extension app, such as a remote extension app operating in conjunction with a messaging app on a sending device. In addition, the communication device can also receive the metadata which can include a message bubble identifier, session identifier and an extension app identifier and potentially other data such as an optional resource locator and other data (state information) that may be associated with the optional resource locator and the resource locator may also include state information that is encoded into the resource locator. Further information with respect to the use of resource locators and data associated with the resource locators will be provided in conjunction with FIGS. 8, 9A, and 9B. Then in operation 303, the communication device which has received the message in operation 301 processes the content and displays the content in a message bubble which was identified by the message bubble identifier, and the message bubble is displayed within the message transcript. In one embodiment the processing of the content can include decrypting the content and rendering the content for presentation and display within the message bubble. In one embodiment, the content is displayed by the messaging app without assistance from the extension app; in other words, the extension app may not be installed or if installed is not executing on the communication device, and hence the on-screen keyboard is displayed in one embodiment. Then in operation 305 the communication device receives a selection of the message bubble displaying the content created by the remote extension app. In one embodiment, referring to FIG. 5D, the user can tap on the message bubble on a touchscreen or otherwise select (e.g. user uses a stylus on a touchscreen or uses a mouse with a desktop computer, etc.) the message bubble 253 to cause the selection in operation 305. In response to operation 305, the communication device, such as communication device 250 determines in operation 307 whether or not the extension app is installed. This can be performed in one embodiment by examining a list or registration of installed extension apps maintained by the messaging app. In one embodiment, the metadata received in operation 301 includes the app identifier, and the messaging app in operation 307 searches the list to determine whether the identifier is present in the list. If the identifier is not present in the list then the messaging app determines that the extension app is not installed, thereby causing the communication device to perform operation 309 in which the notice 259, shown in FIG. 5F, can be displayed to the user to offer to download and install the app specified by the app identifier which was received as part of the metadata in operation 301. If the user selects the option "yes" then operation 311 is performed in which the messaging app causes the communication device to access the extension app marketplace (such as the extension app marketplace having a user interface shown in FIG. 14B) to retrieve through a download process a copy of the extension app and to cause the extension app to be installed. In one embodiment, operation 311 may be performed entirely in the background so that the messaging app remains the foreground app during the download and install process. FIG. 9C shows an example of a message bubble 471 maintained in a message transcript during the download and install process, where the message bubble includes a progress bar 473 which indicates the progress of the download and install operation while the messaging app remains the foreground application displaying the message bubble 471 in the message transcript of the messaging app. In another embodiment of the operation 311, a sheet that shows a page of information from an extension app marketplace can be displayed over the messaging app (with a portion of the messaging app optionally still displayed), and the sheet can show a "buy" or install or download button, which if selected, can cause the download and installation of the extension app, and the sheet can be dismissed (removed from display) either by selecting a dismiss command or by selecting buy or install or download. After downloading and installing the extension app, processing can proceed to operation 313 in FIG. 6 in which the extension app is launched and the content and other data used or created by the remote extension app is passed (via IPC) to the extension app by the messaging app, and the extension app is displayed in either a compact or expanded view in one embodiment and the content created by the remote extension app is displayed within that view. As shown in FIG. 6, operation 313 also follows operation 307 if operation 307 determines that the extension app is installed. FIG. 5E shows one example of the result of operation 313.

In one embodiment, a messaging app can launch different types of extension apps in different ways depending upon the type of the extension app. For example, one type of extension app can be launched automatically in response to receipt of a message bubble containing content from an extension app having a certain predetermined type. Other extension apps having a different type may only be launched in one embodiment in response to the selection of a message bubble containing content from that extension app or by the selection of an icon representing the extension app in a browsable view, such as browsable view 571. It may be desirable to allow certain extension apps having a certain type to be launched automatically in response to receiving content that is displayed within the message transcript while not automatically launching other types of extension apps. In another alternative embodiment, one or more extension apps can be permitted to execute in the background and can be allowed to update their respective user interfaces that are presented in their respective message bubbles.

In an alternative embodiment, the metadata can include a format or extension identifier such as an identifier of an image format that can be used to determine available extension apps that can process that image format on the receiving device.

Figure 7A:
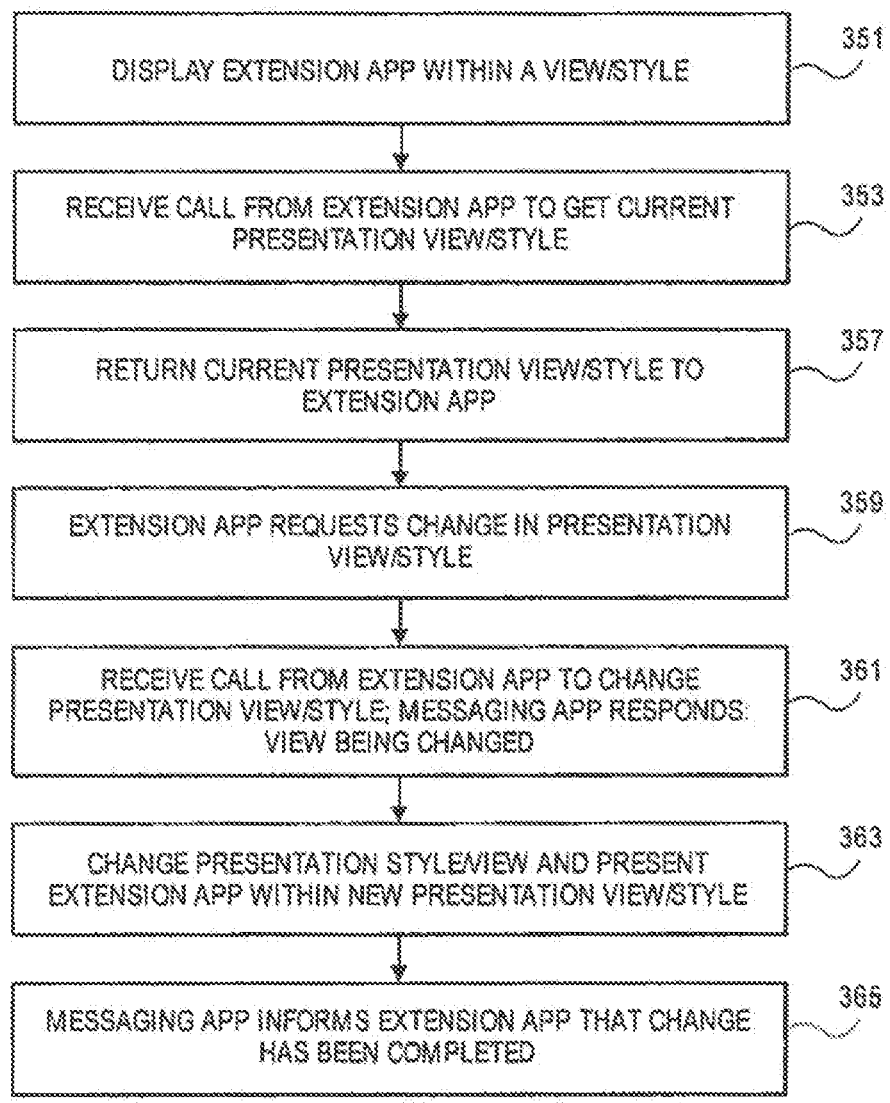
FIG. 7A is a flowchart which depicts a method according to one embodiment in which an extension app can change its view hosted by a messaging app according to one embodiment.
Figure 7B:
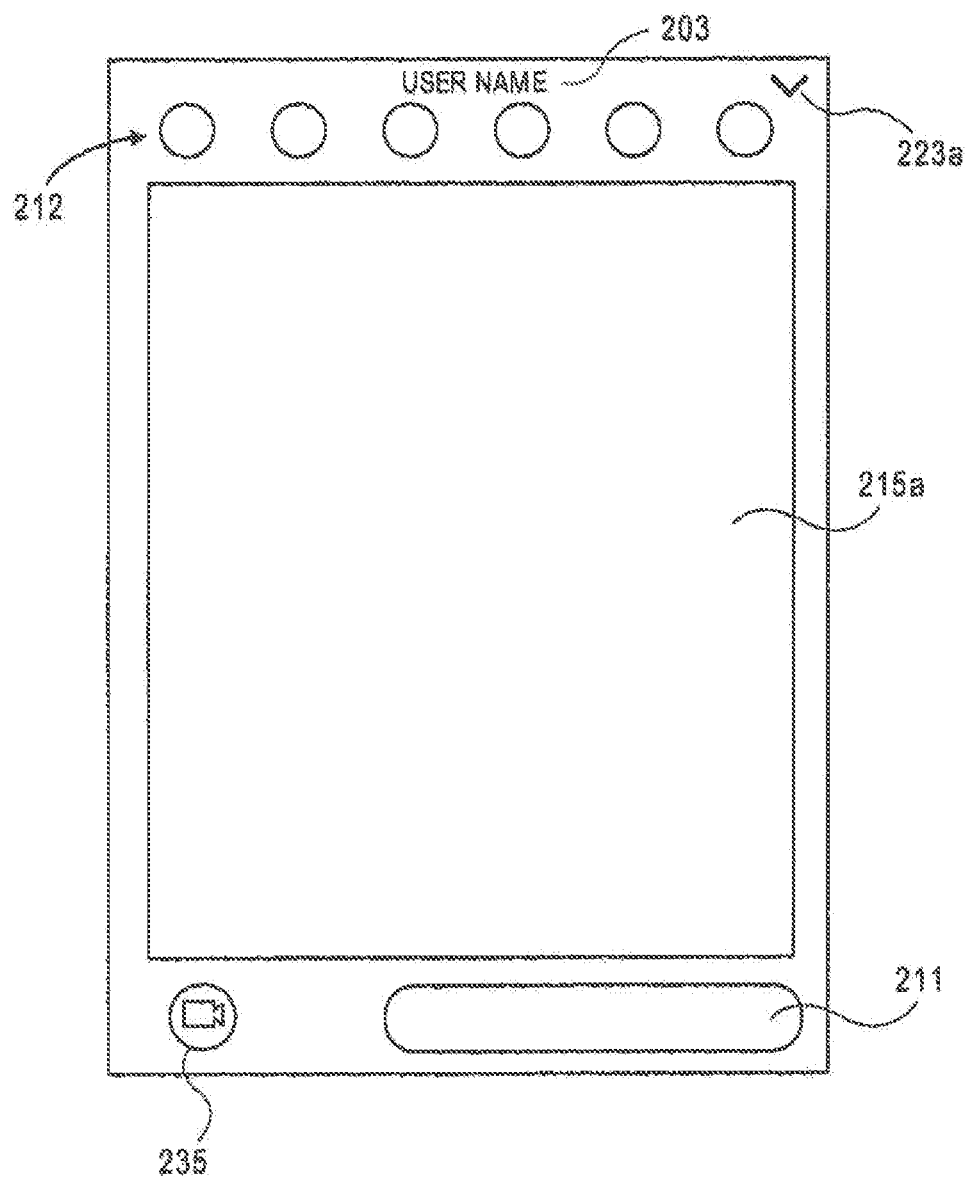
FIG. 7B shows an example of a user interface of an extension app in an expanded view according to one embodiment.

FIGS. 7A and 7B illustrate another aspect of the embodiments described herein in which the extension app can cause a view to be changed by sending communications to the messaging app to cause that change. In one embodiment, an application programming interface (API) can be provided between the extension app and the messaging app to allow the extension app to make calls to that API to change its view within the messaging app which hosts the view of the extension app. In one embodiment, an extension app can have at least two different views which can include a compact view and an expanded view. In one embodiment, the compact view may be a view which takes the place of the on-screen keyboard of the messaging app while the message transcript remains displayed in the user interface of the messaging app. In the expanded view, the message transcript is no longer displayed and the on-screen keyboard is not displayed but certain other components of the user interface of the messaging app, such as text entry region 211 and a camera activation icon 235 are displayed. FIG. 7B shows an example of an expanded view in which the drawing canvas 215A occupies most of the space of the touch screen. As shown in FIG. 7B, the compact view icon 223A can be selected by the user to cause the system to change from the expanded view shown in FIG. 7B back to the compact view, such as the view shown in FIG. 5A.

The method shown in FIG. 7A is one embodiment showing how the view can change, and it will be appreciated that in alternative embodiments, the sequence of operations may be performed in a different order and there may be omitted steps or intervening steps or additional steps.

In operation 351 of FIG. 7A, the extension app is displayed by the messaging app with a particular view or style. In operation 353, the extension app can make a call to the messaging app to get the current presentation view/style of the extension app. In operation 357, the messaging app can provide a return for the call from operation 353, and that return can indicate the current presentation view/style of the extension app. In response to that current presentation received in operation 357, the extension app can request a change in the presentation view/style by providing a call to the messaging app to cause that change to occur, and that call is received in operation 361. The messaging app in one embodiment can initially respond to this call with an acknowledgement that the view is being changed or will be changed. In response to the call, in operation 363, the messaging app changes the presentation style/view and displays the extension app within the requested view presentation view/style and in operation 365 the messaging app informs the extension app that the change of view has been completed. Referring back to FIG. 7B, if the user selects the compact view icon 223A, this can cause a call from the extension app to the messaging app to change the view of the extension app within the user interface of the messaging app.

Figure 8:
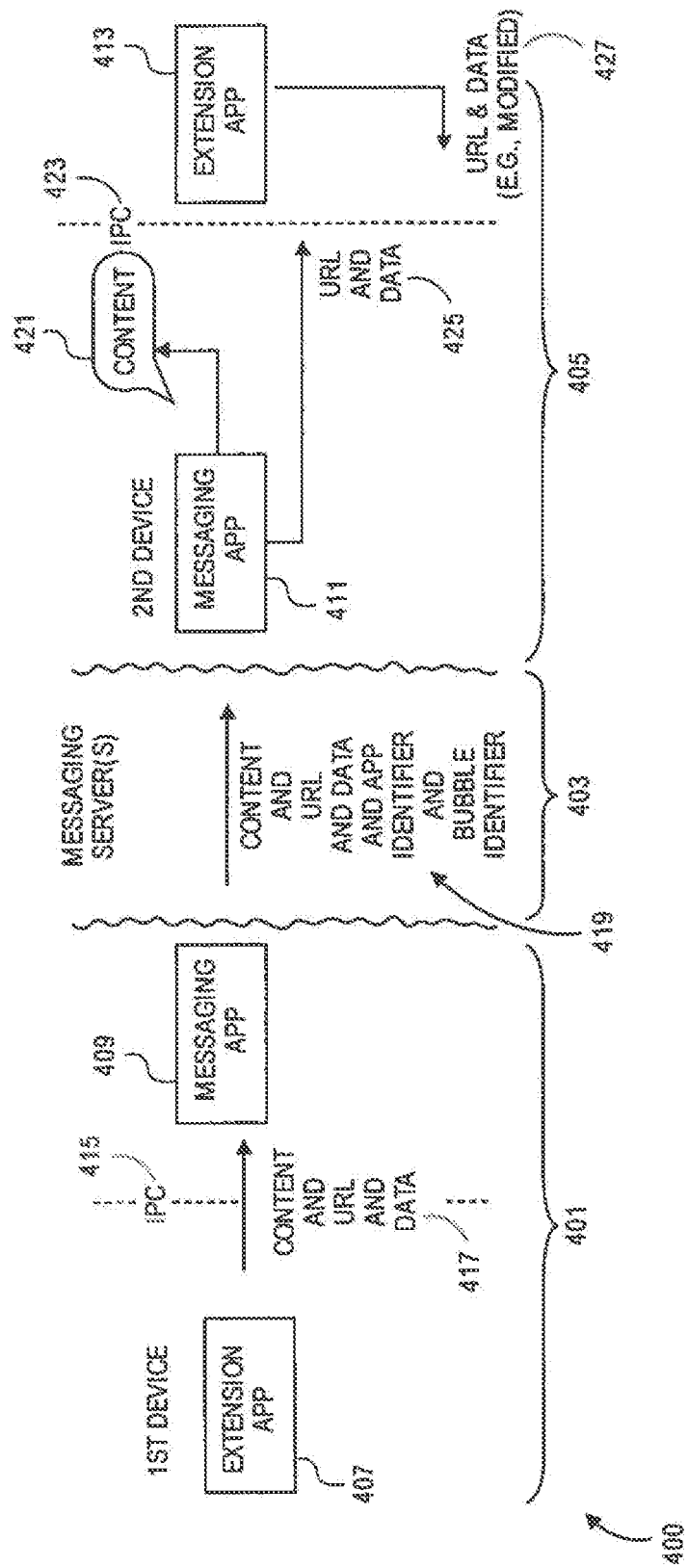
FIG. 8 shows an example according to one embodiment in which extension apps on two or more devices can interact with each other through the messaging apps on each device.
Figure 9A:
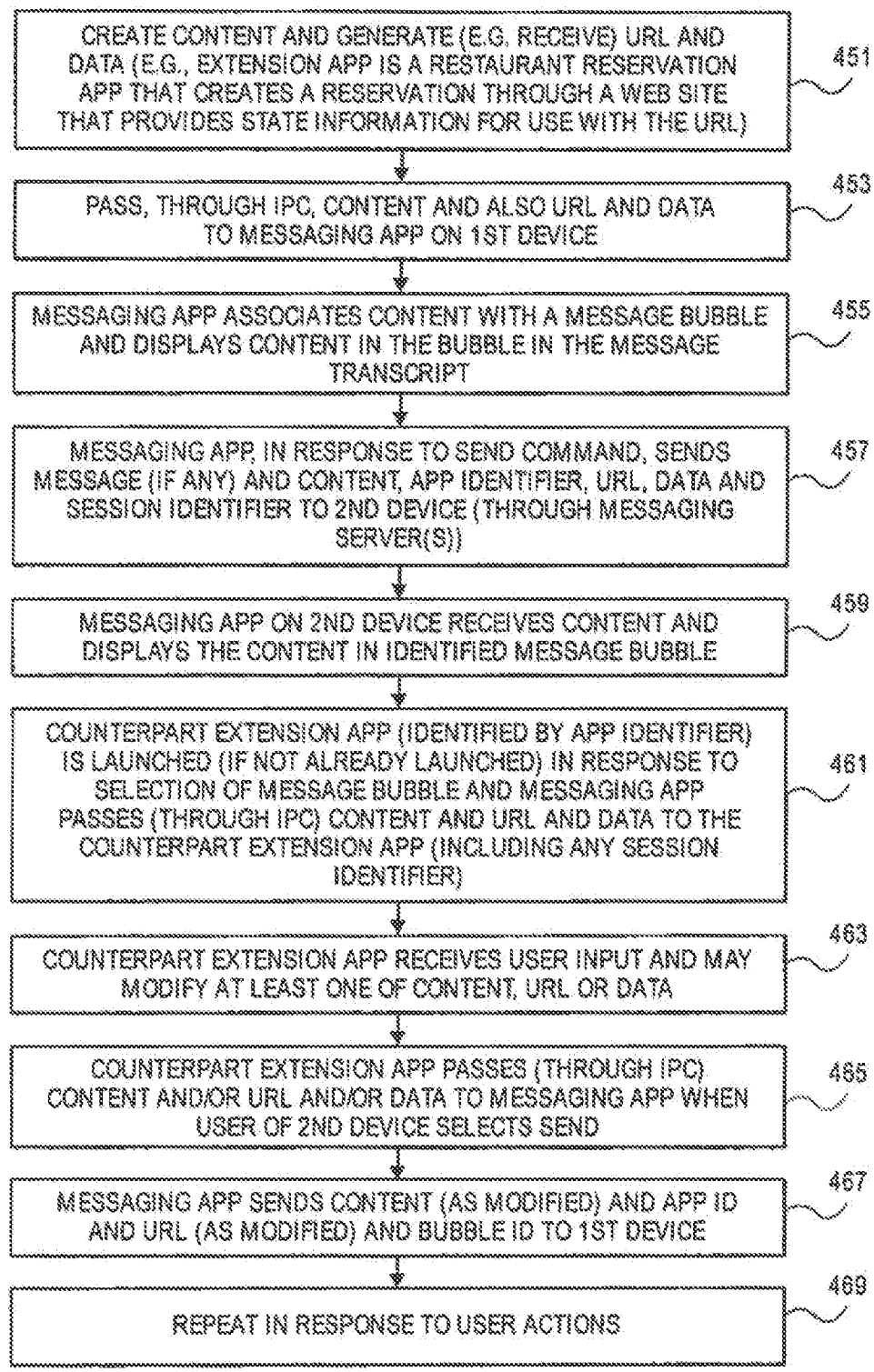
FIG. 9A is a flowchart which illustrates a method according to one or more embodiments described herein for allowing the interaction between extension apps on different devices.
Figure 9B:
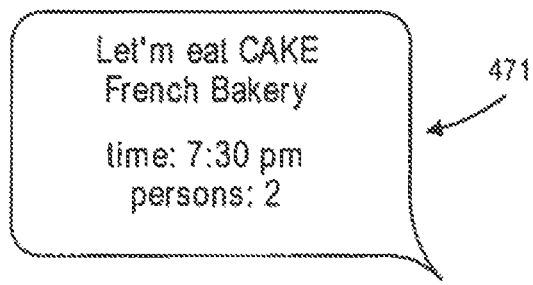
FIG. 9B shows an example of a message bubble in a user interface which can result from the method shown in FIG. 9A when two or more extension apps interact in a session.
Figure 9C:
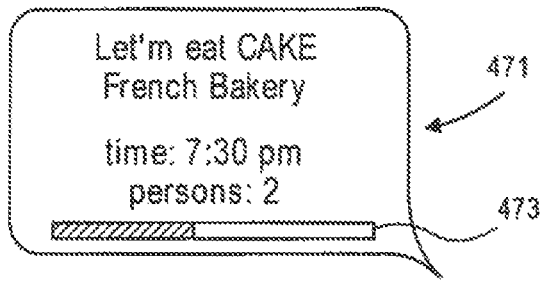
FIG. 9C shows an example of a message bubble according to one embodiment in which a download and install for a required extension app occurs while the messaging app remains in the foreground.

FIGS. 8, 9A, 9B, and 9C will now be described relative to another aspect of the embodiments presented herein. In one aspect of this embodiment, an extension app and a counterpart extension app on another device can engage in a communication session and exchange information back and forth in their communication session, and all of this occurs within the context of a message transcript maintained by the two messaging apps which interface between the two extension apps as shown in FIG. 8. In one embodiment, plug-ins for a messaging app can also operate in a similar way and exchange information between the plug-ins through two messaging apps that are in a session. The messaging system 400 shown in FIG. 8 includes at least two clients devices, client device 401 and client device 405 and also includes a set of one or more messaging servers 403. The client devices 401 and 405 can be similar to the client devices 53 and 54 in FIG. 2, and the set of one or more messaging servers 403 can be similar to the set of messaging servers 51 shown in FIG. 2. Each client device can include an installed copy of a particular extension app (such as, for example, an extension app for making reservations at restaurants), and the extension app on each device can be used to create content (e.g. text, images, audio, video, etc.), and this content is passed, through an interprocess communication framework to the messaging app on the device for a specific message, which can be referred to as a message bubble, in the message transcript on the particular client device. The message app receives the content (and optionally other data from the extension app, including for example an identifier of the extension app, a resource locator and optionally metadata for use by a counterpart or remote extension app on the other device, etc.) and displays the displayable content (such as an image of a restaurant provided by the extension app which is a restaurant reservation app such as "Open Table" in the message bubble in the message transcript). In effect, the messaging app hosts a view within the messaging app and the content of that view is provided by the extension app. The resource locator and metadata in one embodiment are opaque to the messaging app (e.g. cannot be recognized by the messaging app) but can be used by the extension apps on each device to maintain state information for the session between the extension apps, and the messaging apps on each device act as a communication mechanism between the extension apps by passing the resource locator and metadata between the extension apps. In one embodiment, state information about the session may be encoded in the resource locator or may be provided in the metadata or may in both. In one embodiment, the content created from a session on each device is displayed within the same single message bubble (identified by a session identifier that can be maintained by the messaging app) in the message transcripts, and each time the content changes (based on changes from either device), the updated content continues to be displayed within a single message bubble in the message transcript and any prior message bubbles that displayed content in the session can be converted into breadcrumbs, and these prior message bubbles will also include the same session identifier as the new, updated message bubble. The operations and functions of the components shown in FIG. 8 will now be described while referring to FIG. 9A which shows a method of operating the messaging system 400 in one embodiment.

In operation 451 of FIG. 9A an extension app, such as the extension app 407 can create content and generate a resource locator and data (or can modify existing content, resource locator or data). The extension app can be similar to the extension app 83 and is executing in one embodiment in one process while the messaging app, which can be similar to the messaging app 76, is executing in another process and communication between the processes occurs through an IPC, such as the IPC 81 which can be a software framework or library for providing interprocess communication between two distinct processes. The extension app 407 can be, for example, a restaurant reservation app that creates a reservation through a website that can provide a state information for use with the resource locator (or the state information can be encoded into the resource locator). In one embodiment, the data provided with the resource locator can be a state information provided from the website, and the state information can include information about the particular restaurant and the time of the reservation and the number of people in the reservation. The extension app 407 can present, in either a compact view or expanded view the user interface for making the restaurant reservation through the website while the remainder of the messaging app is displayed, including for example the message transcript. Thus the user of the extension app 407 can see the context of the conversation in the message transcript while interacting with the extension app and the website (through the extension app) to create a restaurant reservation. In one embodiment, the user may be able to browse through various restaurants (within the restaurant reservation app) and search for restaurants. After the user of the extension app 407 has selected a restaurant and entered a reservation, the extension app 407 can pass, through the IPC 415, content and also the resource locator and data 417 shown in FIG. 8 for the messaging app on device 401. This is shown as operation 453 in FIG. 9A. In operation 455, the messaging app 409 associates the content received from the extension app 407 with the message bubble and displays content in the bubble in the message transcript in the user interface of the messaging app 409. Then in operation 457, the messaging app 409, in response to a send command received from the user, sends a message (if any) and content received from the extension app 407, and an app identifier which identifies the extension app 407 (and optionally an icon of the extension app 407), and the resource locator and the data (if any) and a session identifier to the second device through the one or more messaging servers 403 which pass the communication 419 to the second device 405 (also referred to as client device 405). In one embodiment, the operations 453 and 455 can occur as part of operation 457 in response to the messaging app receiving the selection of the send command. The icon of the extension app 407 can be displayed on the message bubble on the receiving device even if the counterpart extension app is not installed; see for example, icon 87 in FIG. 3B. In operation 459 shown in FIG. 9A, the messaging app 411 on the client device 405 receives the content from the one or more messaging servers 403 and displays the content in the identified message bubble 421 within the message transcript provided by the user interface of the messaging app 411. FIG. 9B shows a more detailed example of such a message bubble 471 having content created by a restaurant reservation extension app in one embodiment. In the example shown in FIG. 9B, the content includes the name of the restaurant, the time of the reservation and the number of persons of the reservation. In one embodiment, this content can be displayed by the messaging app without requiring that the extension app 413 be launched. In one embodiment, the extension app 413 is not launched until the user of client device 405 selects the message bubble 421, thereby indicating to the client device that the user of the client device 405 intends to interact with the content in the message bubble 421. In an alternative embodiment, the extension app 413 can be launched upon receipt by the messaging app 411 of the content but remain in the background and be ready for execution when the user of client device 405 enters a command to cause the extension app to appear. In operation 461, the extension app 413, which is identified by the app identifier provided in the communication 419 is launched, if not already launched, in response to selection of message bubble 421 and the messaging app 411 passes, through IPC 423 the content associated with message bubble 421 and resource locator and data 425 to the messaging app 413. In one embodiment, the extension app 413 is the counterpart extension app that is the same extension app as extension app 407, while in another embodiment they can be merely compatible in that they can process the same type of content.

At this point, the extension app 413 can receive user input by the user of client device 405 and can modify one or more of the content, the resource locator or the data. For example, the user of client device 405 can cause the extension app 413 to access one or more websites to make a modified restaurant reservation by modifying the time, the number of people, the particular restaurant, etc. In one embodiment, the extension app 413, and also the extension app 407 can interact directly (but separately and independently) with the web server by sending the resource locator and the data to the web server and receiving responses from the web server which may include modified data or modified resource locators, or new data and/or new resource locators etc. In one embodiment, the web server can store data for use during the session, and this stored data can include information for some or all of the state information that can also be maintained by the two extension apps in the session. Again, if the extension app 413 is presented for display in a compact view, then the user of the device 405 can interact with the extension app 413 to make the restaurant reservation while the context and conversation of the chat or messaging session is shown in the message transcript of the messaging app 411. The user of the client device 405 can scroll through the message transcript while continuing to look at and interact with the extension app 413. Thus, the extension app 413 can, in operation 463 receive user input and may modify at least one of the content, the resource locator or data, and then can pass, in operation 465 the resource locator and data 427 (which may be modified or new) to the messaging app 411. In turn, the messaging app 411 in operation 467 can send the content, which may be modified, and the app identifier and the resource locator (which may be modified) and data (which may be modified) and the bubble ID back to the client device 401. As shown in operation 469, this process can repeat over time as the two users work on setting up a restaurant reservation in the example provided herein.

It will be appreciated that many different types of extension apps can provide a collaborative environment between the users of client devices 401 and 405 to exchange information and collaborate together and that restaurant reservation is one such type. Thus, it will be appreciated that the restaurant reservation example that is described relative to FIGS. 8 and 9A is merely an example of one such type of extension app which can provide a collaborative environment in the context of the user interface of a messaging app. Examples of other types of extension apps which can provide a similar collaborative environment include, for example: sticker extension apps; imaging apps; drawing apps; content creation apps; games; music creation apps; content consumption apps; polling apps; map apps; etc.

The collaborative environment shown in FIG. 8 and described relative to FIG. 9A can utilize breadcrumbs in one or more embodiments, and each of the breadcrumbs can be identified by a session identifier. A breadcrumb represents a converted message bubble and is identified by a session identifier that is shared with other message bubbles in the session. Each prior message bubble that is identified with the same session identifier as a new message bubble can be converted in one embodiment into a breadcrumb which can appear differently than the original content shown in the message transcript. As each new message bubble in the session arrives or is added to the message transcript, the prior message bubble identified with the same session identifier can be converted into a breadcrumb in one embodiment, and this is shown in the message transcripts shown in FIGS. 9D, 9E, 9F, 9G, and 9H. FIGS. 9D and 9H show a message transcript 510 on Joe's device, and FIGS. 9E, 9F, and 9G show a message transcript 17 on Lester's device. Message transcript 510 shows Lester's user name 511, and message transcript 517 shows Joe's user name 518. In the example shown in FIGS. 9D, 9E, 9F, 9G, and 9H, Lester and Joe are engaged in a text messaging conversation and are each using an extension app, such as an image creation app or other extension apps. For example, Lester can be using extension app 407 shown in FIG. 8 and Joe can be using extension app 413 shown in FIG. 8. Lester's device can be using messaging app 409 while Joe's device can be using messaging app 411. Referring back to FIG. 9D, it can be seen that the message transcript 510 includes message bubble 512 and message bubble 513 which indicate the content of the conversation within the message transcript 510. In addition, Joe has used the extension app 413 to create content 515 which is appended to message bubble 514. For example, Joe may have entered text as a text message and also created content using the extension app 413 and then cause both the text shown within message bubble 514 and the content 515 to be sent to Lester's device. The right side of the message transcript 510 shows messages that were sent by Joe while the left side of the message transcript 510 shows messages that were received from Lester. Referring now to FIG. 9E, it can be seen that message bubble 513 is now on the right side of the message transcript 517 while message bubble 514 and content 515 are on the left side of the message transcript 517 on Lester's device. Hence, Lester's device has received the text message within message bubble 514 and has also received the content generated by the extension app on Joe's device. Lester can then tap on the content 515 to cause the launching of the corresponding or counterpart extension app on Lester's device. The content 515 is associated with a session identifier which is maintained for the extension app on Lester's device. For example, at this point in the process, operation 461 shown in FIG. 9A can be performed on Lester's device as a result of the user selecting the content 515 which can be displayed within a message bubble in one embodiment. Lester can then use the extension app on Lester's device to create modified content or new content and send that modified or new content back to Joe. In FIG. 9F, it can be seen that Lester has created modified or new content 521 which is shown within a staging area 519 which shows text and other content that is ready to be sent and will be sent in response to selection by a user of a send command, such as the send button 523 shown in FIG. 9F. When Lester selects the send command with the content shown in the staging area 519, this causes the text message 520 and the new or modified content 521 to be sent to Joe, and this can be seen in FIG. 9G in which message bubble 521A shows the text message 520 on the right side of the message transcript 517 which also shows the content 521 which was modified or created as new by Lester using the extension app 407 on Lester's device.

It can be seen from FIG. 9G that content 515 has now been converted into a breadcrumb 515A. This conversion in one embodiment can be performed by the messaging app or alternatively by the extension app. In one embodiment, the extension app can provide the text which appears within the breadcrumb 515A, and the messaging app will use the session identifier to identify the message bubble that will be converted into a breadcrumb and this will cause the conversion of content 515 into the breadcrumb 515A and display the breadcrumb next to the associated message bubble 514 without converting that message bubble 514 into a breadcrumb in one embodiment. Thus, FIG. 9G shows how a session identifier associated with prior message bubbles or content created by an extension app can be used to convert the prior message bubble(s) into a breadcrumb on a sending device. FIG. 9H shows how the conversion is displayed in one embodiment on the receiving device. In the figure shown in FIG. 9H, the message bubble 520A is shown on the left side of the message transcript 510 along with the new or modified content from extension app 407 from Lester's device. The content 515 on Joe's device has been converted into a breadcrumb 515A on the right side of the message transcript and is displayed adjacent to the message bubble 514 which accompanied the content 515 when the content 515 was originally sent.

If the receiving device, such as client device 405 in operation 459 is capable of installing and using the extension app (identified by the app identifier provided in communication 419) but that the extension app is not installed on the receiving device, the receiving device can, within the user interface of the messaging app offer to download and install the extension app (again specified by the app identifier in communication 419, on the receiving device). FIG. 9C shows an example in which the content from extension app 407 can be displayed on the client device 405 in a message bubble 471 and the client device 405 is in the process of downloading and installing the extension app identified by the app identifier in communication 419. In the example shown in FIG. 9C, the content is displayed within the message bubble 471 while the extension app 413 is being installed. In one embodiment, a progress bar 473 (or alternatively a progress circle) can be shown within the message bubble 471 during the installation process. In one embodiment, the downloading and installation process can be performed in the background while the messaging app remains the foreground application. If the receiving device is not capable of installing or using the extension app, then the resource locator and the metadata can be passed in one embodiment to a web browser on the receiving device, and the web browser can become the foreground app and allow for the user interaction with the web page referred to by the resource locator.

Figure 10:
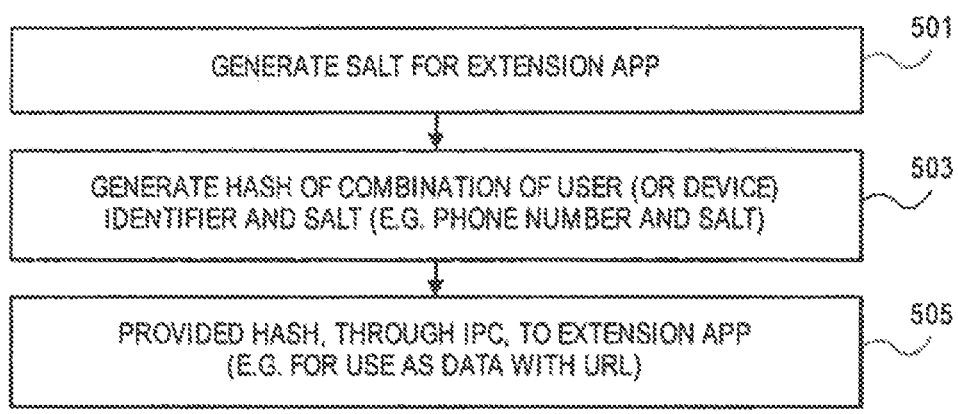
FIG. 10 is a flowchart which illustrates a method according to one embodiment described herein.

In some embodiments, it may be desirable to provide an identifier of each user to each extension app executing on a client device, particularly in the case of a collaborative environment in which two or more users are interacting through the messaging apps and the extension apps. FIG. 10 shows an example of a method to provide an identifier for each extension app without causing a loss of the user's privacy. The method shown in FIG. 10 can be performed by each messaging app on each client device. In one embodiment, the method can be performed in response to a call from an extension app to an application programming interface (API) which can allow the extension app to request an identifier of the local user. In one embodiment, the identifier can be the local user's email address or phone number or other identifier used by the messaging system. The identifier provided to the extension app is an obfuscated identifier created, in one embodiment, by the method shown in FIG. 10. In operation 501, the messaging app can generate, in response to a call from the extension app, a salt for the particular extension app. In one embodiment, the salt can be a random number which is associated with that particular extension app. Then in operation 503, the messaging app can generate a hash (such as a SHA-1 hash) of a combination of a user or device identifier and the salt. For example, the user identifier may be the phone number or email address of the user and that phone number or email address is combined with the salt and then the hash is created for that combination in operation 503. Then in operation 505, the hash is provided, through the IPC, to the extension app, and that hash value can be used as data with the resource locator which can then be sent to the other extension app to identify the user that has made changes or has created a content. In another embodiment, the messaging app can obfuscate the identifier by maintaining a mapping of the identifier and a randomly generated unique identifier for each extension app. In other words, for a given extension app, the messaging app can generate a random (and unique) identifier for the extension app and associate (e.g., map) that random identifier with the identifier of the user (e.g. local user's email address or phone number or other identifier used by the messaging system). This random identifier for the given extension app can be provided to the extension app, but the identifier is not provided to the extension app. Another extension app would receive a different, randomly generated identifier. This extension app specific identifier can then be provided to a counterpart extension app on another device so that the two extension apps can keep track of which users performed which actions in the context of a session or other collaborative environment.

Figure 11:
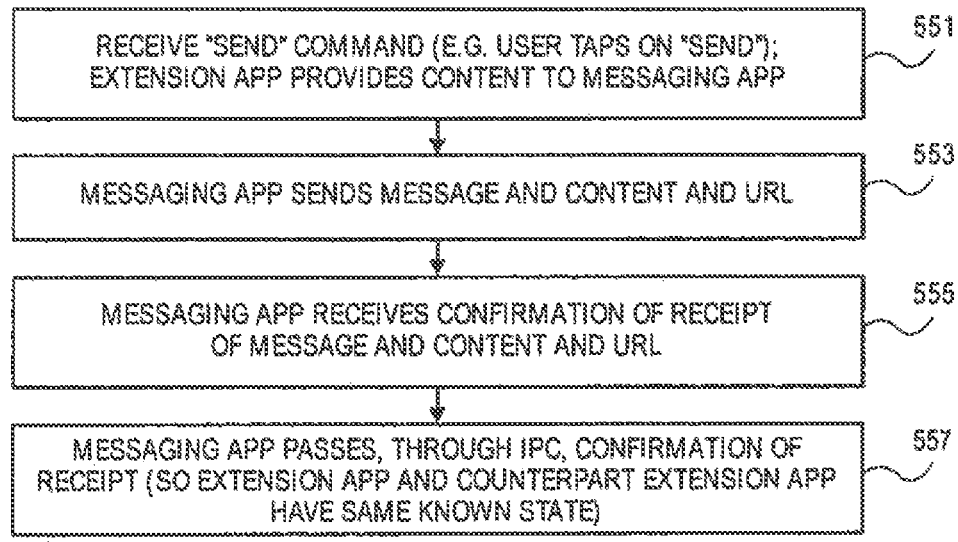
FIG. 11 is a flowchart which illustrates a method according to one embodiment described herein.

In one embodiment, the messaging systems described herein can provide confirmation of receipt of messages to one or more extension apps, and this may be useful in certain cases in which the extension app needs to be assured that the remote extension app has the same known state as the local extension app. FIG. 11 shows an example of a method for providing confirmation of receipt. In operation 551, the messaging app receives the "send" command from a user and in response the local extension app provides the content to the messaging app. In turn, in operation 553, the messaging app sends the message and message bubble identifier and content and resource locator (if any) through the one or more messaging servers to a receiving device which also includes a message app. At some point, the messaging app on the local device in operation 555 receives a confirmation of receipt of the message and content and optional resource locator, and then can pass, in operation 557, through the IPC the confirmation of receipt to the local extension app so that the local extension app knows that the remote extension app has the same known state when the extension app provided its content for transmission to the remote extension app.

Figure 12:
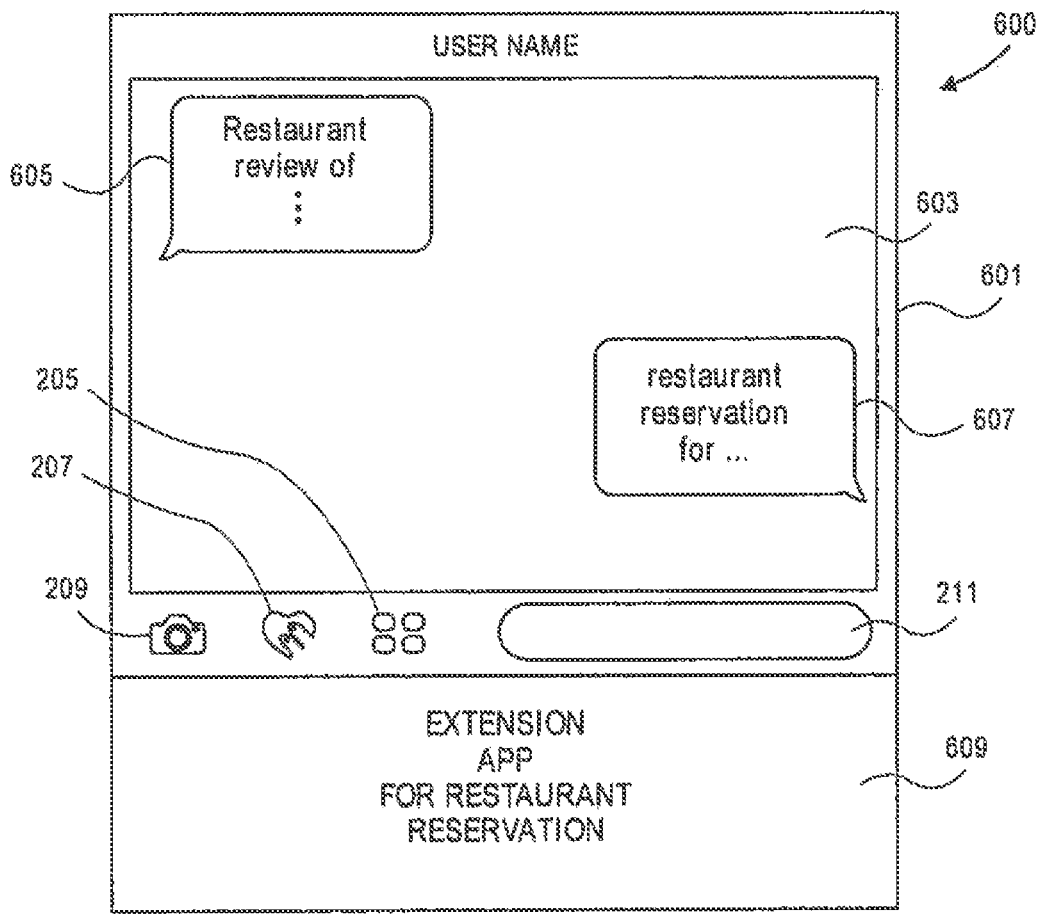
FIG. 12 shows a user interface of a messaging app in which content from two or more different extension apps is presented within the same message transcript provided by the messaging app.

FIG. 12 shows another aspect to the embodiments described herein, and that aspect relates to the presentation of multiple message bubbles within a message transcript where different message bubbles have content created by different extension apps, and at least one of which may be executing (and have its content displayed in a compact view) while the message transcript of the user interface of the messaging app is also displayed. FIG. 12 shows an example of such an aspect. The communication device 600 in this embodiment includes a touch screen 601 which displays a message transcript 603 which includes two message bubbles 605 and 607. In addition, the messaging app presents a compact view 609 of an extension app, which in this case is an extension app for a restaurant reservation. In the example shown in FIG. 12, the extension app for a restaurant reservation has been used to send a message showing the content of a restaurant reservation, which is depicted as message bubble 607. This may have occurred as a result of receiving a message from another user who uses another communication device which provides the content of a restaurant review from another extension app. In the example shown in FIG. 12, message bubble 605 shows the content created by a remote extension app for providing restaurant reviews which is different than the extension app for making a restaurant reservation. In one embodiment, both extension apps may be executing on both communication devices that are part of the messaging session or chat.

Figure 13A:
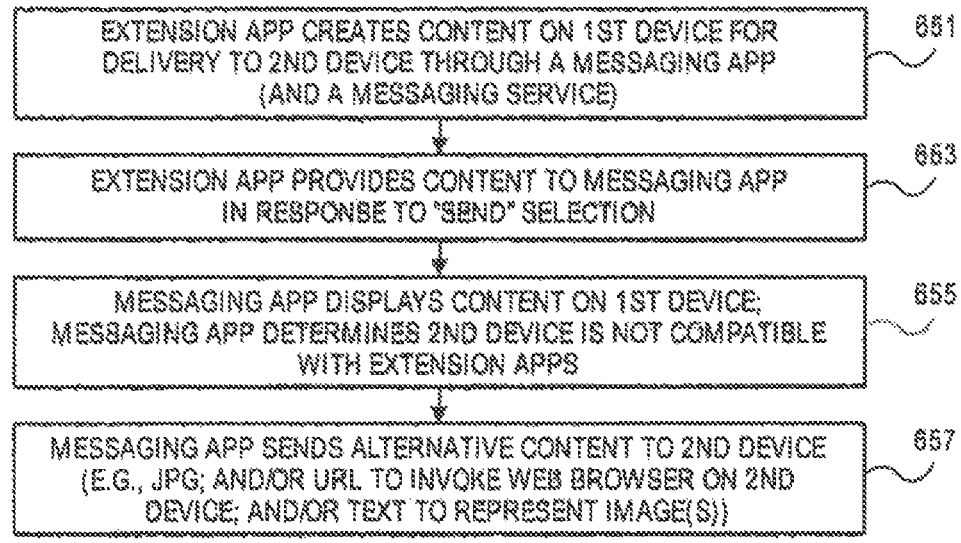
FIG. 13A is a flowchart which shows a method according to one embodiment for providing backward compatibility for older devices or older messaging systems.
Figure 13B:
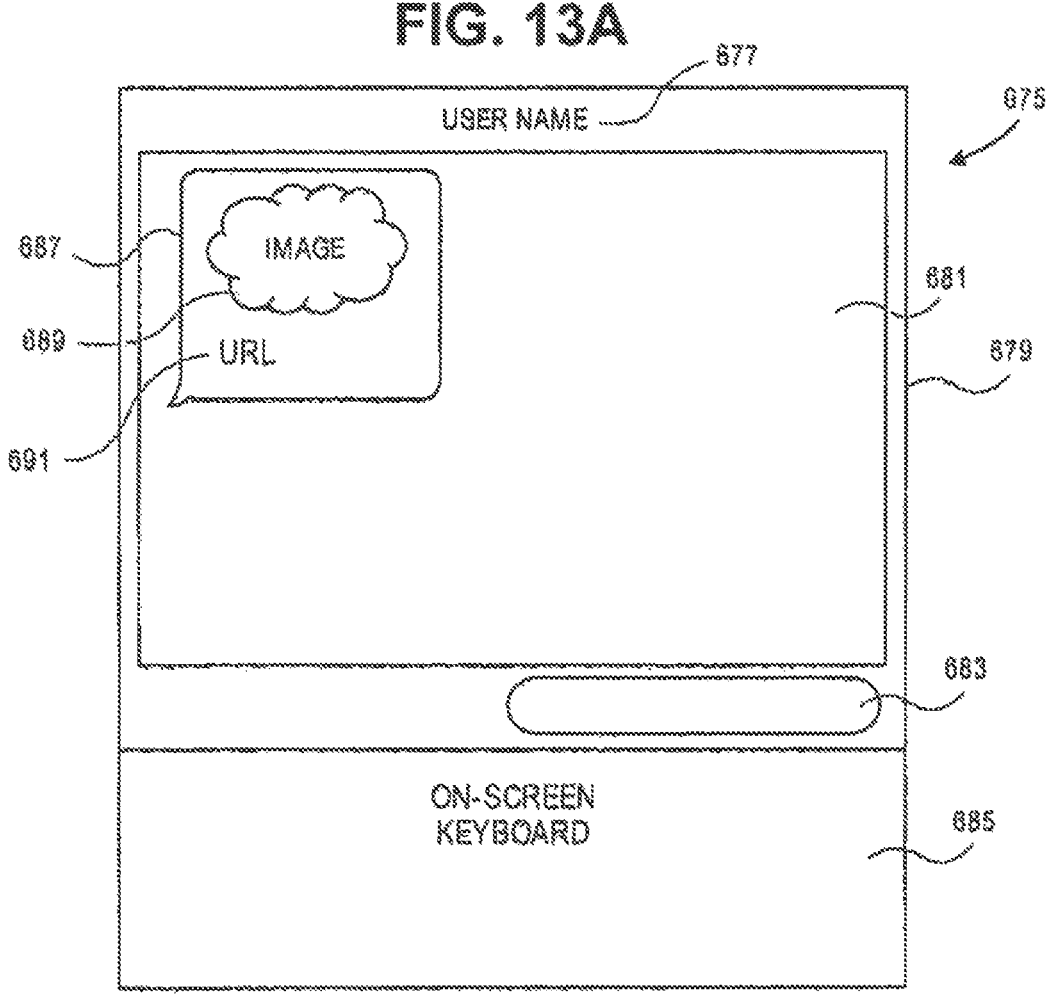
FIG. 13B shows an example of a user interface in which backward compatibility has been provided within a messaging app.

Another aspect of the embodiments described herein relate to backward compatibility, and that aspect is shown in FIGS. 13A and 13B. Certain older devices may not be compatible with the extension app architecture described herein or may not use this architecture or may not even be smartphones. In one embodiment, a client device which is sending the message may be able to provide alternative content, either automatically or based upon a determination that the receiving device is not compatible with extension app. A method for providing backward compatibility is shown in FIG. 13A. In operation 651, an extension app on a sending device creates content on the sending device (first device) for delivery to a second device through a messaging app and a messaging service. This can be similar to operation 451 in FIG. 9A. The content created in operation 651 can then be passed through an interprocess communication to the messaging app in operation 653 in response to the messaging app receiving the user's "send" selection. Then in operation 655, the messaging app can display the content on the first device and also determine that the second device is not compatible with extension apps. In one embodiment, this can be determined as a result of receiving information about the receiving device (second device) from one or more messaging servers, such as the one or more messaging servers 51 shown in FIG. 2 which can maintain information about the state of each device, such as the version of the operating system of the device or the type of device, etc. As a result of determining that the second device is not compatible with extension apps, the messaging app can in operation 657 send alternative content to the second device, and FIG. 13B provides an example of this alternative content.

The communication device 675 shown in FIG. 13B may be, for example, an older smartphone which uses an older operating system that is not compatible with extension apps described herein. Nevertheless, the communication device 675 includes a touch screen 679 and a text entry region 683 and an on-screen keyboard 685 that provide functionality of a messaging app which also displays a message transcript 681 which includes a message bubble 687. The message bubble 687 contains the alternative content provided by a sending message app on a remote device. In this case the content includes an image 689 and a resource locator 691 which may be user selectable to cause the display of a web page which the resource locator 691 refers to. In other words, the resource locator 691 may be user selectable to invoke a web browser on the communication device 675 to allow the user of the communication device 675 to interact through a web browser with the web page which may have the same affect in certain instances as an extension app interacting with the website.

Another aspect of the embodiments described herein relate to a service, such as an app marketplace that can provide a plurality of different extension apps for use within a messaging app according to the one or more embodiments described herein. The service or app marketplace can present browsable views of the plurality of different extension apps and messaging app plug-ins and provide information about those various extension apps and provide for downloading of those extension apps to a client device to allow the client device to install one or more extension apps. FIG. 14A shows an example of a method for using such a service or app marketplace and FIG. 14B shows an example of a user interface for a messaging extension app marketplace. The app marketplace shown in FIG. 14B may be invoked in one embodiment from a browsable view of installed extension apps within the user interface of the messaging app on a client device. For example, the selection of icon 167 shown in FIG. 4B may cause the presentation of the messaging extension app marketplace shown in FIG. 14B. The user can then browse through the one or more collections of messaging extension apps and select one or more extension apps which may be free or may be purchased. In the example shown in FIG. 14B, the messaging extension app marketplace 725 can include a navigation bar 729 and a browsable view of one or more messaging extension apps, such as apps 726, 728, and 731 displayed on the touch screen 727. The user can browse through the apps by swiping, in one embodiment, the user's finger across the touch screen or by the use of a navigation bar 729. The user can then select the download and install one or more of the extension apps, and as a result the messaging app on the user's client device can add an icon representing the newly installed extension app into the browsable view of installed extension apps, such as the browsable view 157 shown in FIG. 4B. In addition, the messaging app can add the installed extension app into a list of installed extension apps along with the identifier of the app ("app identifier") provided by the app marketplace. While the user's use of the app marketplace shown in FIG. 14B is one way of installing extension apps, another way is shown in FIG. 14A in which the installation process begins as a result of the user interacting with a message in the message transcript of a messaging app.

Referring now to FIG. 14A, a messaging app in operation 701 can receive content (and an optional resource locator and data) created by an extension app on a remote device, such as a first device, and can also receive an app identifier of the extension app on the remote device. In one embodiment, the app identifier can be the same identifier provided by the app marketplace when the extension app was installed on the first device or can be a different identifier that is associated with the app store's identifier. Then in operation 703, the messaging app on the second device can display the content in a message bubble and can retain the resource locator and data if provided. At this point, the messaging app in this embodiment does not attempt to launch an extension app which in fact is not installed on the second device at this point in time. Then in operation 705, the messaging app receives a selection, such as a tap, of the message bubble containing the content provided by the extension app from the first device, and the messaging app determines that the extension app (as identified by the received app identifier) is not installed on the second device. At this point, as shown in operation 707 of FIG. 14A, the messaging app offers to download and install the extension app on the second device and the user can select to install that extension app which was identified by the app identifier received in operation 701. In some instances, the user may need to purchase the extension app before it can be downloaded and installed. The offer to download and install may be presented in a notice, such as the notice 259 shown in FIG. 5F, and this notice may include a selectable option to cause the downloading and the installing of the extension app for the selected message bubble. Then in operation 709, the second device downloads and installs the extension app and can launch the newly installed extension app. In one embodiment, the download and install can occur in the background while the messaging app remains the foreground. In one embodiment, the progress of the download and install can be shown in a progress bar, such as the progress bar 473 shown within the selected message bubble. After operation 709 is completed, then the newly installed extension app can be used on the second device and, the messaging app can provide, in operation 711, the content and optional resource locator and data to the extension app on the second device within the view hosted by messaging app.

In one embodiment, the messaging app may cause the automatic updating of extension apps which have been installed. In another embodiment, the messaging app may provide alerts or notices to the user that certain extension apps are in need of being updated and the notifications about these updates can be received from an extension app marketplace in one embodiment. This can allow a user to selectively decide whether or not to update specific messaging apps.

Another aspect of the embodiments described herein relate to the use of one or more layers of content which are displayed along with one or more received message bubbles and one or more sent message bubbles. FIGS. 15A, 15B, 16A, 16B, 17A, and 17B show examples of this aspect. In one embodiment, a set of layers, each having a Z depth relative to other layers in the set, can be overlaid and composited together in a rendering process that produces a composite image from the set of layers. The set of layers can include sent message bubbles in one layer which can be referred to as a sent message layer and can include received message bubbles in a received message layer. When the layers include animation, the rendering process can create a set of composited images which over time produces the animation through a sequence of images played back rapidly over time. In one embodiment, alpha values which indicate transparency or opaqueness can be used in the composited or blending process when the final images are rendered.

Figure 15A:
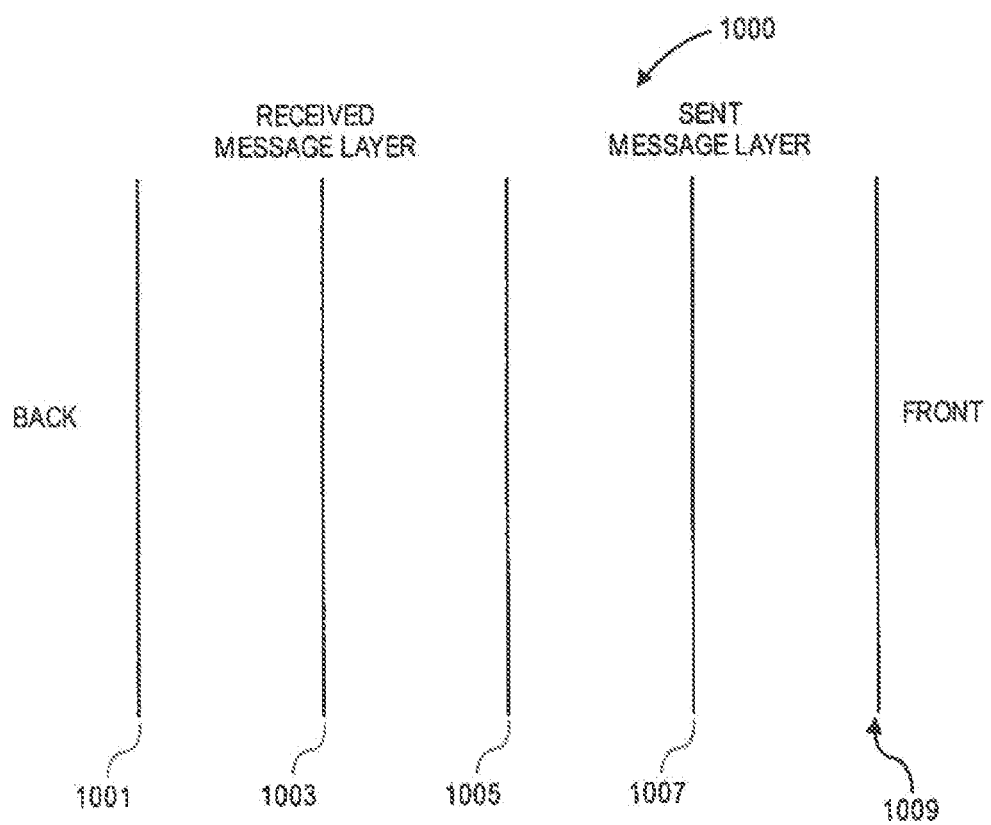
FIG. 15A shows an example of a set of layers for a messaging app to display in a user interface of a message transcript of the messaging app.

FIG. 15A shows an example of a set of layers 1000 which include a received message layer 1003 and a sent messaging layer 1007. In one embodiment, one or more of the received message bubbles can be in the received message layer 1003, and one or more sent message bubbles can be in the sent message layer 1007. In addition, a navigation bar or other user interface components of a messaging app can be included in the sent message layer 1007, and the on-screen keyboard of the messaging app can also be on the sent message layer 1007. Thus, in one embodiment the sent message layer 1007 can include one or more or all of the sent message bubbles as well as an on-screen keyboard, such as the on-screen keyboard 20A shown in FIG. 1B and can include other user interface components of the messaging app such as the text region entry 18A, etc. The set of layers can be arranged to have a relative Z depth from the front to the back of the stack of layers which can be overlaid. The Z depth is used during the compositing process to render the final composite image based upon whether it is obscured or partially obscured based upon the relative Z depth of each layer. Layer 1009 is the front most layer and can obscure or partially obscure all other layers depending upon the content in the layer 1009 and the set of alpha values specified for that content in the layer 1009. Layer 1001 is the layer which is furthest away from the viewer and can be considered the back of the set of layers 1000. Layer 1005 is positioned between the received message layer 1003 and the sent message layer 1007. Depending on the content in layer 1005 and the alpha values for the content in layer 1005, layer 1005 may obscure or partially obscure content in the received message layer 1003 as well as content in the layer 1001. In one embodiment, the message bubbles on each of layers 1003 and 1007 may show one or more animations while one or more of the layers 1001, 1005, and 1009 can show one or more animations on each of those layers 1001, 1005, and 1009 (or on a subset of layers 1001, 1005, and 1009). An example of these animations will be provided below in conjunction with FIGS. 17A and 17B. In one embodiment, one or more of the message bubbles on either the received message layer or the sent message layer can also include animations that are synchronized with the animations on the other layers. For example, a particular message bubble which triggers or invokes the animation may be displayed differently on its layer relative to other message bubbles in that same layer. For example, a message bubble having text (e.g., "Happy Birthday") which invoked the animation can be displayed without being obscured while other message bubbles in the same message layer can be displayed as being at least partially obscured by layers above that message layer, depending on the content of those layers above the message layer and the alpha values of that content. Each layer, such as layer 1001, 1005, and 1009, can have a layer identifier which specifies a relative Z depth relative to other layers including the received message layer 1003 and the sent message layer 1007. In addition, the layer identifier can also specify or refer to content such that a receiving device can use the identifier to either generate or create or retrieve from storage the content for the identified layer which is identified by the layer identifier which can be provided by the sending device when the sending device sends the message.

Figure 15B:
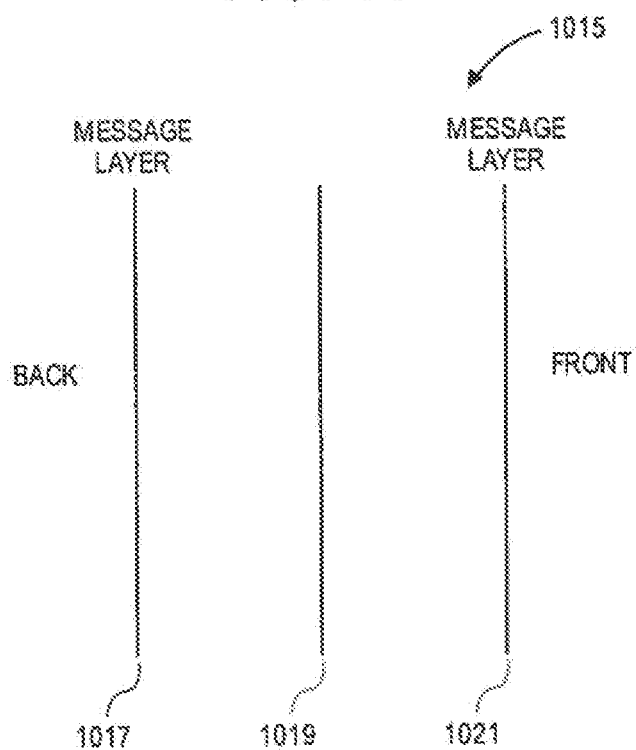
FIG. 15B shows another example of a set of layers for a messaging app to display in a user interface of a message transcript of the messaging app.

FIG. 15B shows an alternative embodiment of a set of layers. In particular, set of layers 1015 includes three layers 1017, 1019, and 1021. Layer 1021 is the front most layer and it is one of the two message layers, such as the sent message layer or the received message layer. Layer 1017 is the back most layer and it can be the received message layer if layer 1021 is the sent message layer, or layer 1017 can be the sent message layer if the layer 1021 is the received message layer. Layer 1019 has a relative Z depth which places it between message layer 1017 and message layer 1021. Content within layer 1019 can be animated over time such that when a receiving device receives a layer identifier for layer 1019, it can generate content based upon that layer identifier and then display an animation over time which will appear in front of message layer 1017 and behind message layer 1021 in one embodiment.

Figure 16A:
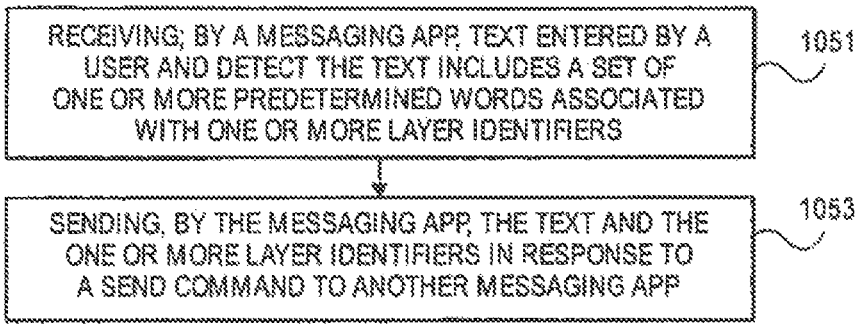
FIG. 16A shows a flowchart which illustrates a method in a messaging app on a sending device.

A method which can be performed on a sending device according to one embodiment will now be described in conjunction with FIG. 16A. In operation 1051, a messaging app on the sending device can receive text entered by a user. For example, the user can use the on-screen keyboard to enter text or can use speech recognition to enter text which is received by the messaging app on the sending device. The sending device can detect the text includes a set of one or more predetermined words which are associated with one or more layer identifiers. For example, the messaging app can detect that the user has entered the words "happy birthday" or other words which are predetermined and which are associated with one or more layer identifiers which can also be predetermined. For example, in one embodiment the predetermined words "happy birthday" can be associated with one or more layer identifiers that describe or refer to or are otherwise associated with content for one or more layers which can present an animation in response to detecting the words "happy birthday". In one embodiment, the animation can be three separate layers having three distinct apparent Z depths relative to each other, each layer having a set of one or more balloons which appear to animate by floating up from the bottom of the screen or message transcript to the top of the screen or message transcript over time during the animation. In one embodiment, there may be a plurality of predetermined words which a messaging app can detect or recognize and in response to the detection or recognition, the messaging app can, in operation 1053, send the text and the one or more layer identifiers in response to a send command to another messaging app. These one or more layer identifiers can then be used on a receiving device to present a user interface in a message transcript that contains the content in the set of one or more layers, which content can be animated.

Figure 16B:
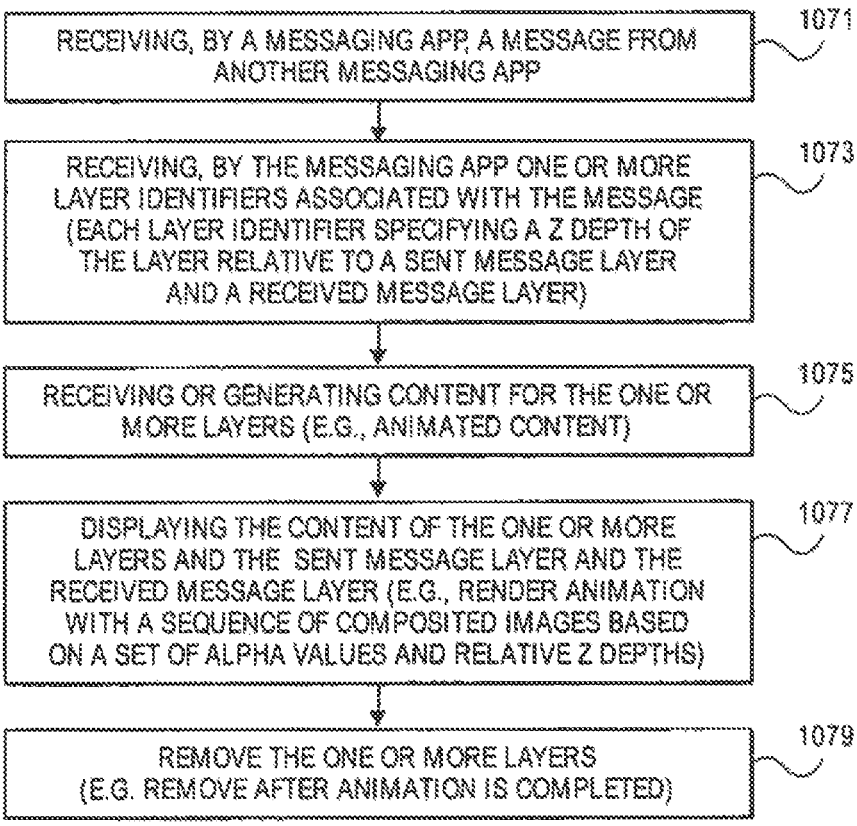
FIG. 16B shows a flowchart which illustrates a method in a messaging app on a receiving device.

FIG. 16B shows an example of a method which can be performed on a receiving device which can receive messages, such as text messages from a messaging app on a sending device, and these text messages can be processed by a messaging app on the receiving device. In operation 1071, a messaging app on the receiving device can receive a message from another messaging app. In operation 1073, the messaging app can also receive one or more layer identifiers associated with the message. In one embodiment, the layer identifiers can be received at the same time that the message is received in operation 1071. Each layer identifier in one embodiment can specify (either explicitly or implicitly) an apparent relative Z depth of the layer relative to one or both of a sent message layer and a received message layer and relative to other layers in a set of layers. In one embodiment, the apparent relative Z depth can be specified implicitly in the alpha values of the layers used to create a blended or composited image; for example, predefined alpha values for each layer can implicitly define the relative Z depth of each layer so that each layer appears to have the relative Z depth even though no explicit relative Z depth was specified by the layer identifier. In one embodiment, each layer identifier can also specify or indicate or refer to content which is displayed on the layer in a stack of layers, such as the stack of layers shown in FIG. 15A as set of layers 1000. Then in operation 1075, the messaging app on the receiving device can receive or generate content for the one or more layers identified by the one or more layer identifiers which were received in operation 1073. In one embodiment, the content can be provided by the message, while in another embodiment the content can be generated (or retrieved from local storage) by the receiving device based upon the layer identifiers. In one embodiment, the content can be animated content which changes over time in a fashion similar to a movie or video content. In one embodiment, the messaging app can invoke or call modules or software components which can generate the content based upon the received layer identifiers. In one embodiment, the messaging app in operation 1077 can display the content of the one or more layers and the sent message layer and the received message layer within the message transcript. For example, the messaging app, or a component called or invoked by the messaging app, can render an animation by using a sequence of rendered and composited images based on the content in the one or more layers (and their relative Z depths and a set of alpha values for each of the one or more layers) and the sent message layer and the received message layer to create the sequence of composited images. As noted above, the relative Z depths may be implicitly specified in predefined alpha values for each of the layers so that each layer appears to have the relative Z depth even though no explicit relative Z depth was specified by the layer identifier. After the animation is completed, then in operation 1079, the messaging app on the receiving device can remove the one or more layers so that they are no longer displayed in the message transcript while the sent message layer and the received message layer continue to be displayed within the message transcript.

In an alternative embodiment, the processing of the text to detect the predetermined words and the processing to find the associated layer identifiers for the detected predetermined words can occur on the receiving device. In other words, the receiving device receives the text from the sending device and then performs the detection of the words associated with layer identifiers and then performs operations 1075, 1077 and 1079.

Figure 17A:
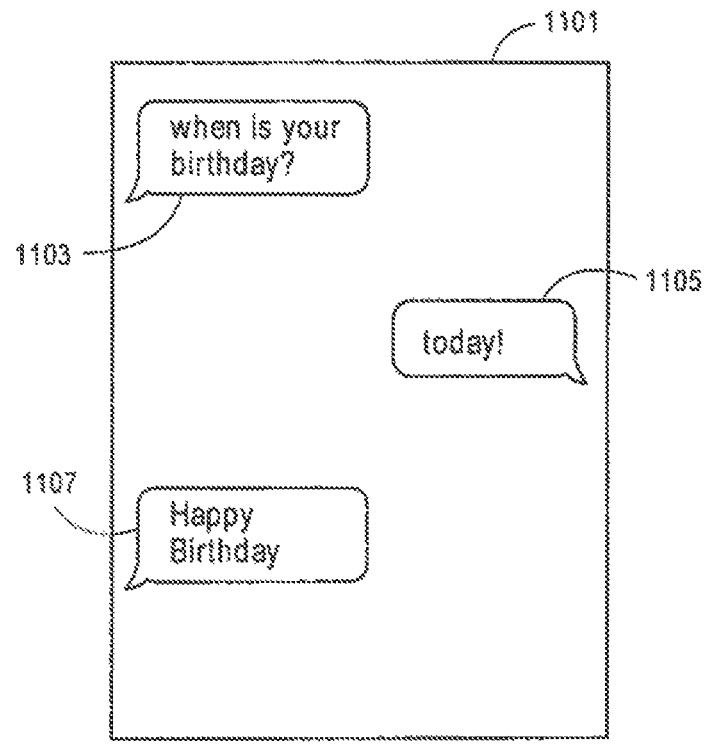
FIG. 17A shows an example of a user interface of a messaging app on a receiving device.
Figure 17B:
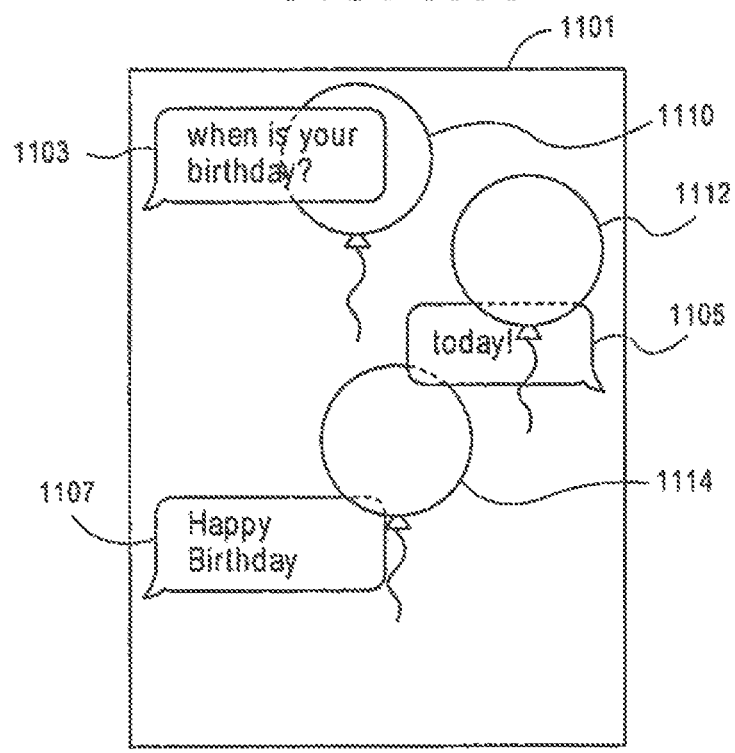
FIG. 17B shows an example of the user interface of the messaging app of FIG. 17A during an animation of the layers as part of the user interface.

FIGS. 17A and 17B show examples of a user interface on a receiving device. In particular, FIGS. 17A and 17B show a user interface of a messaging app on a receiving device which can perform the method shown in FIG. 16B. Referring to FIG. 17A, the message transcript 1101 is shown within the user interface of the messaging app on the receiving device. The message transcript 1101 can be similar to the message transcript 16A shown in FIG. 1B. In one embodiment, the messages which have been received include the messages in message bubbles 1103 and 1107 which are displayed on the left side of the message transcript 1101. Messages which have been sent appear on the right side of the message transcript 1101 and include message bubble 1105. In one embodiment, message bubble 1103 and message bubble 1107 can be on a received message layer, such as received message layer 1003 shown in FIG. 15A. Similarly, message bubble 1105 can be on a sent message layer, such as sent message layer 1007. In one embodiment, the message transcript can be scrolled up or down to show portions of the message transcript that are not currently displayed within the view of the message transcript shown in FIG. 17A. In one embodiment, the text message which triggered or invoked the sending of one or more layer identifiers can be displayed briefly before displaying any animation created based on those layer identifiers. This is shown in the example of FIG. 17A in which the animation (in this case a set of balloons floating upward) has not begun. In the example shown in FIG. 17A, the text within message bubble 1107 is transmitted by a sending device to the receiving device along with one or more layer identifiers which are associated with the message within message bubble 1107. These one or more layer identifiers specify the balloon animation which can be seen in FIG. 17B. This animation can begin after displaying message bubble 1107 without any animation for a short period of time and then beginning and then ending the animation. In an alternative embodiment, the animation can begin at the same time as when the message bubble associated with the animation is initially displayed.

Referring now to FIG. 17B, a snapshot of the animation is shown in that figure, and it can be seen that the three balloons in the snapshot have different Z depths relative to each other and relative to the received message layer and the sent message layer. The sent message layer includes message bubble 1105, and this sent message layer is under the front most layer 1009 which displays the animated balloon 1112 on layer 1009. Animated balloon 1114 is on layer 1005 and hence it appears under the message bubble 1105 and over the message bubble 1107 which is on the received message layer 1003. The animated balloon 1110 is on layer 1001 which is the back most layer and hence it appears behind the message bubble 1103 which is on the received message layer 1003. Over time, each of these three balloons can appear to float upwardly from the bottom of the message transcript to the top of the message transcript, and after a period of time the animation can stop and the layers 1001, 1005, and 1009 no longer appear within the message transcript 1101. In one embodiment, one or more of the message bubbles can appear differently on a particular layer depending upon the message bubble. For example, the message bubble which contains the text that invoked or triggered the sending of the one or more layer identifiers can be displayed differently than other message bubbles on the same message layer.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program (e.g., game center application) to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 18:
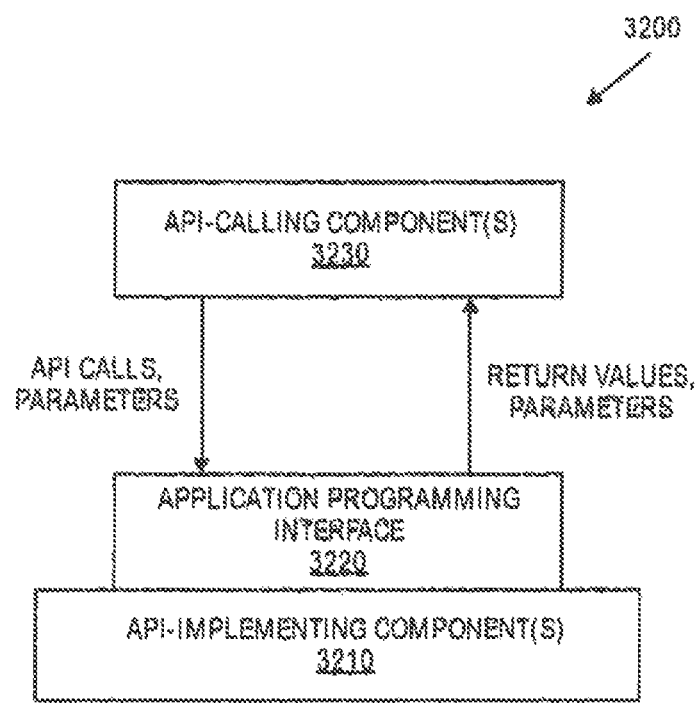
FIG. 18 is a block diagram illustrating an exemplary API architecture, which may be used in one or more of the embodiments described herein.

FIG. 18 is a block diagram illustrating an exemplary API architecture, which may be used in one embodiment of the present invention. As shown in FIG. 18, the API architecture 3200 includes the API-implementing component 3210 (e.g., an operating system, a library, a device driver, an API, an application program, software or other module) that implements the API 3220. The API 3220 specifies one or more functions, methods, classes, objects, protocols, data structures, formats and/or other features of the API-implementing component that may be used by the API-calling component 3230. The API 3220 can specify at least one calling convention that specifies how a function in the API-implementing component receives parameters from the API-calling component and how the function returns a result to the API-calling component. The API-calling component 3230 (e.g., an operating system, a library, a device driver, an API, an application program, software or other module) makes API calls through the API 3220 to access and use the features of the API-implementing component 3210 that are specified by the API 3220. The API-implementing component 3210 may return a value through the API 3220 to the API-calling component 3230 in response to an API call.

It will be appreciated that the API-implementing component 3210 may include additional functions, methods, classes, data structures, and/or other features that are not specified through the API 3220 and are not available to the API-calling component 3230. It should be understood that the API-calling component 3230 may be on the same system as the API-implementing component 3210 or may be located remotely and accesses the API-implementing component 3210 using the API 3220 over a network. While FIG. 18 illustrates a single API-calling component 3230 interacting with the API 3220, it should be understood that other API-calling components, which may be written in different languages (or the same language) than the API-calling component 3230, may use the API 3220.

The API-implementing component 3210, the API 3220, and the API-calling component 3230 may be stored in a machine-readable medium (e.g., computer-readable medium), which includes any mechanism for storing information in a form readable by a machine (e.g., a computer or other data processing system). For example, a machine-readable medium includes magnetic disks, optical disks, random access memory; read only memory, flash memory devices, etc.

Figure 19:
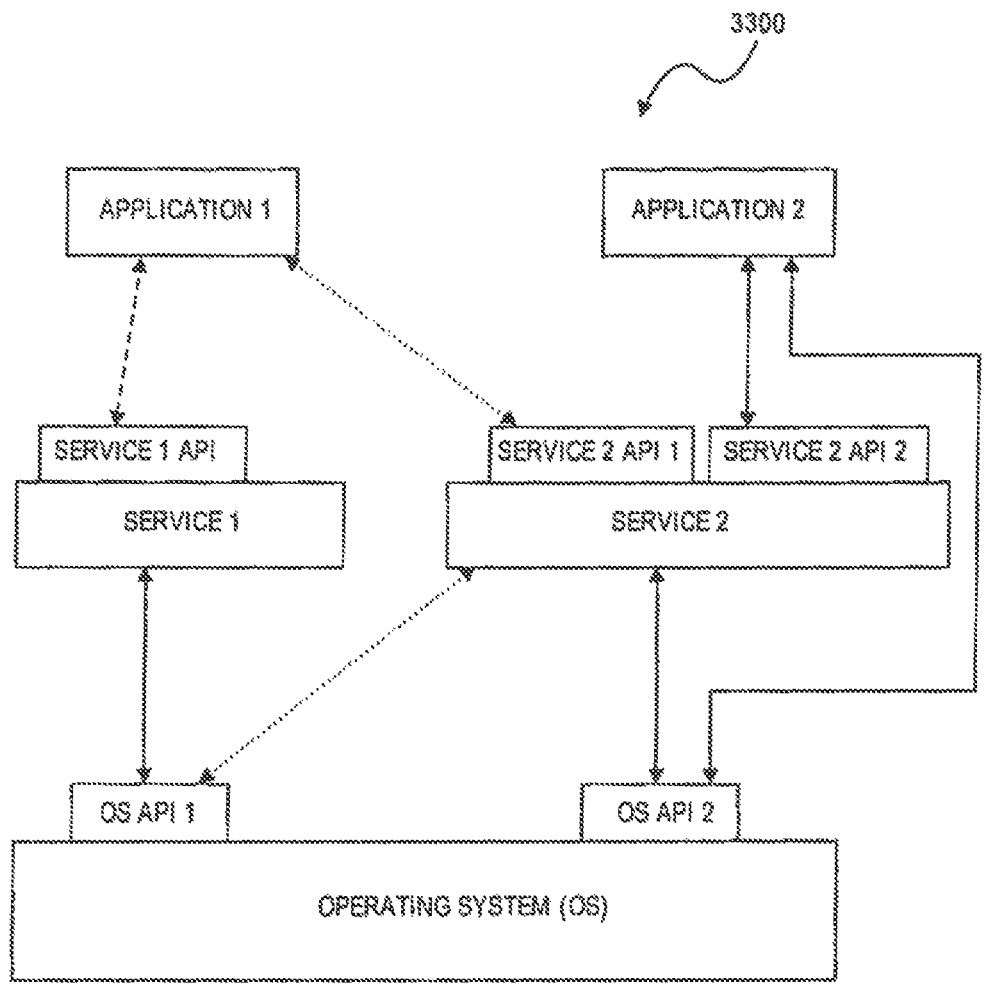
FIG. 19 shows a block diagram illustrating a software stack which can include one or more applications and services in operating systems.

In FIG. 19 ("Software Stack"), in one embodiment of the present invention, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 20:
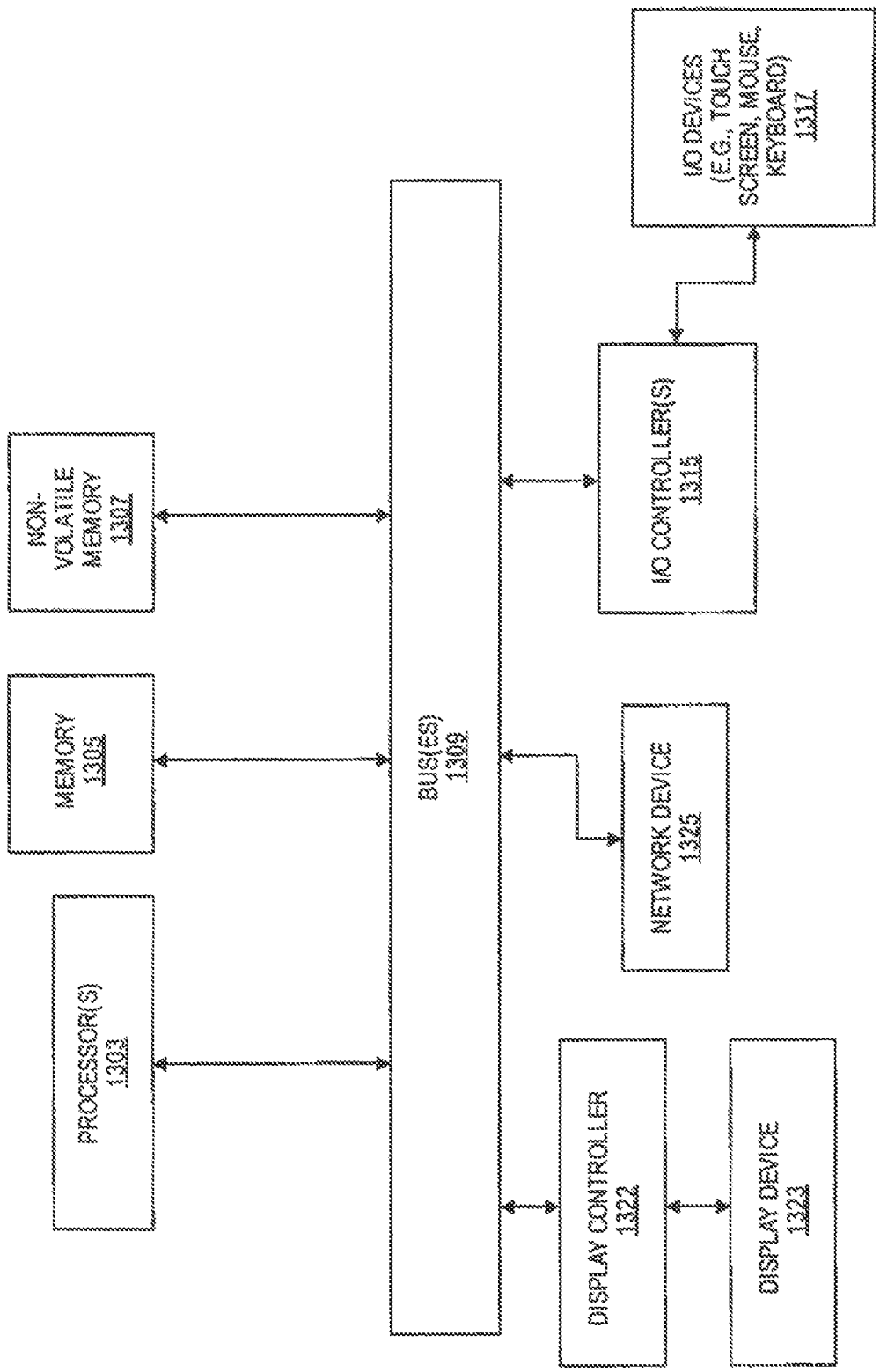
FIG. 20 shows an example of a data processing system which can be used in one or more embodiments described herein.

FIG. 20 is a block diagram of data processing system hardware according to an embodiment. Note that while FIG. 20 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 20 can also be used with the present invention.

As shown in FIG. 20, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 20 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

The present disclosure recognizes that the use of personal information data (such as health data collected by one or more watches), in the present technology, can be used to the benefit of users. For example, the personal information data can be used to deliver health related information or targeted content that is of greater interest to the user. Accordingly, use of such personal information data can enable calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of health information or advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information. In yet another example, users can select not to provide pertinent health information such as weight, personal characteristics, traits, etc.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory computer readable storage medium storing executable program instructions which when executed by a computer system having a display cause the computer system to:
  display a messaging user interface on the display, the messaging user interface including a conversation transcript of a messaging session between a user of the computer system and at least one other user, including a first other user, wherein
    the conversation transcript includes a plurality of messages and is displayed in a conversation transcript region of the messaging user interface; and
    the plurality of messages in the conversation transcript includes one or more received messages, received from the first other user, and sent messages, sent to at least the first other user; and
  wherein the displaying includes:
    displaying, in the conversation transcript region of the messaging user interface, the one or more received messages in a received message layer having a first Z depth; and
    displaying, in the conversation transcript region of the messaging user interface, the sent messages in a sent message layer having a second Z depth different from the first Z depth; and
    displaying, in the conversation transcript region of the messaging user interface, animated content in a third layer having a third Z depth different from the first Z depth and second Z depth.

2. The non-transitory computer readable storage medium of claim 1, wherein the third layer is below at least one of the received message layer and the sent message layer.

3. The non-transitory computer readable storage medium of claim 1, wherein the third layer is between the received message layer and the sent message layer.

4. The non-transitory computer readable storage medium of claim 1, wherein a respective layer of the received message layer, the sent message layer, and the third layer at least partially obscures other layers of the received message layer, the sent message layer, and the third layer.

5. The non-transitory computer readable storage medium of claim 1, wherein:
  a respective message of the one or more received messages and the sent messages is associated with one or more layer identifiers;
  the one or more layer identifiers describe or refer to respective content for one or more layers of the messaging user interface corresponding to the one or more layer identifiers;
  and the program instructions include instructions which when executed by the computer system cause the computer system to:
    if the respective message is a received message, display the respective message in the received message layer;
    if the respective message is a sent message, display the respective message in the sent message layer; and
    display the respective content, described or referred to by the one or more layer identifiers, in the one or more layers of the messaging user interface corresponding to the one or more layer identifiers.

6. The non-transitory computer readable storage medium of claim 5, the program instructions including instructions which when executed by the computer system cause the computer system to:
  if the respective message is a received message, display the respective message in the received message layer with a different appearance from other received messages in the received message layer of the messaging user interface; and
  if the respective message is a sent message, display the respective message in the sent message layer with a different appearance from other sent messages in the sent message layer of the messaging user interface.

7. The non-transitory computer readable storage medium of claim 5, wherein the respective message includes text, and the program instructions include instructions that, when executed by the computer system cause the computer system to:
  detect whether the text of the respective message includes one or more predetermined words associated with the one or more layer identifiers; and
  in response to detecting that the text of the respective message includes the one or more predetermined words associated with the one or more layer identifiers, display animated content corresponding to the one or more layer identifiers.

8. The non-transitory computer readable storage medium of claim 5, the program instructions including instructions which when executed by the computer system cause the computer system to:
  display the respective message without displaying the respective content in the one or more layers of the messaging user interface corresponding to the one or more layer identifiers; and
  after displaying the respective message in the received message layer without displaying the respective content in the one or more layers of the messaging user interface, display the respective content in the one or more layers of the messaging user interface, including displaying the respective message differently than other received messages in the received message layer of the messaging user interface.

9. The non-transitory computer readable storage medium of claim 1, wherein:
  a respective message of the one or more received messages and the sent messages is associated with a plurality of layer identifiers for a plurality of layers of the messaging user interface, the plurality of layers including the received message layer, the sent message layer, and the third layer;
  each respective layer identifier of the plurality of layer identifiers describes or refers to respective content for a corresponding layer of a plurality layers of the messaging user interface that correspond to the plurality of layer identifiers;
  and the program instructions include instructions which when executed by the computer system cause the computer system to:
    if the respective message is a received message, display the respective message in the received message layer;
    if the respective message is a sent message, display the respective message in the sent message layer; and display the respective content, for each respective layer of the plurality of layers, in the corresponding layer of the plurality of layers of the messaging user interface.

10. The non-transitory computer readable storage medium of claim 1, wherein:
a respective message of the one or more received messages and the sent messages is associated with one or more layer identifiers;
the one or more layer identifiers describe or refer to respective content for one or more layers of the messaging user interface that correspond to the one or more layer identifiers, and a respective layer identifier of the one or more layer identifiers specifies a Z depth of a respective layer of the one or more layers, relative to other layers in the one or more layers;
and the program instructions include instructions which when executed by the computer system cause the computer system to:
if the respective message is a received message, display the respective message in the received message layer;
if the respective message is a sent message, display the respective message in the sent message layer; and
display the respective content in the one or more layers of the messaging user interface that correspond to the one or more layer identifiers, including displaying the respective content for the respective layer of the one or more layers at the Z depth specified by the respective layer identifier.

11. The non-transitory computer readable storage medium of claim 1, wherein:
a respective message of the received messages and sent messages is associated with one or more layer identifiers;
the one or more layer identifiers describe or refer to respective content for the third layer;
and the program instructions include instructions which when executed by the computer system cause the computer system to:
if the respective message is a received message, display the respective message in the received message layer at the first Z depth;
if the respective message is a sent message, display the respective message in the sent message layer at the second Z depth; and
display the respective content in the third layer of the messaging user interface at the third Z depth.

12. A method, performed by a computer system having a display, comprising:
displaying a messaging user interface on the display, the messaging user interface including a conversation transcript of a messaging session between a user of the computer system and at least one other user, including a first other user, wherein
the conversation transcript includes a plurality of messages and is displayed in a conversation transcript region of the messaging user interface; and
the plurality of messages in the conversation transcript includes one or more received messages, received from the first other user, and sent messages, sent to at least the first other user; and
wherein the displaying includes:
displaying, in the conversation transcript region of the messaging user interface, the one or more received messages in a received message layer having a first Z depth; and
displaying, in the conversation transcript region of the messaging user interface, the sent messages in a sent message layer having a second Z depth different from the first Z depth; and
displaying, in the conversation transcript region of the messaging user interface, animated content in a third layer having a third Z depth different from the first Z depth and second Z depth.

13. The method of claim 12, wherein the third layer is below at least one of the received message layer and the sent message layer.

14. The method of claim 12, wherein the third layer is between the received message layer and the sent message layer.

15. The method of claim 12, wherein a respective layer of the received message layer, the sent message layer, and the third layer at least partially obscures other layers of the received message layer, the sent message layer, and the third layer.

16. The method of claim 12, wherein:
a respective message of the one or more received messages and the sent messages is associated with one or more layer identifiers;
the one or more layer identifiers describe or refer to respective content for one or more layers of the messaging user interface corresponding to the one or more layer identifiers;
and the method includes:
if the respective message is a received message, displaying the respective message in the received message layer;
if the respective message is a sent message, displaying the respective message in the sent message layer; and
displaying the respective content, described or referred to by the one or more layer identifiers, in the one or more layers of the messaging user interface corresponding to the one or more layer identifiers.

17. The method of claim 16, wherein the method includes:
if the respective message is a received message, displaying the respective message in the received message layer with a different appearance from other received messages in the received message layer of the messaging user interface; and
if the respective message is a sent message, displaying the respective message in the sent message layer with a different appearance from other sent messages in the sent message layer of the messaging user interface.

18. The method of claim 16, wherein the respective message includes text, and the method includes:
detecting whether the text of the respective message includes one or more predetermined words associated with the one or more layer identifiers; and
in response to detecting that the text of the respective message includes the one or more predetermined words associated with the one or more layer identifiers, displaying animated content corresponding to the one or more layer identifiers.

19. The method of claim 16, wherein the method includes:
displaying the respective message without displaying the respective content in the one or more layers of the messaging user interface corresponding to the one or more layer identifiers; and
after displaying the respective message in the received message layer without displaying the respective content in the one or more layers of the messaging user interface, displaying the respective content in the one or more layers of the messaging user interface, including displaying the respective message differently than other received messages in the received message layer of the messaging user interface.

20. The method of claim 12, wherein:
a respective message of the one or more received messages and the sent messages is associated with a plurality of layer identifiers for a plurality of layers of the messaging user interface, the plurality of layers including the received message layer, the sent message layer, and the third layer;
each respective layer identifier of the plurality of layer identifiers describes or refers to respective content for a corresponding layer of a plurality layers of the messaging user interface that correspond to the plurality of layer identifiers;
and the method includes:
if the respective message is a received message, displaying the respective message in the received message layer;
if the respective message is a sent message, displaying the respective message in the sent message layer; and
displaying the respective content, for each respective layer of the plurality of layers, in the corresponding layer of the plurality of layers of the messaging user interface.

21. The method of claim 12, wherein:
a respective message of the one or more received messages and the sent messages is associated with one or more layer identifiers;
the one or more layer identifiers describe or refer to respective content for one or more layers of the messaging user interface that correspond to the one or more layer identifiers, and a respective layer identifier of the one or more layer identifiers specifies a Z depth of a respective layer of the one or more layers, relative to other layers in the one or more layers; and
the method includes:
if the respective message is a received message, displaying the respective message in the received message layer;
if the respective message is a sent message, displaying the respective message in the sent message layer; and
displaying the respective content in the one or more layers of the messaging user interface that correspond to the one or more layer identifiers, including displaying the respective content for the respective layer of the one or more layers at the Z depth specified by the respective layer identifier.

22. The method of claim 12, wherein:
a respective message of the received messages and sent messages is associated with one or more layer identifiers;
the one or more layer identifiers describe or refer to respective content for the third layer; and
the method includes:
if the respective message is a received message, displaying the respective message in the received message layer at the first Z depth;
if the respective message is a sent message, displaying the respective message in the sent message layer at the second Z depth; and
displaying the respective content in the third layer of the messaging user interface at the third Z depth.

23. A computer system, comprising:
a display;
one or more processors;
memory; and
executable program instructions stored, in the memory, for:
displaying a messaging user interface on the display, the messaging user interface including a conversation transcript of a messaging session between a user of the computer system and at least one other user, including a first other user, wherein
the conversation transcript includes a plurality of messages and is displayed in a conversation transcript region of the messaging user interface; and
the plurality of messages in the conversation transcript includes one or more received messages, received from the first other user, and sent messages, sent to at least the first other user; and
wherein the displaying includes:
displaying, in the conversation transcript region of the messaging user interface, the one or more received messages in a received message layer having a first Z depth; and
displaying, in the conversation transcript region of the messaging user interface, the sent messages in a sent message layer having a second Z depth different from the first Z depth; and
displaying, in the conversation transcript region of the messaging user interface, animated content in a third layer having a third Z depth different from the first Z depth and second Z depth.

24. The computer system of claim 23, wherein the third layer is below at least one of the received message layer and the sent message layer.

25. The computer system of claim 23, wherein the third layer is between the received message layer and the sent message layer.

26. The computer system of claim 23, wherein a respective layer of the received message layer, the sent message layer, and the third layer at least partially obscures other layers of the received message layer, the sent message layer, and the third layer.

27. The computer system of claim 23, wherein:
a respective message of the one or more received messages and the sent messages is associated with one or more layer identifiers;
the one or more layer identifiers describe or refer to respective content for one or more layers of the messaging user interface corresponding to the one or more layer identifiers; and
the program instructions include instructions for:
if the respective message is a received message, displaying the respective message in the received message layer;
if the respective message is a sent message, displaying the respective message in the sent message layer; and
displaying the respective content, described or referred to by the one or more layer identifiers, in the one or more layers of the messaging user interface corresponding to the one or more layer identifiers.

28. The computer system of claim 27, the program instructions include instructions for:
if the respective message is a received message, displaying the respective message in the received message layer with a different appearance from other received messages in the received message layer of the messaging user interface; and
if the respective message is a sent message, displaying the respective message in the sent message layer with a different appearance from other sent messages in the sent message layer of the messaging user interface.

29. The computer system of claim 27, wherein the respective message includes text, and the program instructions include instructions for:
- detecting whether the text of the respective message includes one or more predetermined words associated with the one or more layer identifiers; and
- in response to detecting that the text of the respective message includes the one or more predetermined words associated with the one or more layer identifiers, displaying animated content corresponding to the one or more layer identifiers.

30. The computer system of claim 27, wherein the program instructions include instructions for:
- displaying the respective message without displaying the respective content in the one or more layers of the messaging user interface corresponding to the one or more layer identifiers; and
- after displaying the respective message in the received message layer without displaying the respective content in the one or more layers of the messaging user interface, displaying the respective content in the one or more layers of the messaging user interface, including displaying the respective message differently than other received messages in the received message layer of the messaging user interface.

31. The computer system of claim 23, wherein:
- a respective message of the one or more received messages and the sent messages is associated with a plurality of layer identifiers for a plurality of layers of the messaging user interface, the plurality of layers including the received message layer, the sent message layer, and the third layer;
- each respective layer identifier of the plurality of layer identifiers describes or refers to respective content for a corresponding layer of a plurality layers of the messaging user interface that correspond to the plurality of layer identifiers; and
- the program instructions include instructions for:
  - if the respective message is a received message, displaying the respective message in the received message layer;
  - if the respective message is a sent message, displaying the respective message in the sent message layer; and
  - displaying the respective content, for each respective layer of the plurality of layers, in the corresponding layer of the plurality of layers of the messaging user interface.

32. The computer system of claim 23, wherein:
- a respective message of the one or more received messages and the sent messages is associated with one or more layer identifiers;
- the one or more layer identifiers describe or refer to respective content for one or more layers of the messaging user interface that correspond to the one or more layer identifiers, and a respective layer identifier of the one or more layer identifiers specifies a Z depth of a respective layer of the one or more layers, relative to other layers in the one or more layers; and
- the program instructions include instructions for:
  - if the respective message is a received message, displaying the respective message in the received message layer;
  - if the respective message is a sent message, displaying the respective message in the sent message layer; and
  - displaying the respective content in the one or more layers of the messaging user interface that correspond to the one or more layer identifiers, including displaying the respective content for the respective layer of the one or more layers at the Z depth specified by the respective layer identifier.

33. The computer system of claim 23, wherein:
- a respective message of the received messages and sent messages is associated with one or more layer identifiers;
- the one or more layer identifiers describe or refer to respective content for the third layer; and
- the program instructions include instructions for:
  - if the respective message is a received message, displaying the respective message in the received message layer at the first Z depth;
  - if the respective message is a sent message, displaying the respective message in the sent message layer at the second Z depth; and
  - displaying the respective content in the third layer of the messaging user interface at the third Z depth.

* * * * *